United States Patent [19]
Mondrik et al.

[11] Patent Number: 5,640,572
[45] Date of Patent: Jun. 17, 1997

[54] SYSTEM AND METHOD FOR MAPPING DRIVER LEVEL EVENT FUNCTION CALLS FROM A PROCESS-BASED DRIVER LEVEL PROGRAM TO A SESSION-BASED INSTRUMENTATION CONTROL DRIVER LEVEL SYSTEM

[75] Inventors: Dan Mondrik; Samson DeKey; Hugo Andrade, all of Austin, Tex.

[73] Assignee: National Instruments Corporation, Austin, Tex.

[21] Appl. No.: 432,601

[22] Filed: May 1, 1995

Related U.S. Application Data

[63] Continuation-in-part of Ser. No. 238,480, May 4, 1994.
[51] Int. Cl.$^6$ ........................................ G06F 3/00
[52] U.S. Cl. .................. 395/735; 395/651; 395/500; 364/579
[58] Field of Search .................. 364/579; 395/650, 395/733, 735, 739, 741, 742, 500

[56] References Cited

U.S. PATENT DOCUMENTS 5,361,336  11/1994  Atchison ................................. 395/155

OTHER PUBLICATIONS

*Hewlett Packard SICL Standard Instrument Control Library for C Programming*, Lee Atchison, XVI Systems Division, Hewlett Packard Company, Jan. 21, 1994, Revision 3.9, pp. i–iii, 1–136, Index.

*Primary Examiner*—Glenn A. Auve
*Attorney, Agent, or Firm*—Jeffrey C. Hood; Conley, Rose & Tayon

[57] ABSTRACT

A system and method for enabling applications written for SICL driver level software to operate with a VISA system. The present invention maps driver level event function calls from the SICL driver level library to VISA resource operations. This enables a VISA system to operate in conjunction with applications written for the SICL I/O library. The SICL Driver level library provides a completely different methodology for enabling and handling events than does a VISA system. According to the present invention, the method verifies and translate session identifier parameters from SICL functions to corresponding session identifiers in a VISA system. The method also verifies and translates interrupt condition parameters from SICL to corresponding event types in VISA for numerous event functions. Further, the method examines parameters in various SICL event functions and invokes the appropriate VISA operations to perform the indicated functions. In many instances, the method of the present invention is required to invoke multiple VISA operations to perform the desired functions indicated by a single SICL function. The method of the present invention performs many other operations necessary to map SICL event commands to the appropriate VISA operations.

43 Claims, 32 Drawing Sheets

Microfiche Appendix Included
(1 Microfiche, 97 Pages)

Example VISA Configuration

Example VISA Configuration

Example VISA Distributed Configuration

VISA Resource Classes vs. VISA Resources

| Address 0 | Address 24 | Address 51 |
|---|---|---|
| CPU | VXI Message Based Device | VXI Register Based Device |

Resource Classes Implemented
---
Read
Write
High Level Access
VXIbus Interrupt

Event Model Event Lifecycle

State Diagram for the Queuing Mechanism

State Diagram for the Callback Mechanism

```
status = viOpen(viDefaultRM, "VICO(GPIB1::5)", 0, 0, &vi);

status = viEnableEvent (vi, VI_EVENT_SERVICE_REQ, VI_QUEUE, VI_NULL);   ← Enable event for queuing status = viWrite(vi, "VOLT:MEAS?", 10, &retCount);   ← Perform operation which will generate event status = viWaitOnEvent (vi, VI_EVENT_SERVICE_REQ, timeout, &context);   ← Wait on or dequeue event if (status == VI_SUCCESS)
    status = viRead(vi, rdResponse, RESPONSE_LENGTH, &retCount);
```

Sample VISA, C Language-type Application (Event Queuing)

Fig. 25

```
status = viOpen(viDefaultRM, "VICO(VX12::20)", 0, 0, &vi);

status = viInstallHandler(vi, VI_EVENT_SERVICE_REQ, SRQHandlerFunc, VI_NULL);   ← Set callback function status = viEnableEvent(vi, VI_EVENT_SERVICE_REQ, VI_HNDLR, VI_NULL);   ← Enable event for callback ViStatus SRQHandlerFunc(ViSession vi, ViEventType eventType,
                        ViEvent context, ViAddr userHandle)   ← Callback
{
    /* user defined interrupt handler code*/
}
```

Sample VISA, C Language-type Application (Event Callbacks)

Fig. 26

SYSTEM AND METHOD FOR MAPPING DRIVER LEVEL EVENT FUNCTION CALLS FROM A PROCESS-BASED DRIVER LEVEL PROGRAM TO A SESSION-BASED INSTRUMENTATION CONTROL DRIVER LEVEL SYSTEM

This is a continuation-in-part of co-pending application Serial No. 08/238,480 titled "Method and Apparatus for Controlling an Instrumentation System" filed May 4, 1994, whose inventors were Bob Mitchell, Hugo Andrade, Jogen Pathak, Samson DeKey, Abhay Shah, and Todd Brower, and which was assigned to National Instruments Corporation.

APPENDIX

The present specification includes one microfiche appendix comprising one microfiche sheet which includes 97 pages.

FIELD OF THE INVENTION

The present invention relates to I/O control software for instrumentation systems, and more particularly to a system and method for mapping calls to driver level event function commands from a process-based driver level program to a session-based instrumentation control driver level system.

DESCRIPTION OF THE RELATED ART

An instrument is a device which collects data or information from an environment or unit under test and displays this information to a user. An instrument may also perform various data analysis and data processing on acquired data prior to displaying the data to the user. Examples of various types of instruments include oscilloscopes, digital multimeters, pressure sensors, etc., and the types of information which might be collected by respective instruments include voltage, resistance, distance, velocity, pressure, frequency of oscillation, humidity or temperature, among others.

In the past, many instrumentation systems comprised individual instruments physically interconnected with each other. Each instrument typically included a physical front panel with its own peculiar combination of indicators, knobs, or switches. A user generally had to understand and manipulate individual controls for each instrument and record readings from an array of indicators. Acquisition and analysis of data in such instrumentation systems was tedious and error prone. An incremental improvement in the manner in which a user interfaced with various instruments was made with the introduction of centralized control panels. In these improved systems, individual instruments were wired to a control panel, and the individual knobs, indicators or switches of each front panel were either preset or were selected to be presented on a common front panel.

A significant advance occurred with the introduction of computers to provide more flexible means for interfacing instruments with a user. In such computerized instrumentation systems, the user interacts with software executing on the computer system through the computer's video monitor rather than through a manually operated front panel to control one or more real world instruments. The software executing on the computer system can be used to simulate the operation of an instrument in software or to control or communicate with one or more real word instruments, these software created/controlled instruments being referred to as virtual instruments.

Therefore, modern instrumentation systems are moving from dedicated stand-alone hardware instruments such as oscilloscopes, digital multimeters, etc., to a concept referred to as virtual instrumentation. Virtual instrumentation comprises general purpose personal computers and workstations combined with instrumentation software and hardware to build a complete instrumentation system. In a virtual instrumentation system, a virtual instrument operating on a central computer controls the constituent instruments from which it acquires data which it analyzes, stores, and presents to a user of the system. Computer control of instrumentation has become increasingly desirable in view of the increasing complexity and variety of instruments available for use, and computerized instrumentation systems provide significant performance efficiencies over earlier systems for linking and controlling test instruments.

The various hardware interface options currently available for instrumentation systems can be categorized into four distinct types, including IEEE 488-controlled instruments (GPIB instruments), VXI bus instruments, plug-in data acquisition (DAQ) boards, and RS-232-controlled (serial) instruments. Background on these various hardware interface options is deemed appropriate.

The GPIB (general purpose interface bus) began as a bus designed by Hewlett-Packard in 1965, referred to as the Hewlett-Packard Interface Bus (HPIB), to connect their line of programmable instruments to their computers. National Instruments Corporation expanded the use of this bus to computers manufactured by companies other than Hewlett-Packard and hence the name General Purpose Interface Bus (GPIB) became more widely used than HPIB. The GPIB interface bus gained popularity due to its high transfer rates and was later accepted as IEEE standard 488-1975, and the bus later evolved to ANSI/IEEE standard 488.1–1987. In order to improve on this standard, two new standards were drafted, these being ANSI/IEEE 488.2–1987 and the SCPI (Standard Commands for Programmable Instruments) standard. The IEEE 488.2 standard strengthened the original standard by defining precisely how controllers and instruments communicated. The IEEE 488.2 standard removed ambiguities of the IEEE 488.1 standard by defining data formats, status reporting, a message exchange protocol, IEEE 488.2 controller requirements, and common configuration commands to which all IEEE 488.2 instruments must respond in a precise manner. Thus, the IEEE 488.2 standard created more compatible, more reliable systems that were simpler to program. In 1990, a new specification was developed referred to as the Standard Commands for Programmable Instruments (SCPI), which used the command structures defined in the IEEE 488.2 standard and formed a single, comprehensive programming command set that is used with any SCPI instrument. The SCPI standard simplified the programming process for manufacturers and users alike. Rather than having to learn a different command set for each instrument, the user could focus on solving the measurement tests of his or her application, thus decreasing programming time.

The VXI (VME extension for Instrumentation) bus is a platform for instrumentation systems that was first introduced in 1987 and was originally designed as an extension of the VME bus standard. The VXI standard has experienced tremendous growth and acceptance around the world and is used in a wide variety of traditional test and measurement and ATE applications. The VXI standard uses a mainframe chassis with a plurality of slots to hold modular instruments on plug-in boards. The VXI architecture is capable of interfacing with both message based instruments and register based instruments. A message based instrument is an instrument which is controlled by a string of ASCII characters, whereas a register based instrument is controlled by writing a bitstream of 1's and 0's directly to registers in the instrument hardware.

An instrumentation system using a data acquisition interface method typically includes transducers which sense physical phenomena from the process or unit under test and provide electrical signals to data acquisition hardware inside the computer system. The electrical signals generated by the transducers are converted into a form that the data acquisition board can accept, typically by signal conditioning logic positioned between the transducers and the data acquisition card in the computer system. A computer can also control an instrumentation system through the computer's serial or RS-232 port. There are currently thousands of instruments with an RS-232 interface.

Due to the wide variety of possible testing situations and environments, and also the wide array of instruments available, it is often necessary for a user to develop a program to control respective instruments in the desired instrumentation system. Therefore, implementation of such systems frequently require the involvement of a programmer to develop software for acquisition, analysis and presentation of instrumentation data.

The software architecture for a virtual instrumentation system comprises several components. The top level of the software architecture typically comprises an applications program used for high level control of the virtual instrument. Examples of high level applications programs for instrumentation control are LabVIEW and LabWindows from National Instruments Corp. Other examples of applications programs are HP VEE from Hewlett-Packard and Wavetest from Wavetek Corp. among others. These applications programs provide a user with the tools to control instruments, including acquiring data, analyzing data, and presenting data.

The applications programs mentioned above typically operate in conjunction with one or more instrument drivers to interface to actual physical instruments. For example, the LabVIEW and LabWindows applications software each include instrument libraries comprising drivers for more than three hundred GPIB, VXI, and RS-232 instruments from numerous manufacturers. The instrument drivers are designed to reduce a user's application development time by providing intuitive high level functions that relieve the user of complex low level instrument programming.

A software level referred to as driver level software is below the instrument driver level. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over a physical connection between the computer and instruments. There have been many implementations of I/O control software, some of which were custom-developed by end users, while others were developed by vendors and sold along with interface hardware. Examples of driver level software include NI-488, NI-DAQ, and NI-VXI driver level software offered by National Instruments, Inc., which have become a de facto standard in the industry.

A primary problem with traditional driver level software is that there generally is no common look and feel and no common programming constructs. Because of various inconsistencies in driver level software, developers of instrument driver software, who many times are non-professional software engineers, typically do not use the full platform capabilities available, such as interrupt handling, register based control, and triggers. Further, developers of instruments driver software often do not include centralized management of resources, and thus instrument drivers may conflict. As a result, various implementations of instrument driver software do not use the full functionality of the instrument being controlled. Also, there is no common creation mechanism or requirements, no common source code and no common testing criteria.

One important requirement of I/O control software is referred to as I/O interface independence. When users write application software to control a specific set of instruments, they typically want their applications to work with a variety of hardware for a respective I/O interface, perhaps even supplied from different vendors. A user controlling GPIB instruments with a PC, for example, may want to use a plug-in GPIB card in one application and use an external SCSI-to-GPIB interface box in another application. A consistent I/O software interface for these two approaches would allow the user to do this without modifying his application software code.

Another aspect of interface independence has become of interest to more and more users, especially those who are using VXI technology. Rather than simply developing software that is hardware independent for a respective I/O interface, i.e., software for a particular GPIB instrument that is independent of the computer-to-GPIB interface hardware used, many users desire the ability to write software that is also independent of the type of I/O interface used, such as whether GPIB, VXI, serial or some other type of connection is used between the computer and the instrument. For example, a user may want to write one piece of software to control an instrument that has options for both GPIB and RS-232 control. As another example, a user may want to write software to control a VXI instrument and have that software work whether the computer is embedded in the VXI chassis, connected to VXI through the MXI bus, or connected to VXI through a GPIB-to-VXI translator.

Therefore, instrumentation programmers desire the ability to write software that is independent of hardware, operating system and I/O interface. It is also greatly desirable for the software API of an instrumentation system to have a common look and feel as well as more consistent implementations for cross-platform development and integration, cross-product development and integration, and the reusability of source code. Also, the new I/O control software architecture should not only provide access to new capabilities, but must also bridge with the past and provides a smooth migration path for the installed base and huge investment in existing systems.

One attempt to create a driver level software layer that is I/O interface independent is the Standard Instrument Control Library (SICL) developed by Hewlett-Packard Corp. SICL uses a methodology of creating APIs with interface independence that includes a purely top-down approach, which merges the capabilities of a group of hardware interfaces into a two-piece API. The first element of the API includes the overlap between all of the interfaces, referred to as the core, and the second element is the set of all of the interface-specific routines. The top down interface independence approach attempts to create a common API among two or more types of hardware interfaces. In other words, top down interface independence involves creating an API that uses the same set of functions for similar capabilities between different instrument control hardware, for example, making GPIB reads and writes use the same API functions as RS-232 reads and writes. The process of creating an interface independent API using the top-down approach involves determining the different hardware interfaces to combine, compiling a list of the capabilities of each of the hardware interfaces (read, write, abort, config, and so on), and merging these lists to create a list of overlapping, or core functionality.

U.S. patent application Ser. No. 08/238,480 titled "Method and Apparatus for Controlling an Instrumentation System" filed May 4, 1994 discloses a system referred to as the Virtual Instrument Software Architecture (VISA), which is being formulated as IEEE standard SCC-20. The VISA system is used for controlling instrumentation systems and for providing a user with the capability to develop instrument drivers and application software for controlling instrumentation systems. The system provides a software architecture which defines the control and management of an instrumentation system. The VISA system utilizes a device resource independence approach whereby the individual capabilities of devices are broken down into a plurality of objects called resources, and these resources are then used to develop instrument drivers or instrument control applications. The VISA system is independent of I/O interface type, operating system, and programming language while also providing a common look and feel and consistent API to the user. A VISA system provides a single I/O interface or library which enables a user to control all types of instruments using any of the various types of I/O interfaces.

It is desirable that applications developed for the SICL driver level software be compatible with VISA driver level software. Therefore, a system and method is desired for mapping calls to driver level function commands in the SICL driver level library to a device resource based instrumentation control driver level system such as a VISA system. This would enable a VISA system to provide access to new capabilities while also bridging with the past and providing a smooth migration path for the installed base and huge investment in existing systems.

One particularly difficult area in mapping applications based on the SICL Driver level library to the VISA resource model is event handling. SICL event function commands are process-based and thus affect multiple sessions within a given process. The VISA event model is session based whereby event handling is determined on a per session basis. In addition, the SICL Driver level library provides a different methodology for enabling and handling events than does a VISA system. Further, the VISA model provides a Waiting Queue for events which is not available in SICL. Therefore, a system and method is desired for mapping event function calls from the SICL Driver level library to the VISA resource model.

SUMMARY OF THE INVENTION

The present invention comprises a system and method for enabling applications written for SICL driver level software to operate with a device resource based VISA system. The present invention comprises a system and method for mapping driver level event function calls from the SICL Driver level library to VISA resource operations. This enables a VISA system to operate in conjunction with applications written for the SICL I/O library.

As discussed in the background section, SICL event function commands are process-based and thus affect multiple sessions within a given process. In contrast, the VISA event model is session-based where event handling is determined on a per session basis. In addition, the SICL Driver level library provides a completely different methodology for enabling and handling events than does a VISA system.

According to the present invention, the method verifies and translates session identifier parameters from SICL function calls to corresponding session identifiers in a VISA system. The method also verifies and translates interrupt condition parameters from SICL to corresponding event types in VISA for numerous event functions. Further, the method examines parameters in various SICL event function calls and invokes the appropriate VISA operations to perform the indicated functions. In many instances, the method of the present invention is required to invoke multiple VISA operations to perform the desired functions indicated by a single SICL function.

VISA uses a single operation referred to as viEnableEvent which includes parameters that determine whether to place an event in a Wait Queue, a Callback Queue or to directly invoke a Callback Handler. In SICL, a function referred to as isetintr enables specific interrupts and functions referred to as iintron and iintroff enable and disable execution of handlers. If interrupts are not enabled, then when an interrupt happens, nothing occurs. If interrupts are enabled in SICL, then the two SICL functions iintron and iintroff determine whether the event is placed on the Callback Queue or goes directly to the Callback Handler. Further, in the SICL Driver level library, installing an interrupt handler and enabling interrupt conditions are treated as separate, independent procedures performed by the SICL functions ionintr and isetintr.

Therefore, the system and method of the present invention monitors for both SICL ionintr and isetintr calls for respective processes. When the SICL function isetintr is called, the system and method of the present invention determines whether the SICL function ionintr has previously been called to determine whether or not to enable events. Likewise, when the SICL function ionintr is called, the system and method of the present invention determines whether the isetintr function has already been called and then enables events accordingly.

The SICL functions iintron and iintroff can be nested. Thus, if the SICL function iintroff is called multiple times, the application is required to call the iintron function the same number of times to reenable the execution of asynchronous handlers. Therefore, the present invention maintains a Count of the number of times the iintroff function has been called. When the iintron function is called, the count value is examined, and the method of the present invention invokes VISA operations depending on the value of the count variable.

For certain SICL calls, such as ionintr, ionsrq, and ionerror, a VISA system cannot call a SICL application's handler directly because different prototypes are used. Therefore, when one of these SICL functions is called, the system and method of the present invention installs a handler that can be called by a VISA system and which in turn calls the desired user's handler. The system and method of the present invention also analyzes parameters passed in these calls and stores these in a data structure for later use.

The SICL functions iintron, iintroff, and ionerror are process based functions, i.e., these functions operate on a per process basis. Therefore, the system and method of the present invention maintains information on which VISA sessions correspond to processes in the SICL Driver level library. When one of these functions is called, the system and method of the present invention determines which sessions correspond to this process and also determine which events are enabled in the respective sessions. The system and method of the present invention then performs the appropriate operations, depending upon which sessions correspond to this SICL process and which events are enabled or disabled in the respective sessions.

Therefore, the present invention comprises a system and method for mapping driver level event function calls from the SICL driver level library to the VISA driver level library. This enables a VISA system to operate in conjunction with applications written for the SICL I/O library.

BRIEF DESCRIPTION OF THE DRAWINGS

A better understanding of the present invention can be obtained when the following detailed description of the preferred embodiment is considered in conjunction with the following drawings, in which:

FIG. 25 illustrates a VISA C language-type application using event queuing;

FIG. 26 illustrates a VISA C language-type application using event callbacks;

DETAILED DESCRIPTION OF THE PREFERRED EMBODIMENT

Incorporation by Reference

U.S. patent application Ser. No. 08/238,480 titled "Method and Apparatus for Controlling an Instrumentation System" filed May 4, 1994, whose inventors were Bob Mitchell, Hugo Andrade, Jogen Pathak, Samson DeKey, Abhay Shah, and Todd Brower, and which was assigned to National Instruments Corporation, is hereby incorporated by reference in its entirety, including the appendices therein. The above-referenced patent application discloses a system referred to as the Virtual Instrument Software Architecture (VISA), which is being formulated as IEEE standard SCC-20.

U.S. Pat. No. 5,361,336 titled "Method for Controlling an Instrument Through a Common Instrument Programming Interface" is also hereby incorporated by reference in its entirety, including the Standard Instrument Control Library Specification, attached as Appendix A to the above patent.

U.S. patent application Ser. No. 08/438,438 titled "System and Method for Handling Events in an Instrumentation System" filed May 10, 1995, whose inventors are Abhay Shah, Jogen Pathak, Bob Mitchell, Hugo Andrade, Samson DeKey, and Todd Brower, and which is assigned to National Instruments Corporation, is hereby incorporated by reference in its entirety, including the appendices therein.

U.S. patent application Ser. No. 08/436,148 titled "System And Method For Mapping Calls To Function Commands In A Driver Level Library To Operations In A Device Resource Based Instrumentation Control Driver Level System" filed May 8, 1995, whose inventors are Bob Mitchell, Hugo Andrade, Dan Mondrik, Jogen Pathak, Samson DeKey, Abhay Shah, and Todd Brower, and which is assigned to National Instruments Corporation, is hereby incorporated by reference in its entirety, including the appendices therein.

Appendices

The present application includes one Appendix labeled Appendix B. Appendix B comprises pseudocode for implementing the system and method according to one embodiment of the present invention. Appendix B comprises part of this specification as though fully and completely set forth herein.

3.0 Instrumentation I/O Interface Options

Figure 1:
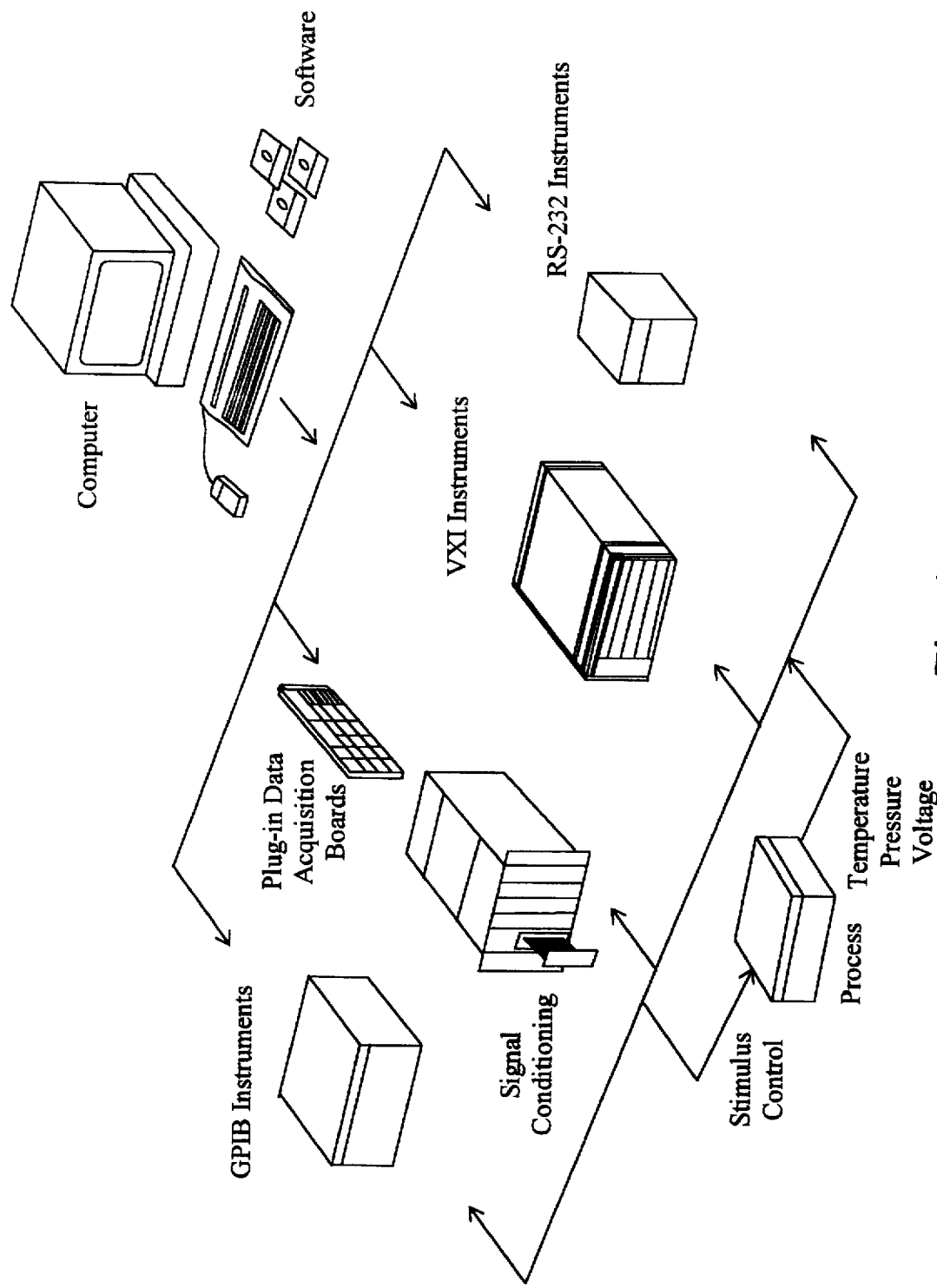
FIGS. 1 and 2 illustrate representative instrumentation control systems of the present invention including various I/O interface options.
Figure 2:
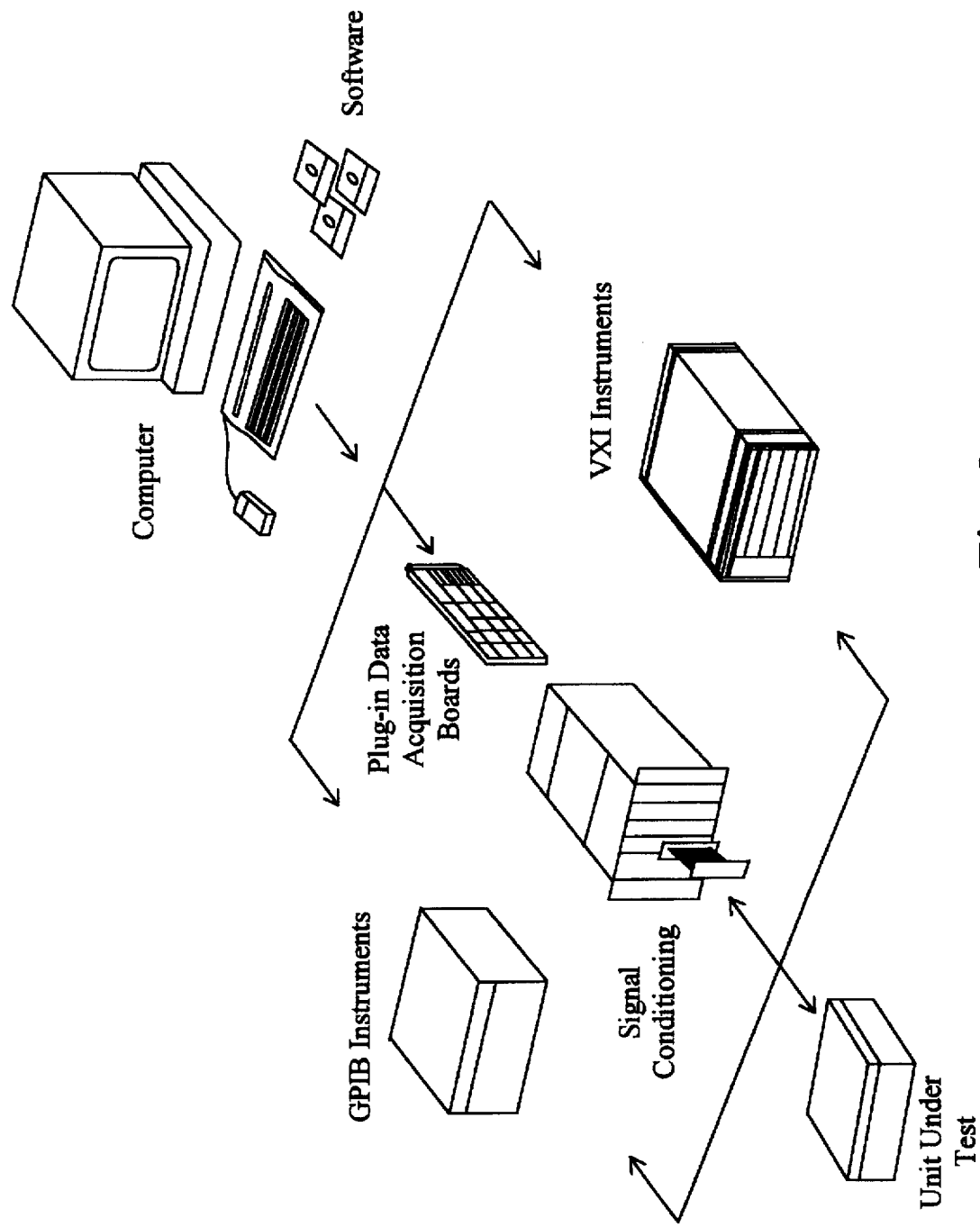

Referring now to FIGS. 1 and 2, the various hardware I/O interface options currently available for instrumentation systems are shown. FIG. 1 illustrates the choices available in a data acquisition and control application, and FIG. 2 illustrates the choices available in a test and measurement application. As shown, a computer system can interface with a process or unit under test using a number of methods, including IEEE 488-controlled instruments (GPIB instruments), plug-in data acquisition (DAQ) boards, RS-232 controlled (serial) instruments, and VXI bus instruments. In the present disclosure, the term "instrument" is used to refer to "traditional" instruments such as GPIB instruments and RS-232 instruments as well as VXI bus instruments configured as plug-in cards to a VXI backplane. The term "instrument" is also used to refer to a data acquisition board in a computer system. In addition, the term "instrument" also refers to "virtual instruments" (combinations of hardware/software instruments) executing on a computer system, including VISA resources. The term "instrumentation system" is used herein to refer to test and measurement systems as well as process control and modelling systems, among others.

Computer System Block Diagram

Figure 3:
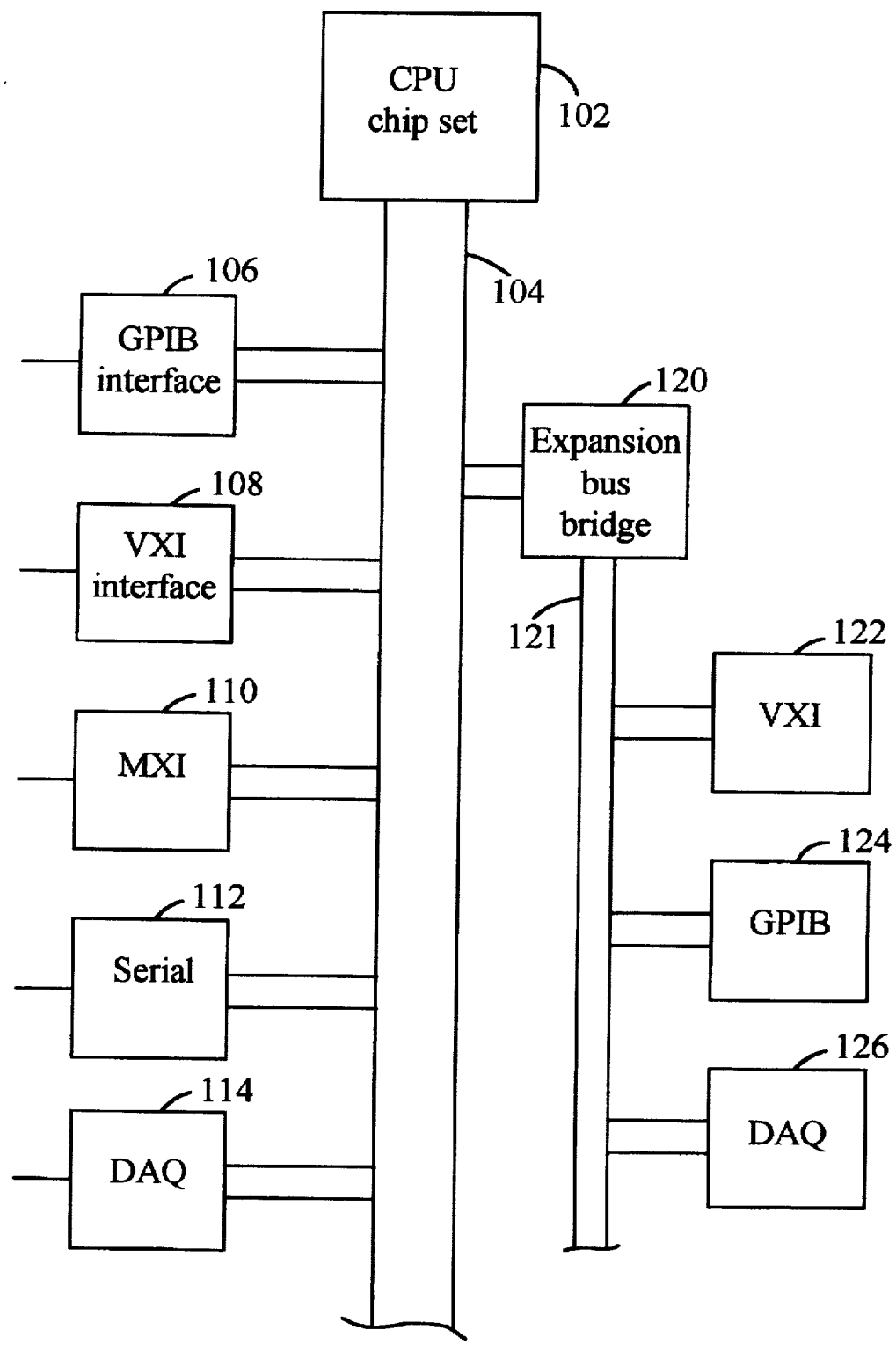
FIG. 3 is a block diagram of a computer system used to control an instrumentation system.

Referring now to FIG. 3, a block diagram of the computer system illustrated in FIGS. 1 and 2 is shown. It is noted that any type of computer system configuration can be used as desired, and FIG. 3 illustrates a representative embodiment. It is also noted that the computer system may be a general purpose computer system as shown in FIGS. 1 and 2, a computer implemented on a VXI card installed in a VXI chassis, or other types of embodiments. As shown, the computer system includes a central processing unit (CPU) 102 which includes a CPU bus 104. The CPU bus 104 is preferably a Peripheral Component Interconnect (PCI) bus, although other types of buses may be used. A GPIB control block 106 connects to the CPU bus 104 and interfaces the CPU 102 to one or more GPIB instruments, as desired. The GPIB control block 106 is preferably the TNT4882 chip produced by National Instruments Corp. A VXI control block 108 couples between the CPU bus 104 and one or more VXI instruments. A MXI interface 110 interfaces the CPU 102 to one or more MXI instruments and a serial interface 112 interfaces to one or more serial instruments. A data acquisition card 114 receives data from a device or unit under test (UUT) and provides this data to the CPU 102. An expansion bus bridge 120 is coupled between the CPU bus 104 and an expansion bus 121. The expansion bus 121 may be any of a number of types, including an AT or ISA (Industry Standard Architecture) bus, MCA (MicroChannel Architecture) bus, EISA (Extended Industry Standard Architecture) bus, NuBus, etc. A VXI interface 122, GPIB interface 124, and DAQ interface 126 are preferably coupled to the expansion bus 121, as shown.

Software Architecture (prior art)

Figure 4:
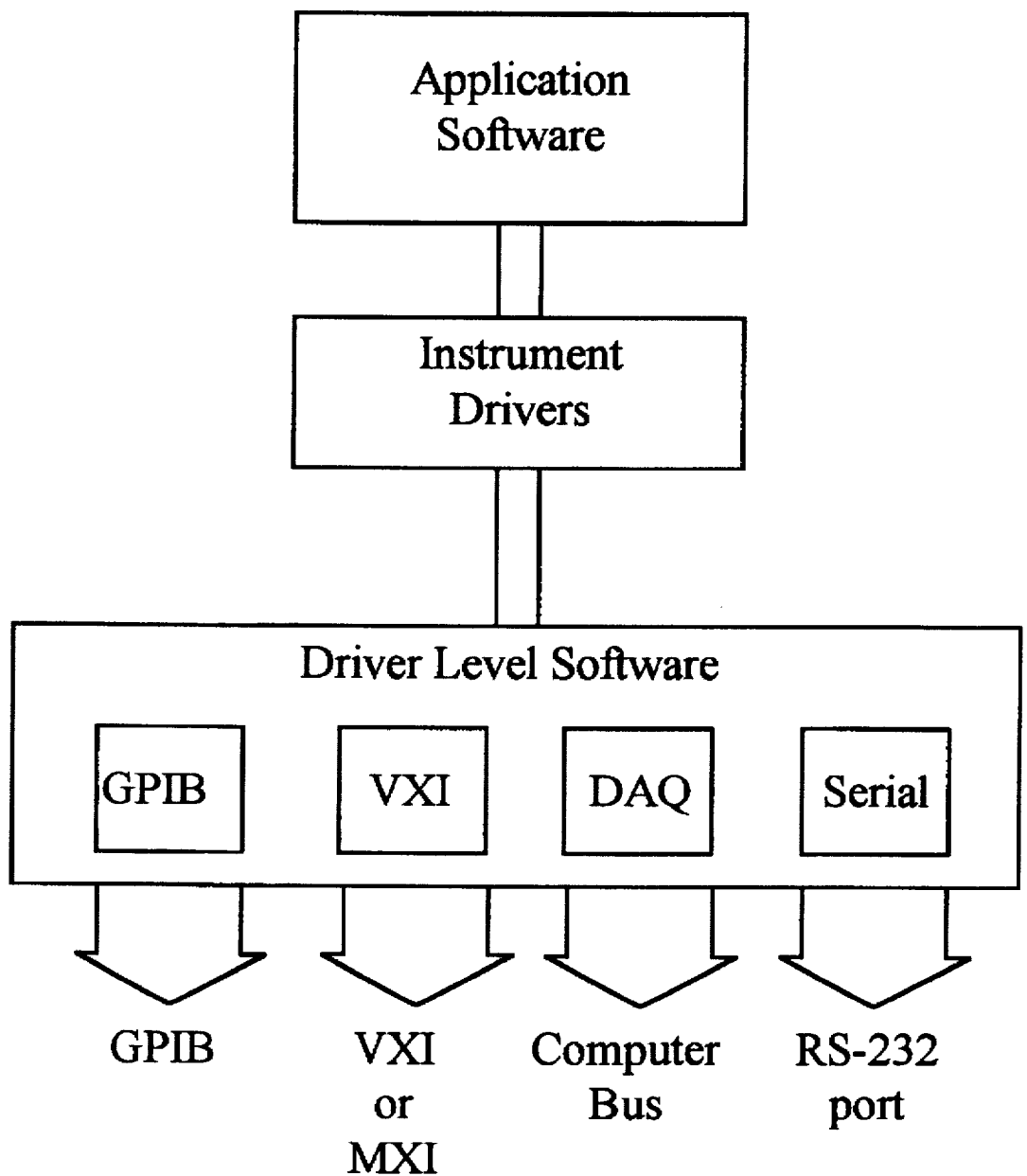
FIG. 4 illustrates the current software architecture for instrumentation systems.

Referring now to FIG. 4, a diagram illustrating a representative software architecture for an instrumentation system is shown. As discussed in the background section, the top level of the software architecture typically comprises an applications program used for high level control of the virtual instrument. The applications programs typically operate in conjunction with one or more instrument drivers to interface to actual physical instruments. The instrument drivers are designed to reduce a user's application development time by providing intuitive high level functions that relieve the user of complex low level instrument programming.

A software level referred to as driver level software or I/O control software is below the instrument driver level. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over a physical connection between the computer and instruments. In general, applications software is developed for a particular type of driver level library.

The computer system implements a system and method according to the present invention which enables applications developed for the SICL (Standard Instrument Control Library) driver level library to work properly with a VISA system. The system and method of the present invention maps calls to SICL event function commands to VISA event operations.

VISA Conversion

Figure 5:
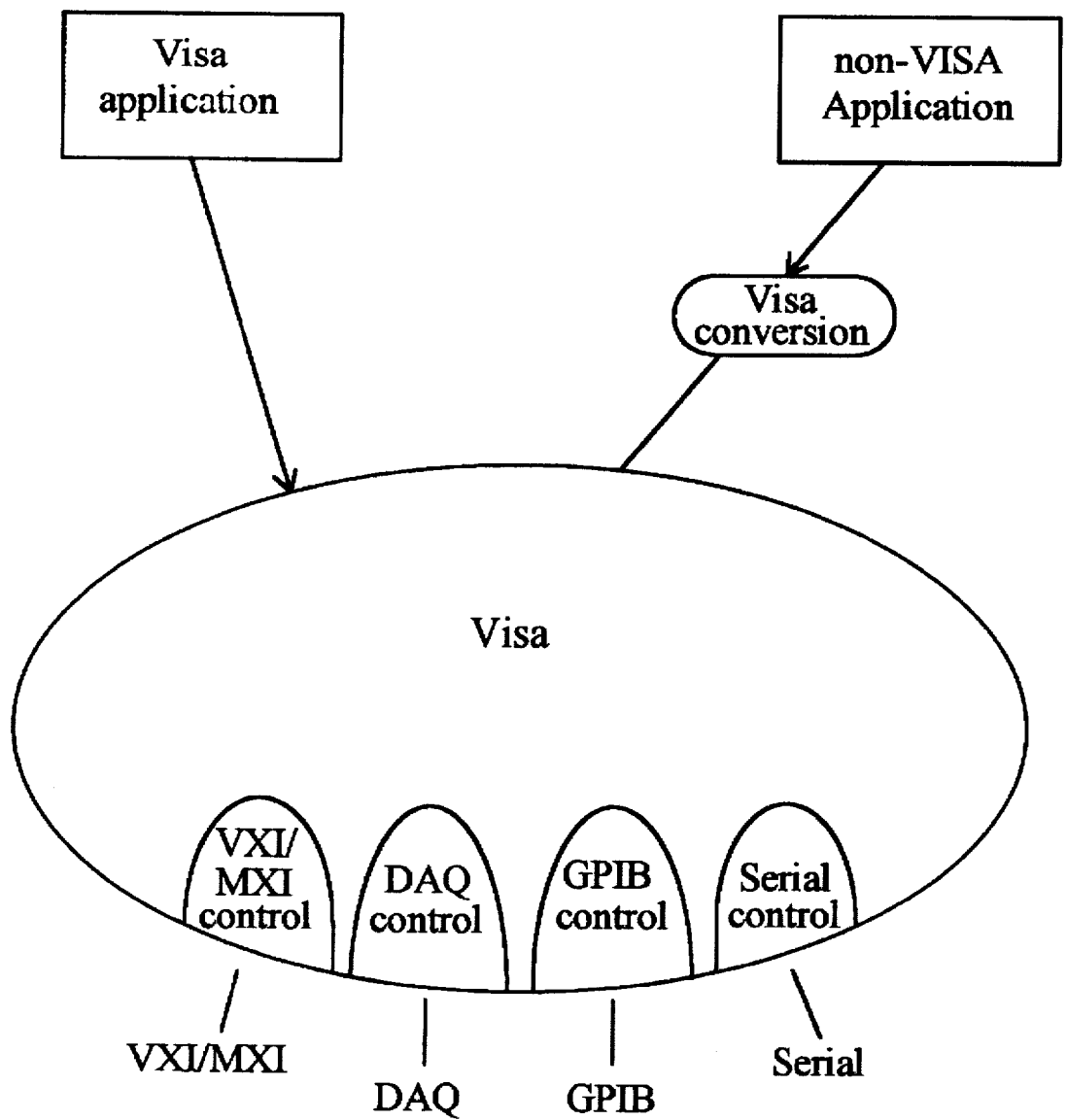
FIG. 5 illustrates the VISA software architecture of the present invention including a VISA conversion block for mapping non-VISA applications to a VISA system

Referring now to FIG. 5, a diagram illustrating the VISA software architecture is shown. As shown, an application created according to the VISA driver level library, referred to as a VISA application, interfaces directly to a VISA system which in turn interfaces directly to hardware. FIG. 5 also illustrates a non-VISA application, i.e., a software application which was not developed according to the method and apparatus of the present invention. A non-VISA application can comprise an application developed to conform to other driver level software standards, including NI-VXI, NI-488, and NI-488.2 from National Instruments Corp., or the Standard Instruments Control Library (SICL) from Hewlett-Packard, among others. A non-VISA application interfaces to a VISA system through a VISA conversion method. As mentioned above, the present invention comprises a system and method for converting calls to SICL event function commands to VISA event operations. The SICL to VISA conversion method according to the present invention is described more fully below A, and pseudocode for this conversion method is described in Appendix 2.

VISA Background

Background on the Virtual Instrument Software Architecture (VISA), referred to as a VISA system, is deemed appropriate. VISA utilizes a device resource independence model which involves breaking a device down into its individual, nonoverlapping (orthogonal) capabilities. VISA also uses object oriented concepts to simplify the creation of higher level applications. In VISA, the individual capabilities of devices are broken down into a plurality of objects called resources, and these resources are then used to develop instrument drivers or instrument control applications. The device resource independence model and its object oriented nature enable VISA to be independent of I/O interface type, operating system, and programming language. Thus VISA provides a single I/O interface or library which enables a user to control all types of instruments using any of the various types of I/O interfaces.

Due to its object oriented nature, VISA can operate transparently in distributed environments. In other words, the object oriented nature of VISA provides a direct mechanism for the distribution of I/O control software modules across any type of network. Also, the programming model of a VISA is the same regardless of the location of a piece of VISA I/O control software and/or the location of the corresponding instrumentation hardware that the software controls. Further, the object oriented nature VISA allows a user to use the objects or resources provided to construct higher level resources, such as instrument drivers and/or applications software, as desired.

In a VISA system, a resource class generally is a definition of a particular capability of a device (such as read, write, trigger, etc.). A resource class is also the specific definition of how to create a resource, i.e., a template for the creation of resources. Each resource can have a set of characteristics called attributes associated with it. For example, an individual GPIB write port resource would have an attribute of End of Transfer Mode (send EOI with the last byte of the transfer) while a VXI interrupt resource would have an attribute of enabled/disabled for reception.

A resource is a particular implementation or instance of a resource class. In general, the term "resource" is synonymous with the connotation of the word "object" in object-oriented architectures. Thus a resource is a particular implementation (or "instance" in object-oriented terms) of a resource class. More particularly, a resource is the particular instance of an instrument control resource class for a specific capability of a specific device in the system (e.g. a GPIB read port of a GPIB device at primary address 5). In a VISA system, every defined software module is a resource, and a resource is defined as the smallest, logical, divisible capability of an instrumentation device controllable through its external connections. For example, a device might have a GPIB port that includes one or more read ports, write ports, status bytes, and so on, and/or the device could have a VXI port that provides control over individual TTL triggers, ECL triggers, VXI interrupt lines, as well as message-level communication. Each of these capabilities is a resource.

Resources fall into one of two general types, these being a basic resource and a compound resource. A basic resource is a wholly contained software module that does not require other resources for operation. A compound resource is a software module that utilizes one or more basic and/or compound resources to provide a higher level of operation.

A resource comprises three elements: a set of attributes associated with the resource, a set of events that are asynchronously received by the resource, and a set of operations that control the resource. For example, a commander read port for a device might have attributes such as end of string character, timeout value, and protocol; one event might be a user abort; the only operation other than basic template operations would be a read operation (with parameters of a buffer and a number of bytes to transfer).

An attribute is a value within a resource which reflects a characteristic of the operational state of the resource. A user's application reads an attribute value to determine the current state of the resource, for example, how the resource is processing an operation, or how the resource should operate when something occurs. A user application sets an attribute to change the way in which the resource operates. For example, if a user's application desires to use a write resource and wants to use a direct memory access (DMA) method, the user's application would set the attribute transfer mode to DMA and then perform the write operation. In this manner, an attribute changes the characteristics in which a resource operates.

An event object is an asynchronous occurrence that can arrive independently of normal sequential execution of the process running in a system. Examples of events include, but are not limited to, items such as hardware interrupts, exceptions, triggers, signals, and system messages (e.g., a system failure notification). The events that can occur in a VISA system include local events that are received by only a single resource and global events that can affect more than one resource. In the preferred embodiment, local events are handled by the resource that receives them, and global events are handled by a resource referred to as the VISA Resource Manager resource. In a VISA system, events allow information exchange.

An operation is an action defined by a response that can be performed on a resource, and operations are the primary method of communication among resources and between applications. After a session is established between an application and a resource, the application can communicate with the resource by invoking operations on the resource. Each resource describes the operations which it supports (which are described further below) and the resource and the application exchange information through the parameters of the operations.

A session is a term used to designate a communication channel between a user's application and a resource. In other words, a session is a communication channel that binds an application and a resource. In essence, a session is an instance of a resource, much the same way a resource is an instance of a resource class. Resources can have multiple sessions open to them. In addition, a resource can control one or more other resources.

VISA includes a grouping of resource classes referred to as the instrument control resource classes for controlling GPIB, VXI, and serial instruments as well as data acquisition boards. The instrument control resource classes can be logically partitioned into common resource classes and device-specific resource classes. Common resource classes are those class definitions that have some commonality with one or more types of devices (e.g. both GPIB and VXI or both VXI and a trigger board) or that can be defined in a manner such that the resource class is independent of the device with which it is communicating (e.g. formatted I/O). Specific physical device resource classes (also called hardware-specific classes) are those resource classes that have no commonality with other types of resource classes and are used to control device and/or interface level features specifically for a single type of device.

An object referred to as "ViObject" is the most basic object in a VISA system. ViObject supports attributes, i.e., supports setting and retrieving attributes, with viSetAttribute and viGetAttribute, and closing with viClose. In a VISA system an object cannot have sessions to it, but rather an application can only have a pointer to an object.

A resource referred to as the VISA Resource Template inherits from viObject and defines an interface including a well-defined set of services that is used by all resources, i.e., each VISA resource derives its interface from the VISA Resource Template. The VISA Resource Template defines a set of control services including location and searching, life cycle control, characteristic control, and access control. The location and search services include services for finding a resource in order to establish a communication link to the resource. The location and search service uses an operation referred to as viFindRsrc. The life cycle control services include the creation and deletion of sessions or links to resources and include operations referred to as viOpen, viClose, viAttachRsrc, viDetachRsrc, and viTerminate. The characteristic control services include operations which manipulate attributes to set and retrieve the status of resources, including operations referred to as viSetAttribute, viSetRsrcAttribute, viGetAttribute, and viGetRsrcAttribute. The access control services are used to control the types of accesses that can be made to resources, including operations referred to as viLock(), viLockRsrc(), viUnlock(), and viUnlockRsrc().

The VISA Resource Template also defines various communications services among resources and between applications and resources. The two methods of communication among resources and between applications are operation invocation, i.e., invoking operations on a resource, and the exchange of information through events. After establishing a session to a resource, an application can communicate with the resource by invoking operations on the resource. These operations include the operations defined in the VISA Resource Template described above as well as the operations supported by the particular resource. The resource and application exchange information through the parameters of the operations. The VISA Resource Template also defines event reporting, including callbacks, queuing, and waiting services for resources during system events, exceptions, and resource defined events.

The VISA Resource Manager derives its interface from the VISA Resource Template and is responsible for managing, controlling, and distributing resources within the system, including the instrument control resources. The VISA Resource Manager shields resource implementations from having to know about most details of resource management and distribution of instrument control resources within a system.

Applications use the VISA Resource Manager to create sessions with particular resources within a system. The VISA Resource Manager presents a common interface to all instrument control resources in the system regardless of their physical location. The VISA Resource Manager includes the following responsibilities: registration of resources (from the system point of view), un-registration of resources, locating resources (location search), management of session creation, modification and retrieval of resource attributes, operation invocation, event reporting, and access control, among others. The VISA Resource Manager includes an API for these management needs, and all defined resources may use these capabilities. The VISA Resource Manager allows a user to open a session to any resource in the system, including only single device capabilities such as a single trigger line or single write port on a device.

At startup of the VISA system, a method is invoked which configures the instrumentation system. This method involves determining the respective hardware and instruments available within the system as well as determining the logical address of the respective instruments in this system. The method determines the classes available within the system and uses the determined classes and the hardware configuration to create or instantiate resources. These newly created resources are then registered with the VISA Resource Manager so that the VISA Resource Manager is aware of their presence. The registration process comprises providing entry points of the resource to the VISA Resource Manager, including a description of the operations, a description of the attributes, a description of the exit conditions, the location of the files, and a description of the files themselves. Due to the hierarchical nature in which some resources use other resources for their operation, the instantiation and registration process may require the creation and instantiation of other resources.

Once a plurality of resources have been created and registered with the VISA Resource Manager, these resources can be used to create instrument control applications. In the present disclosure, the user of a VISA system can either be a client or developer. A client uses the resources in a VISA system to create applications, such as instruments drivers, that are not themselves resources. A developer, on the other hand, uses resources as a client or incorporates functionality from the resources available in a VISA system to create higher level applications that are resources. A developer can create a higher level resource that uses other resources, much the same way that a client uses resources, or the developer can create a higher level resource that incorporates functionality from one or more resources. As an example of a higher level resource, a developer can develop a resource that embodies all of the functionality of a type of instrument, such as a voltmeter. This resource can then be used to control any type of voltmeter using any type of I/O interface.

When VISA is implemented in the C++ programming language, a resource class is preferably implemented as a C++ class. A resource instance or resource is implemented in C++ as an instance of the class. A session is preferably implemented by creating a data structure that mirrors the resource instance and also includes references to local data that is local to the session. This involves allocating memory for a new structure, creating a mirror of the resource and providing the session with a reference to local data that is local to the session.

VISA System

Figure 6:
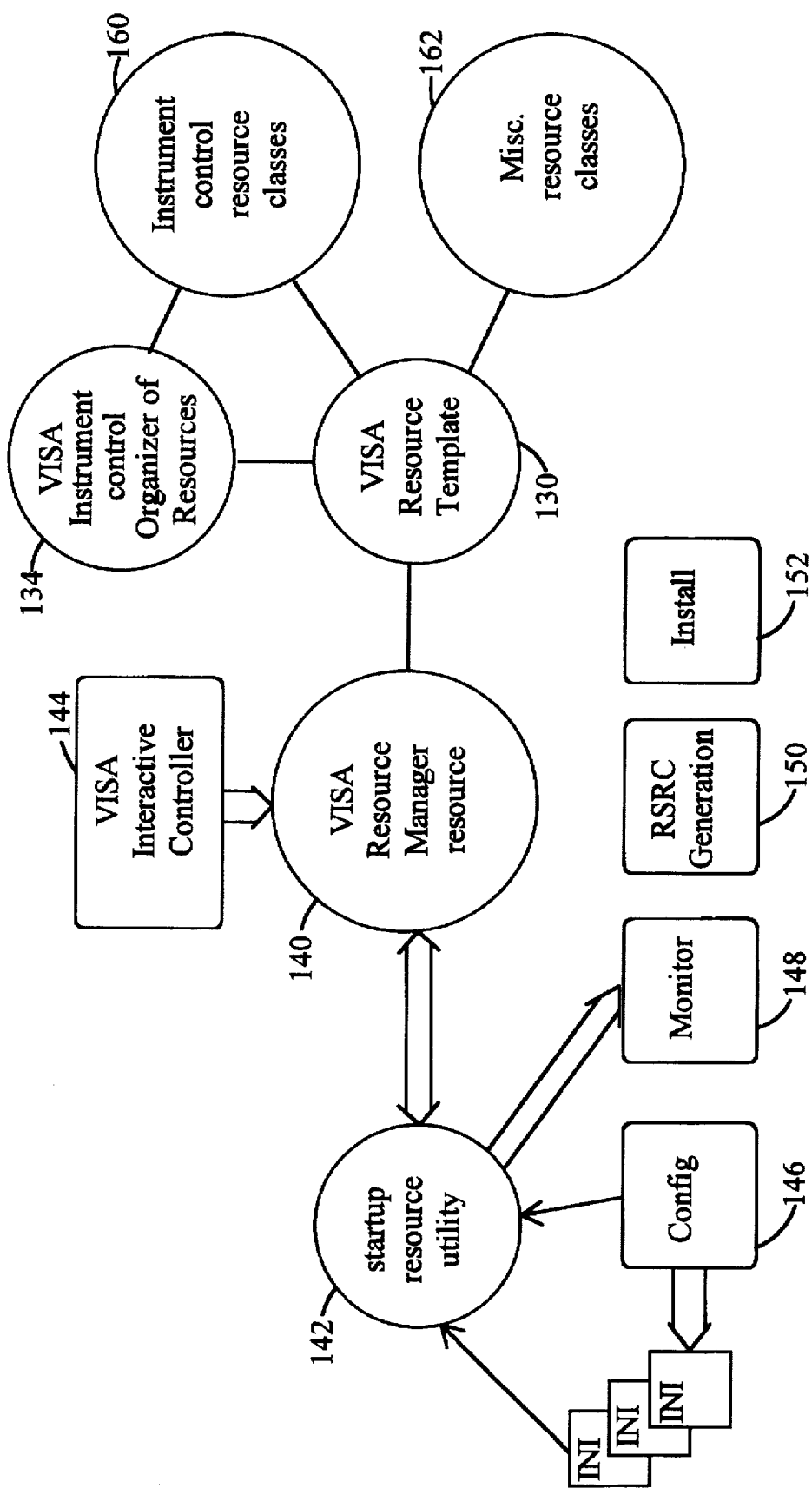
FIG. 6 illustrates the components of a VISA system according to the present invention.

Referring now to FIG. 6, the various elements comprising a VISA system are shown, including various utilities for installation and configuration. As shown, a VISA system includes a VISA Resource Template 130, a VISA Resource Manager resource 140, which acts as the primary or runtime resource manager, a startup resource utility 142, a VISA interactive controller 144, a configuration utility 146, a monitor utility 148, a resource generation utility 150, and an install utility 152. In addition, a VISA instrumentation system includes a plurality of instrument control resource classes 160 as well as other resource classes 162, as desired, which preferably incorporate their interface from the VISA Resource Template 130. A VISA system may further include a VISA Instrument Control Organizer (VICO) resource 134 that incorporates its interface from the VISA Resource Template 130 and can be used to control the instrument control resource classes 160.

The instrument control resources 160 and other resources 162 act as building blocks for user applications. In the present disclosure the term "user" is intended to include a client which uses the available resources to create client applications as well as a developer who either uses or incorporates the available resources to develop new, possibly higher level, resources. It is noted that a VISA system can include one or more additional runtime resource managers as well as additional groupings of resource classes for additional functionality, as desired.

The VISA Resource Template 130 is essentially a base class from which all new resources derive their interface. Each resource in a VISA system includes a set of basic capabilities, i.e., basic attributes, operations and events. The VISA Resource Template 130 allows a developer of new resources to reuse these basic capabilities which each resource requires.

In one embodiment of the invention, a VISA system includes a VISA Resource Metaclass (not shown) which defines the default manner in which resource classes are defined in a VISA system. In other words, the VISA Resource Metaclass defines the standard way in which resources are instantiated and destroyed.

The VISA Resource Manager 140 is responsible for managing, controlling, and distributing resources within the system, including instrument control resources. Applications use the VISA Resource Manager 140 to create sessions to particular resources within a system. In the present application, a session is defined as a communication channel to a resource within the system and a session designates a reference to an individual resource being controlled. The VISA Resource Manager 140 presents a common interface to all instrument control resources in the system regardless of their physical location. The VISA Resource Manager 140 includes the following responsibilities: creation and deletion of resources, finding resources (location search), session creation, modification and retrieval of individual resource attributes, operation invocation, event reporting, and concurrency control (locking), among others. The VISA Resource Manager 140 includes an API for these management needs and all defined resources may use these capabilities. The VISA Resource Manager 140 shields resource implementations from needing to know about most details of resource management and distribution of instrument control resources within a system. The VISA Resource Manager 140 is the runtime resource manager. In contrast, the startup resource utility 142 is invoked at startup and its function is to register the resources in the system with the VISA Resource Manager 140. The various operations, attributes, and events of the VISA Resource Manager resource 140 are discussed further below.

In the preferred embodiment, the instrument control resource classes 160 comprise resource classes for controlling GPIB, VXI, and serial instruments, as well as data acquisition (DAQ) boards. The instrument control resource classes can be logically partitioned into common resource classes and device-specific or interface-specific resource classes. Common resource classes are those class definitions that have some commonality with one or more types of devices (e.g. both GPIB and VXI or both VXI and a trigger board) or that can be defined in a manner such that the resource class is independent of the device or interface with which it is communicating (e.g. formatted I/O). Device-specific or interface-specific instrument control resource classes (also called hardware-specific resource classes) are those resource classes that have no commonality with other types of resource classes and are used to control specific devices and/or interface level features because the capabilities of the bus or connection to the device cannot be separated from the individual device. An example is the Interface clear line on the GPIB bus, which is a line that is bussed across the entire GPIB bus and thus affect other devices. The resource classes 162 may comprise classes for process control, among others.

As described above, a session is a term used to designate a communication channel between a user's application and a resource. A function call or operation on the VISA Resource Manager 140 referred to as viOpen instructs the VISA Resource Manager 140 to create a session between a resource and a user's application, which may also be a resource. In many instances it is desirable for more than one application to be able to control an instrument. In these instances it is necessary to have more than one communication channel to the respective resource that controls the respective capability of the instrument. The session is the mechanism used to project the interface for a resource out to the user application. Thus, a session is a communication channel that binds an application and a resource. In essence, a session is an instance of a resource, much the same way a resource is an instance of a resource class. Resources can have multiple sessions open to them. In addition, a resource can control one or more other resources. The VISA Resource Manager 140 allows a user to open a session to any resource in the system, including single device capabilities such as a single trigger line or a single write port on a device.

A VISA system can include a resource referred to as the VISA Instrument Control Organizer (VICO) 134 which allows for the creation of user-defined resource groupings (virtual instruments). A virtual instrument, in this context, refers to a unique session to a resource to provide the functionality of a traditional, stand-alone instrument. The VICO 134 is included in this embodiment to provide a higher level user interface so that users can communicate with instrumentation at a higher level of abstraction. The VICO 134 is a resource similar to other resources in the system. VICO 134 is unique, however, in the sense that it serves only one unique service specifically for instrument control resources. With VICO 134, applications can create sessions that can communicate with any number and type of Instrument control resources. In other words, a single VICO session can control all aspects of one or more complete devices. Thus VICO 134 encapsulates features of the resources for users who require a simple interface.

The startup resource utility 142 registers and unregisters resources with the VISA Resource Manager 140 at startup, monitors VISA Resource Manager events, and provides the capability to monitor resources and events. The resource monitor utility 148 monitors the resources that are registered to the VISA Resource Manager 140 and also monitors active instantiations of resources to the VISA Resource Manager 140. The resource monitor 148 also monitors for specific events occurring in the VISA Resource Manager 140, and maintains a log or history of user specified VISA actions. The configuration utility 146 operates to modify default attributes for resources as directed by a user, as well as modify information needed by the resource to find the hardware. The configuration utility 146 also notifies the resource manager of new resources in the system, creates aliases for groupings of resources, and informs the resource manager of these aliases.

The VISA interactive control utility 144 interactively and dynamically finds resources and executes methods of those resources. The VISA interactive control utility 144 also simulates VISA actions/events. It is noted that the capabilities of this utility are derived from the VISA application programming interface. The resource generation utility generates a resource usable by the configuration utility and the resource manager utility from a user defined set of entry points and structures. The Install utility 152 provides a common look and feel to installation of components within the VISA system.

Example VISA System

Figure 7:
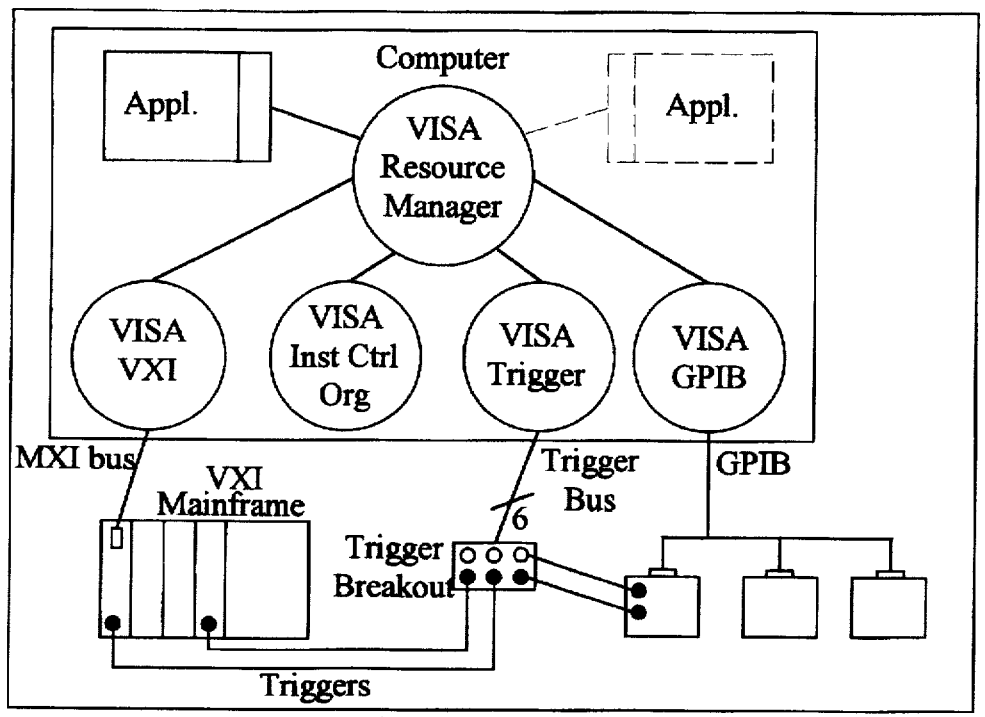
FIGS. 7 and 8 illustrate two examples of a VISA instrumentation system in a non-distributed and distributed environment, respectively.
Figure 8:
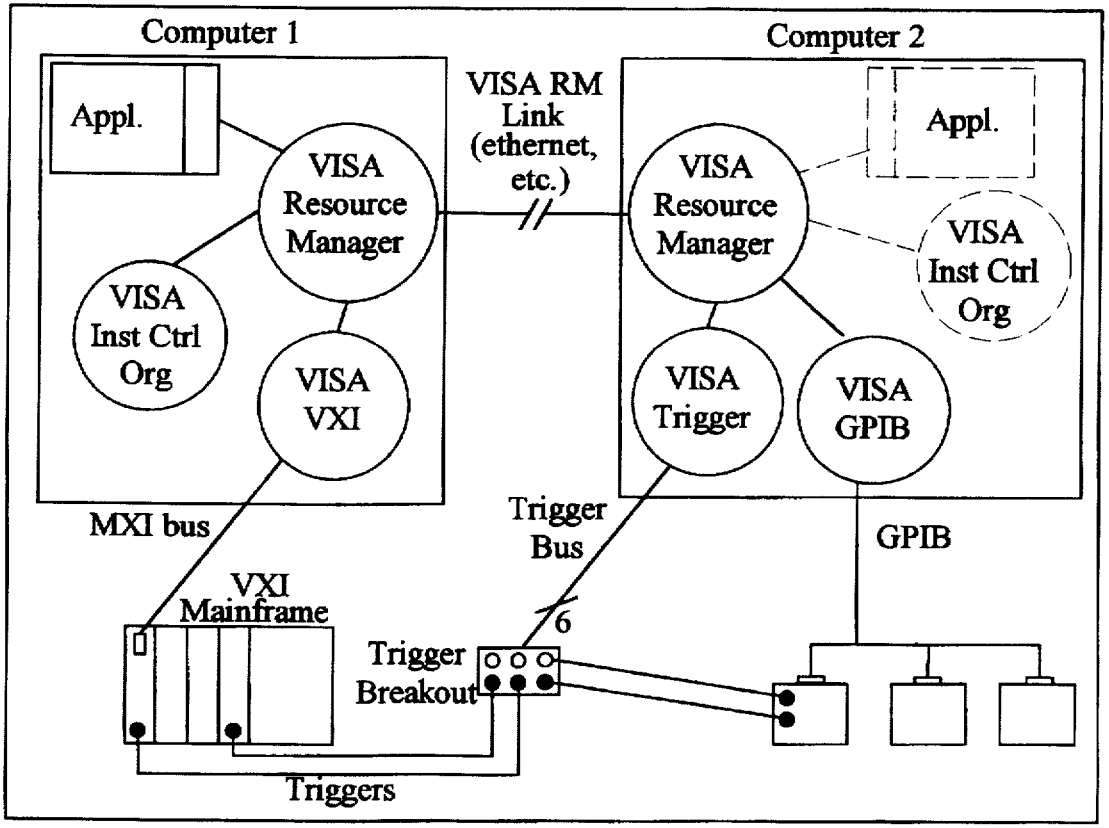

Referring now to FIGS. 7 and 8, block diagrams illustrating various embodiments of a VISA system are disclosed. FIG. 7 shows a VISA system where one or more applications control various resources, such as a VXI resource, a trigger resource, and a GPIB resource through the VISA Resource Manager 140. The applications also use the VICO 134 to aid in the creation and use of these resources. As shown, the VXI resource controls the VXI mainframe through a MXI bus. The trigger resource controls a trigger breakout device through a trigger bus and the GPIB resource controls one or more GPIB instruments through the GPIB bus.

FIG. 8 illustrates an embodiment of a VISA system in a distributed environment. As discussed further below, the device resource independent and object oriented nature of VISA allows the system to be readily adapted to distributed environments. FIG. 8 illustrates an embodiment where two or more computers in different physical locations are used to control a single instrumentation system. As shown, computer 1 includes an application which controls one or more resources. The application controls a VXI resource and VICO 134 through the VISA Resource Manager 140. Computer 2 includes an application that also controls one or more resources through a second VISA Resource Manager 140, in this example, a trigger resource and a GPIB resource, as well as VICO 134. Computer 1 communicates with computer 2 through a VISA Resource Manager link such as a network connection such as Ethernet. As shown in Computer 2, the dashed lines around VICO 134 and the application indicate that the application and VICO 134 are not necessary in computer 2, and the application in conjunction with the VISA Resource Manager 140 in computer 1 can control all of the resources and the VISA Resource Manager 140 in computer 2, as desired.

VISA Resource Manager

As discussed above, the VISA Resource Manager 140 is a runtime resource manager that controls resources in a VISA system. The VISA Resource Manager 140 is also itself a resource, and includes attributes, operations and events like any other resource. The VISA Resource Manager 140 provides the mechanisms in a VISA system to control and manage resources. This includes but is not limited to the assignment of unique resource addresses, unique resources ID's, operation invocation, and event management. The VISA Resource Manager resource 140 is a resource like all other resources in the system and it derives its interface from the VISA Resource Template 130. The VISA Resource Manager resource 140 provides connectivity to all of the VISA resources registered with it. The VISA Resource Manager 140 gives applications control and access to individual resources and provides the services described below. The VISA Resource Manager 140 utilizes the resources available to it to service requests from the applications and other resources requiring service of a given resource.

The VISA Resource Manager 140 provides access to all of the resources that are registered with it. The VISA Resource Manager 140 is therefore at the root of a subsystem of connected resources. There could be more than one root level resource manager resource in a complete VISA system, and each descendent could itself act as a resource manager of its own. Each of these resource managers has the capability to cover multiple host computers and can be a distributed entity over the network on which the subsystem is being implemented An application can use the VISA Resource Manager 140 as a monitoring point for a particular subsystem by enabling the generation of events on the system defined events, which include the notification of resources or sessions being killed or becoming inactive. Resource level control of attributes allows an application to set and retrieve global attributes without having to open a session to this resource.

The VISA Resource Manager 140 handles all system events that occur in a VISA system, and the attributes comprised within the VISA Resource Manager resource 140 comprise global attributes about the version of the system and the characteristics of the system. The majority of operations that are included within the VISA Resource Manager resource 140 and which can be used to act upon the VISA Resource Manager 140, such as get and set attribute, generate event, etc. are also on the majority of instrument control resources 160 and miscellaneous resources 162. Thus, the VISA Resource Manager 140 follows the resource model of the resources it controls, i.e., the resource manager follows its own constraints. For example, in one embodiment of a VISA system, an additional resource is provided which acts in a similar manner to the VISA Resource Manager 140. This resource is used to control subnetworks of resources, with the VISA Resource Manager 140 managing the created resource which acts similarly to the VISA Resource Manager 140.

Figure 9:
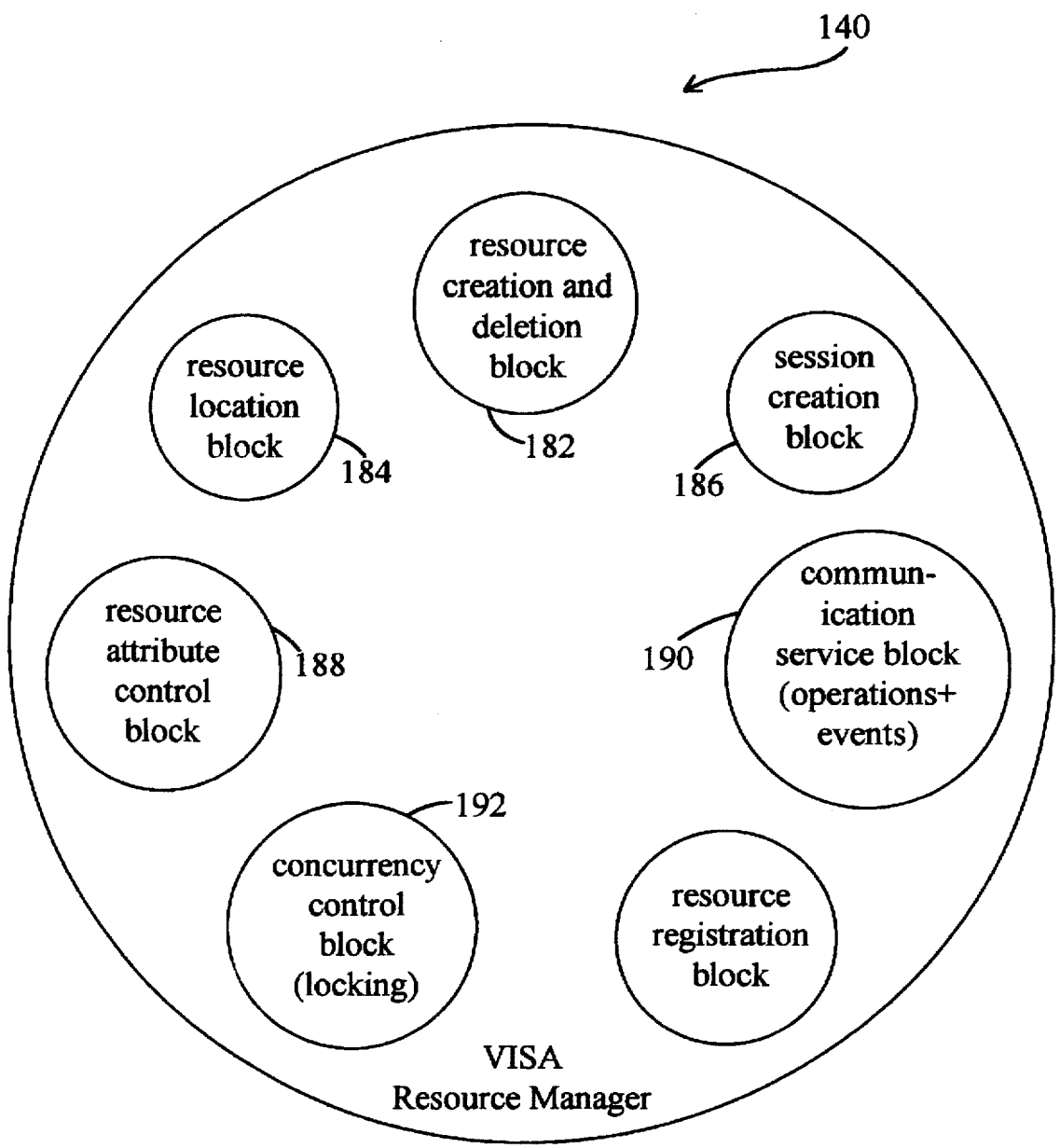
FIG. 9 illustrates the components of the VISA Resource Manager.

Referring now to FIG. 9, a diagram illustrating the various components which comprise the VISA Resource Manager 140 is shown. As shown, the VISA Resource Manager 140 includes a resource creation and deletion block 182, a resource location block 184, a session creation block 186, a resource attribute control block 198, a communication service block 190, a concurrency control block 192, and a miscellaneous function block 194. These blocks comprised within the VISA Resource Manager 140 provide basic resource control and communication services to applications.

The resource creation and deletion block 182 is involved with creating and deleting resources. The resource location block 184 finds a resource in order to establish a communication link to the resource. This search is based on a unique symbolic name. The session creation block 186, also referred to as the life cycle control block, controls the life cycle of sessions to resources established by the requests of applications, i.e., this block creates and deletes sessions to a resource.

The resource attribute control block 188 includes attribute manipulation operations to set and retrieve the status of resources. This block also performs the initialization or setup of resource attributes while creating sessions to respective resources. The operation in the VISA Resource Manager 140 for modifying attributes is viSetAttribute() and the operation in the VISA Resource Manager 140 that retrieves the value of an attribute is viGetAttribute(). The resource attribute control block 188 also allows applications to set up access modes to resources.

The communication service block 190 manages sessions between applications and resources. The primary method of communication among resources and between applications and resources is referred to as operation invocation, i.e., invoking an operation on the respective resource to direct the resource to perform the desired function. The communication service block 190 also allows the exchange of information through events Operation Invocation refers to communication between an application and a resource using operations defined in the resource. After establishing a session to a resource, an application can communicate with the resource by invoking operations on the resources. Each resource describes the operations supported by the resource and the resource and application exchange information through the parameters of the operations.

As discussed above, in a VISA system an event is defined as an asynchronous occurrence which can be generated either in hardware or in software. The communication service block 190 in VISA Resource Manager traps all the system events that require system-wide action. The system events can be generated either by resources or by other external occurrences. These events are then reported back to the application. An application can be notified on occurrence of an event by two different mechanisms. In case of exceptions, the events are reported back only to the application thread causing the exception.

Resource Classes

Figure 10:
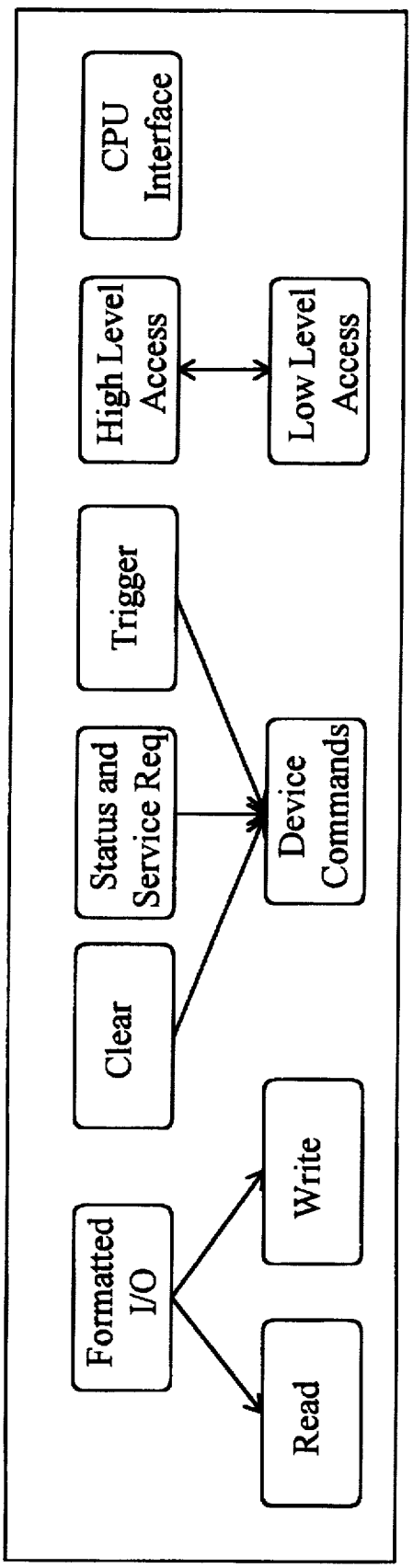
FIG. 10 illustrates the common instrument control resource classes.
Figure 11:
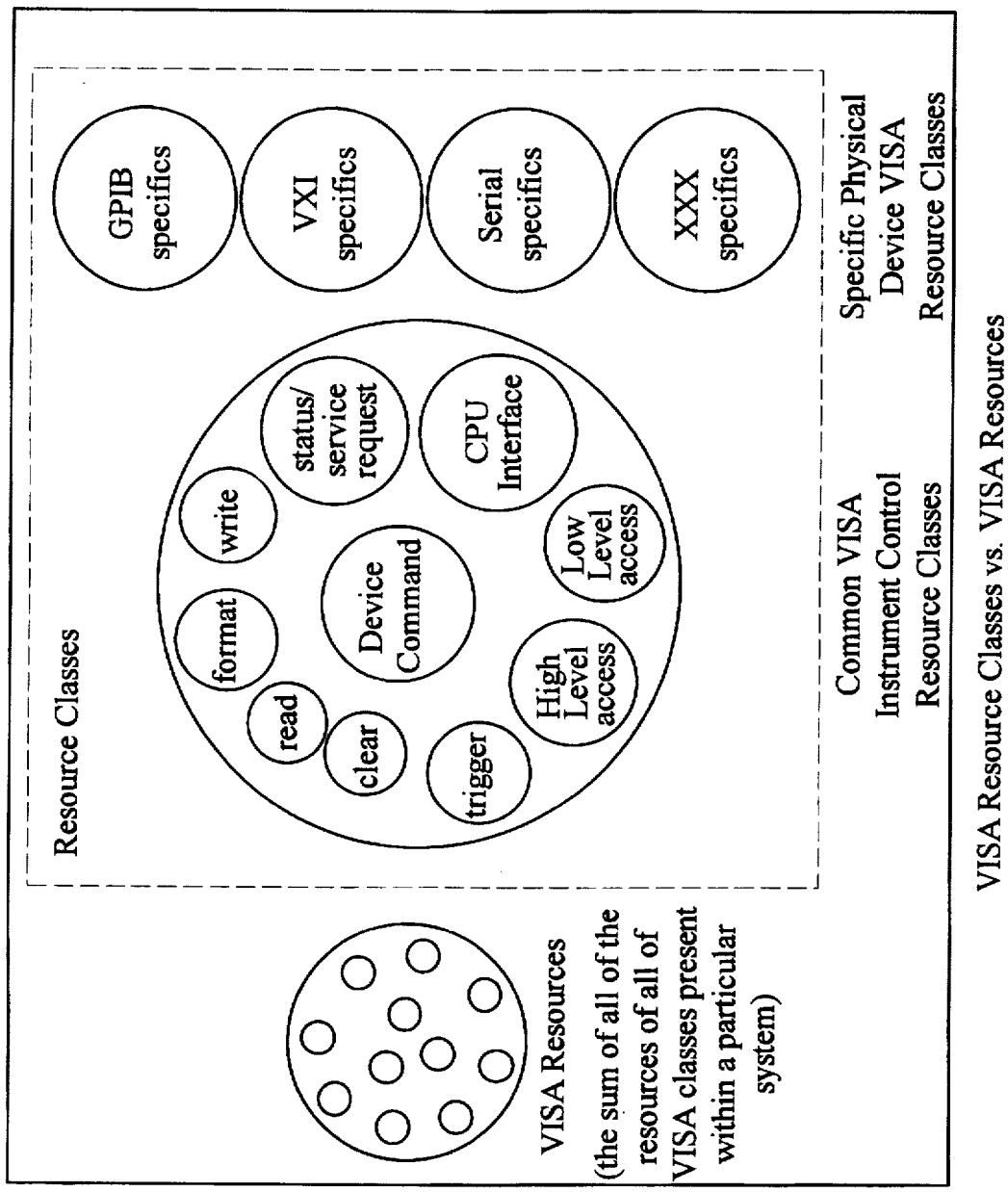
FIG. 11 illustrates the common instrument control resource classes and specific physical device VISA resource classes and corresponding VISA resources.
Figure 12:
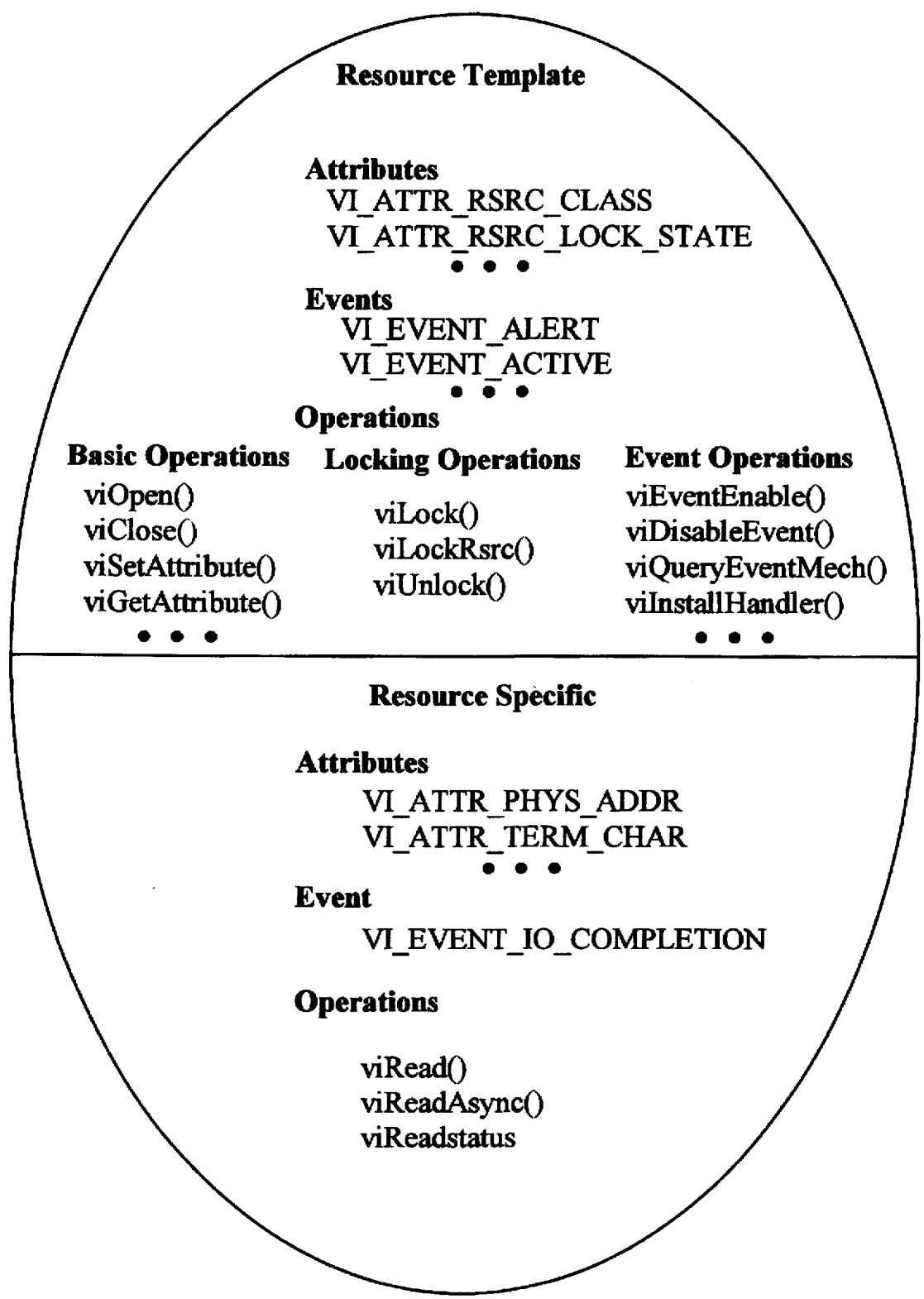
FIG. 12 illustrates the organization of an instrument control resource class.

FIGS. 10 and 11 illustrate the resource classes comprised in the instrument resource classes block 160. The instrument control resource classes 160 are provided to encapsulate the various operations of a device, including reading, writing, trigger, and so on. A VISA instrument control resource, like any other resource, is defined by the basic operations, attributes, and events of the VISA Resource Template 130. For example, modifying the state of an attribute is performed via the operation viSetAttribute(), which is defined in the VISA Resource Template 130. Although the instrument control resource classes 160 do not have viSetAttribute() listed in their operations, they provide this operation because it is defined in the VISA Resource Template. Likewise, the instrument control resource classes 160 provide all of the operations included in the VISA Resource Template 130 because they are defined in the VISA Resource Template 130. As shown in FIG. 12, from the basic interface of the VISA Resource Template, i.e., this basic set of attributes, events, and operations, each resource class adds its specific operations, attributes and events, which allow the class to act as a template for resources which perform the dedicated task of the class, such as sending a string to a message-based device.

FIG. 11 illustrates the instrument control resource classes comprised in a VISA system. FIG. 11 also shows that the sum of all the VISA instrument control resource classes is comprised of the common instrument control resource classes and the specific device (interface or hardware specific) instrument control resource classes.

FIG. 10 illustrates the common resource classes, these being: Formatted I/O, Read, Write, Clear, Status and Service Request, Trigger, Device Commands, High Level Access, Low Level Access, and CPU Interface. FIG. 10 also shows the hierarchy or relationship of the common instrument control classes. As shown, the Formatted I/O resource class relies on the Read and Write resource classes for its operation. Thus, when a resource from the Formatted I/O resource class is instantiated, the resource opens sessions to the appropriate Read and Write resources. Likewise, the Clear, Status and Service Request, and Trigger resource classes rely on the Device Commands resource class for their operation. The High Level Access resource class relies on the Low Level Access resource class for its operation. Some resources, such as the CPU Interface resource, have no interrelation with any other instrument control resource. This does not imply that the resource cannot be used with the other resources, but that it does not use, and is not used by, any other instrument control resource.

FIG. 11 illustrates the manner in which the instrument control resource classes include the common instrument control resource classes and the specific physical device instrument control resource classes. As shown, the specific physical device resource classes include GPIB specific, VXI specific, and serial specific resource classes.

The instrument control resource classes are discussed in detail in Appendix 1 of U.S. patent application Ser. No. 08/238,480, previously referenced and incorporated by reference herein in its entirety. As shown in Appendix 1 of the patent application referenced above, each of the instrument control resource classes include a number of attributes, operations, and events for implementing respective capabilities of instruments.

These instrument control resource classes in a VISA system, including the common resource classes and the hardware specific resource classes, are also listed below.

| Resource Class | Abbr. Name | Standard Name |
|---|---|---|
| VISA Resource Manager Resource | VRM | VI_RSRC_VISA_RM |
| VISA Instrument Control Organizer | VICO | VI_RSRC_VISA_IC_ORG |
| Write Resource | WR | VI_RSRC_WR |
| Read Resource | RD | VI_RSRC_RD |
| Formatted I/O Resource | FIO | VI_RSRC_FMT_IO |
| Trigger Resource | TRIG | VI_RSRC_TRIG |
| Clear Resource | CLR | VI_RSRC_CLR |
| Status/Service Request Resource | SRQ | VI_RSRC_SRQ |
| High Level Access Resource | HLA | VI_RSRC_HL_ACC |
| Low Level Access Resource | LOLA | VI_RSRC_LL_ACC |
| Device Specific Commands Resource | DEVC | VI_RSRC_DEV_CMD |
| CPU Interface Resource | CPUI | VI_RSRC_CPU_INTF |
| GPIB Bus Interface Control Resource | GBIC | VI_RSRC_GPIB_INTF |
| VXIbus Device Configuration Resource | VXDC | VI_RSRC_VXI_DEV_CONF |
| VXIbus Interface Control Resource | VXIC | VI_RSRC_VXI_INTF |
| VXIbus Slot 0 Resource | VXS0 | VI_RSRC_VXI_SLOT_0 |
| VXIbus System Interrupts Resource | VXSI | VI_RSRC_VXI_SYS_INTR |
| VXIbus Signal Processor Resource | VXSP | VI_RSRC_VXI_SIG_PROCESSOR |
| VXIbus Signal Resource | VXS | VI_RSRC_VXI_SIG |
| VXIbus Interrupt Resource | VXIN | VI_RSRC_VXI_INTR |
| VXIbus Extender Interface Resource | VXEI | VI_RSRC_VXI_EXTDR |
| Asynchronous Serial Bus Interface Control Resource | ASIC | VI_RSRC_ASRL_INTF |

Referring again to FIG. 12, a diagram illustrating the organization of one of the instrument control resources 160 is shown. As previously noted, each resource within a VISA system, including the instrument control resources 160, derive functionality from the VISA Resource Template 130. FIG. 12 illustrates the manner in which each instrument control resource 160 includes a portion (upper portion) that derives its interface from the VISA Resource Template 130 and a portion (lower portion) that comprises an interface that is specific to that particular resource.

Figure 13:
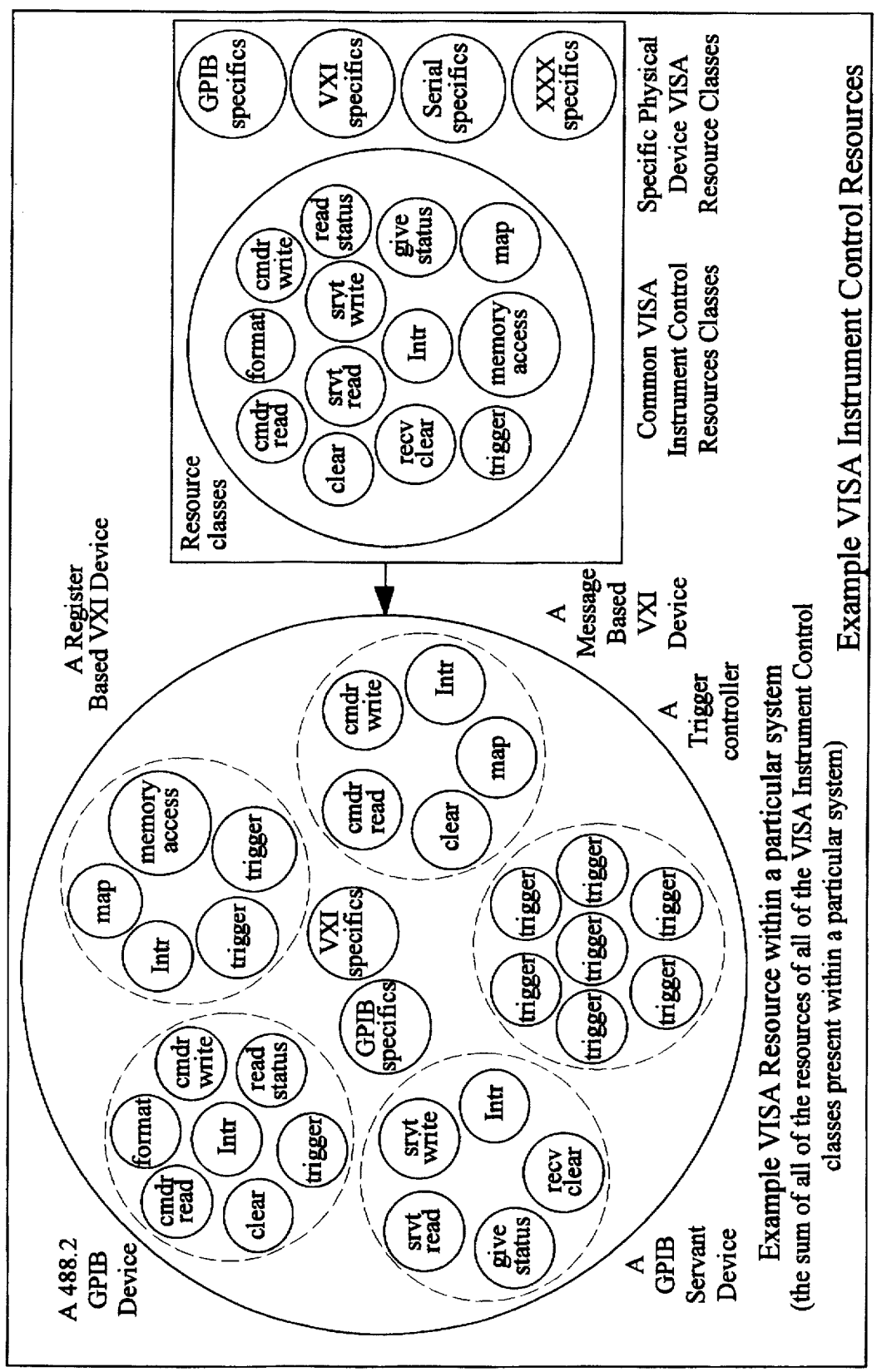
FIG. 13 illustrates example VISA instrument control resources.

FIG. 13 shows an example of the resources that might be created when a system has been powered up and in use. The resources in this example are based loosely on the example configuration shown in FIGS. 7 and 8. In this example, resources are created for the VXI system, the GPIB system, and the trigger controller. It is noted that only the device capabilities that each device has are reflected in the set of resources in the system. It is also noted that the medium size circles are provided around groupings of resources simply as a visual grouping organization, and these circles are not intended to connote any meaning regarding system operation or usage of resources. From the standpoint of the VISA Resource Manager, each resource in the system is treated exactly the same. A resource class referred to as INSTR is an abstraction which includes different resources for different types of instruments. For example, an INSTR resource for a register-based device only includes High Level and Low Level Access resources, while an INSTR resource for a GPIB device has Read, Write, Trigger, Poll and Clear resources. An INSTR resource for a message-based device includes Read, Write, Trigger, Poll and Clear resources in addition to High Level and Low Level Access resources.

VISA System Operation

Figure 14:
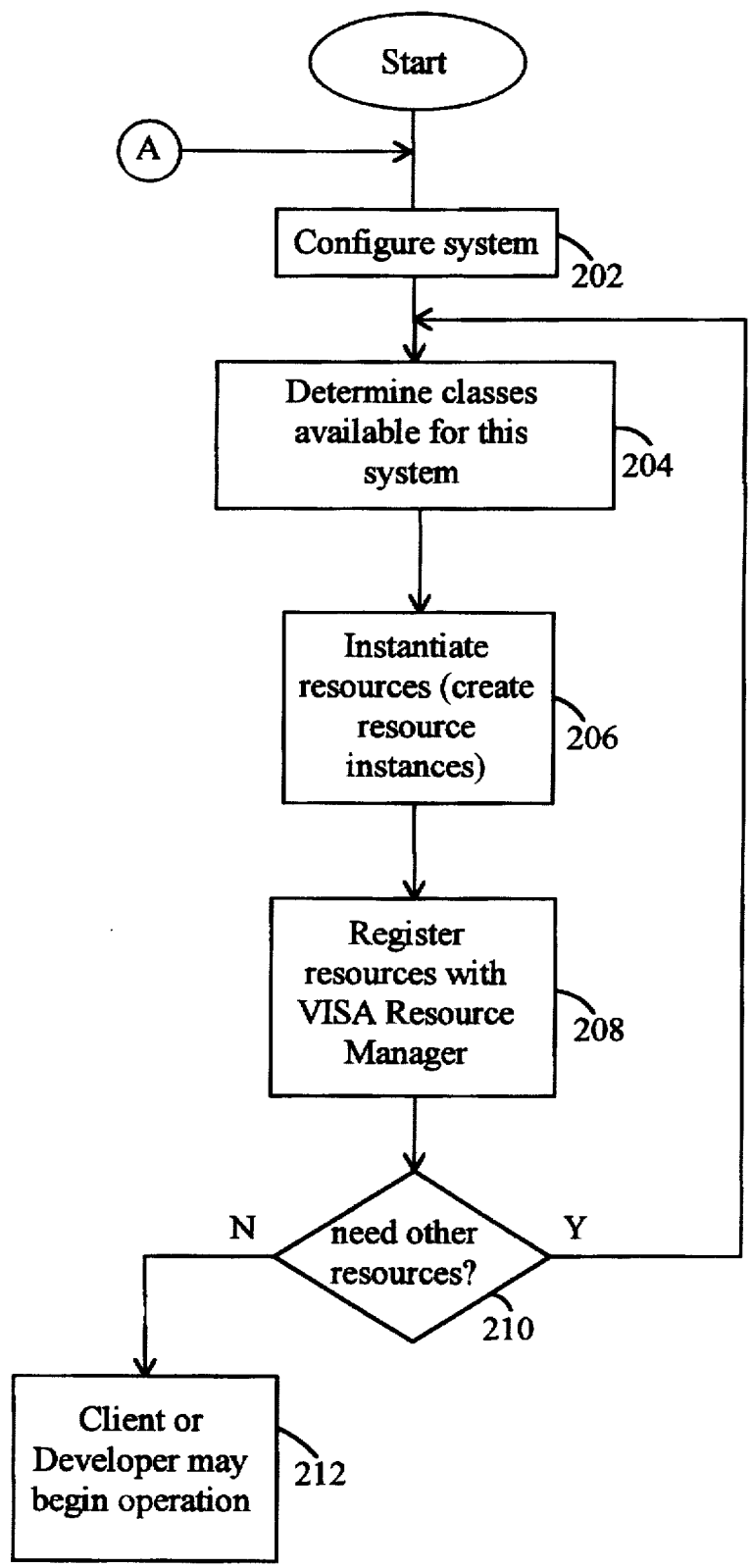
FIG. 14 is a flowchart diagram illustrating the configuration steps performed by a VISA system.
Figures 15, 16:
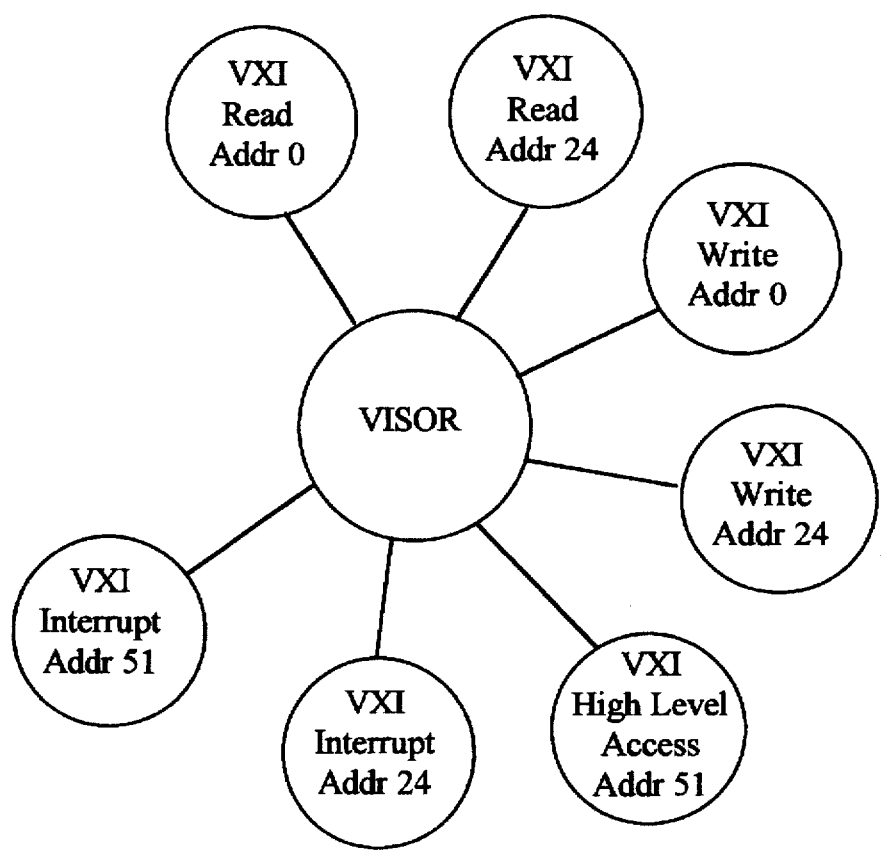
FIG. 15 illustrates an example of instrument devices and resource classes implemented in an example VISA system.
FIG. 16 illustrates the resources created by the configuration method of FIG. 14 for the example VISA system of FIG. 15.

Referring now to FIG. 14, a diagram illustrating operation of a VISA system at power up is shown. This operation is described in conjunction with a simple instrumentation system which is shown in FIGS. 15 and 16. As shown in FIG. 15, the example instrumentation system includes a VXI chassis including a CPU card, a message based device card and a register based device card. The CPU card has an address of 0, the message based device has an address of 24, and the register based device has an address of 51. The resource classes available in this example are Read, Write, High Level Access, and VXIbus Interrupt.

Referring again to FIG. 14, in step 202 a method is invoked which configures the instrumentation system. This method involves determining the respective hardware and instruments available within the system as well as determining the logical address of the respective instruments in this system. In the present example, in step 202 the method would determine that there is a VXI CPU card having address 0, a respective message based device having an address of 24, and a respective VXI register based device having an address of 51 comprised within the system. In step 204 the method determines the classes available within the system. In the present example, the method would determine that the classes available are Read, Write, High Level Access, and Interrupt. In step 206 the method uses the classes determined in step 204 and the hardware configuration determined in step 202 to create resources.

Referring now to FIG. 16, a diagram illustrating the resources that are generated in this example are shown. As shown, the resources created include a VXI Read of address 0, a VXI Read of address 24, a VXI Write of address 0, a VXI Write of address 24, a High Level Access at address 51, a VXI Interrupt at address 51, and a VXI Interrupt at address 24. The startup resource utility 142 instantiates or creates these resources in step 206. The step of instantiating or creating resources in step 206 involves creating an instance which includes code that is inherited or incorporated from the class determined in step 204. The example shown in FIG. 15 includes a read resource class. In order to create an instance of that class, for example a VXI read instance, the method creates an instance which inherits from the interface of the read class. The method may also overwrite a portion of this inherited code with new code that actually implements the specific reads for the interface, in this example the VXI interface.

In step 208 the startup resource manager registers these resources with the VISA Resource Manager 140. In other words, the application programming interface of the resource is provided to the VISA Resource Manager 140, and the resource is provided with a unique name or identifier. The registration process comprises providing entry points regarding the resource, including a description of the operations, a description of the attributes, a description of the exit conditions, the location of the files, and a description of the files themselves.

Upon completion of step 208, the method determines in step 210 if other resources are needed to register the resources in step 208 that were created in step 206. Due to the hierarchical nature in which some resources require other resources for operation as discussed above with regard to FIG. 22, it may be necessary for other resources to be created and registered with the VISA Resource Manager 140. If other resources are determined to be necessary in step 210, then operation returns to step 204. If other resources are not required in step 210, then startup operation has completed and operation is turned over to the user.

viOpen Operation

Figure 17A:
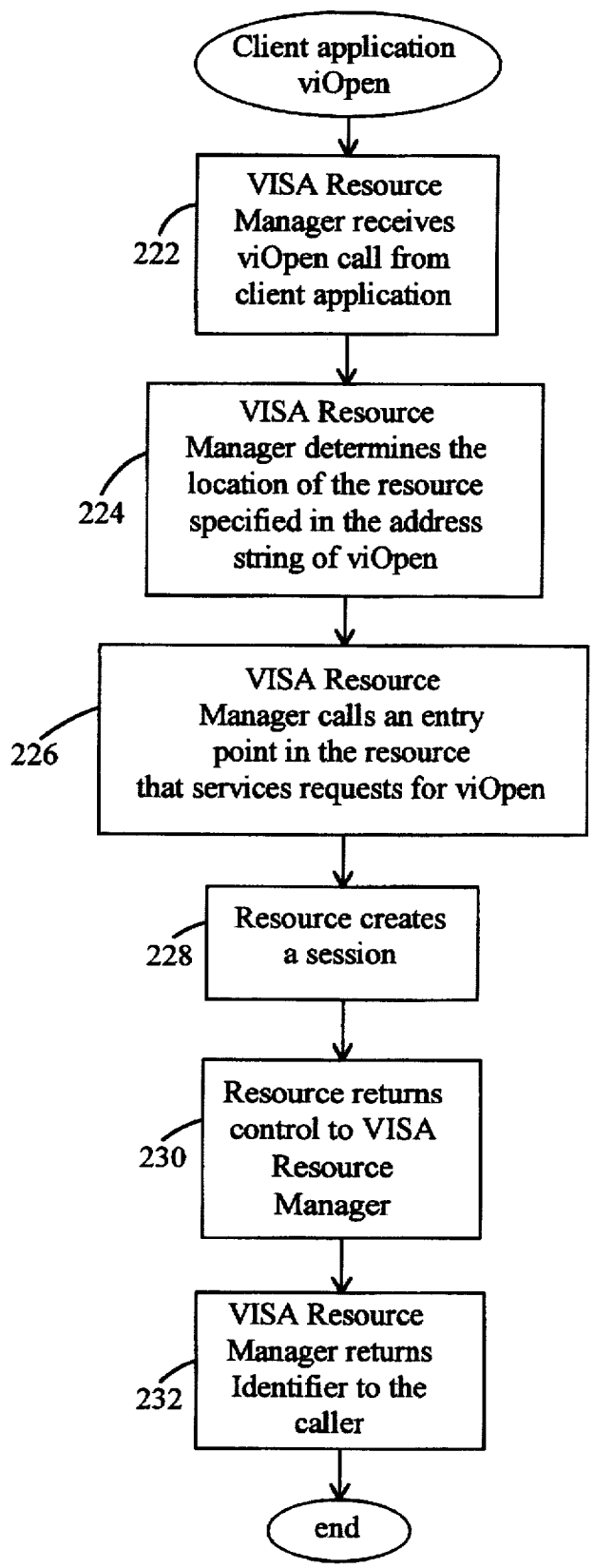
FIG. 17A is a flowchart diagram illustrating the steps performed by a VISA system when a client application uses the viOpen operation.
Figure 17B:
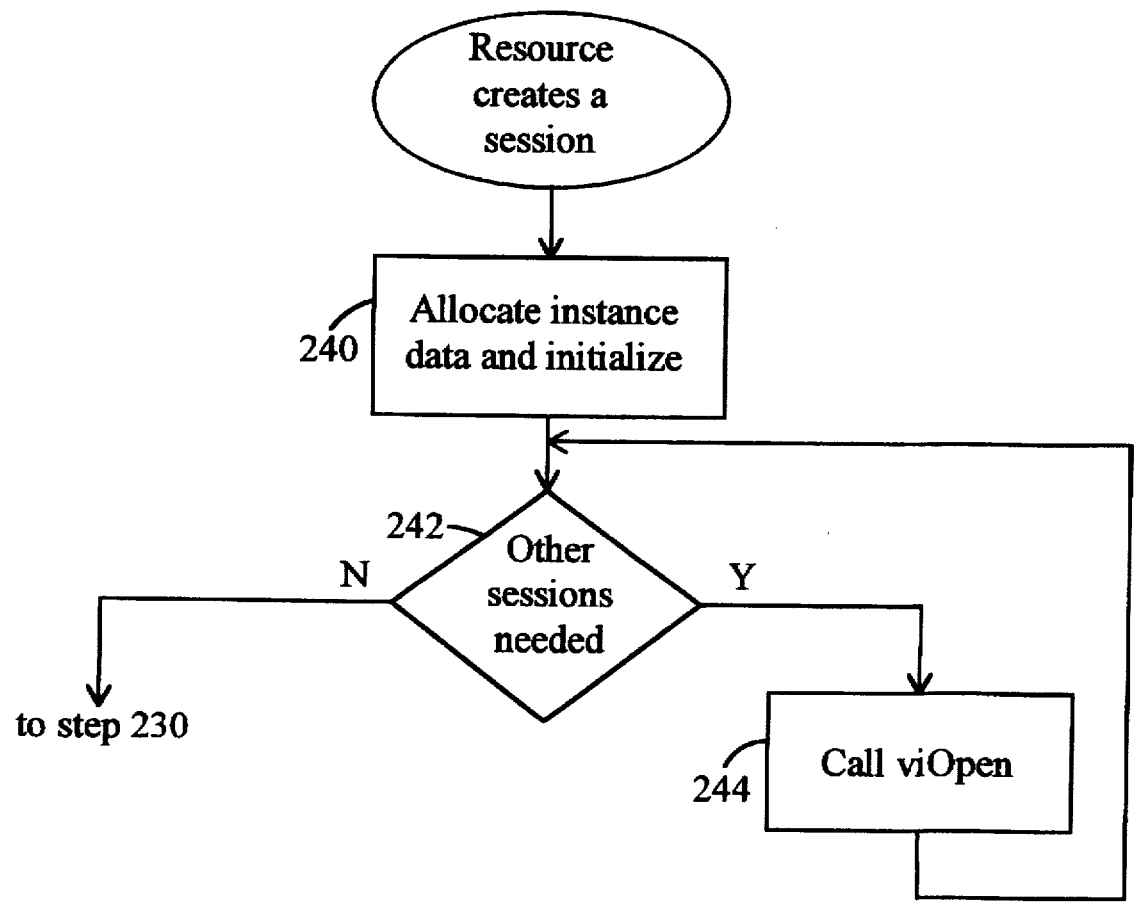
FIG. 17B is a flowchart diagram of a resource creating a session performed in step of FIG. 17A.

FIGS. 17A–B illustrate operation when a client application begins using the resources within a VISA system, i.e., when a viOpen instruction is received from a client application. The viOpen instruction instructs the VISA Resource Manager 140 to connect the user's application to a desired resource. The operation of the viOpen operation illustrated in FIG. 17A is discussed in conjunction with FIG. 18.

Figure 18:
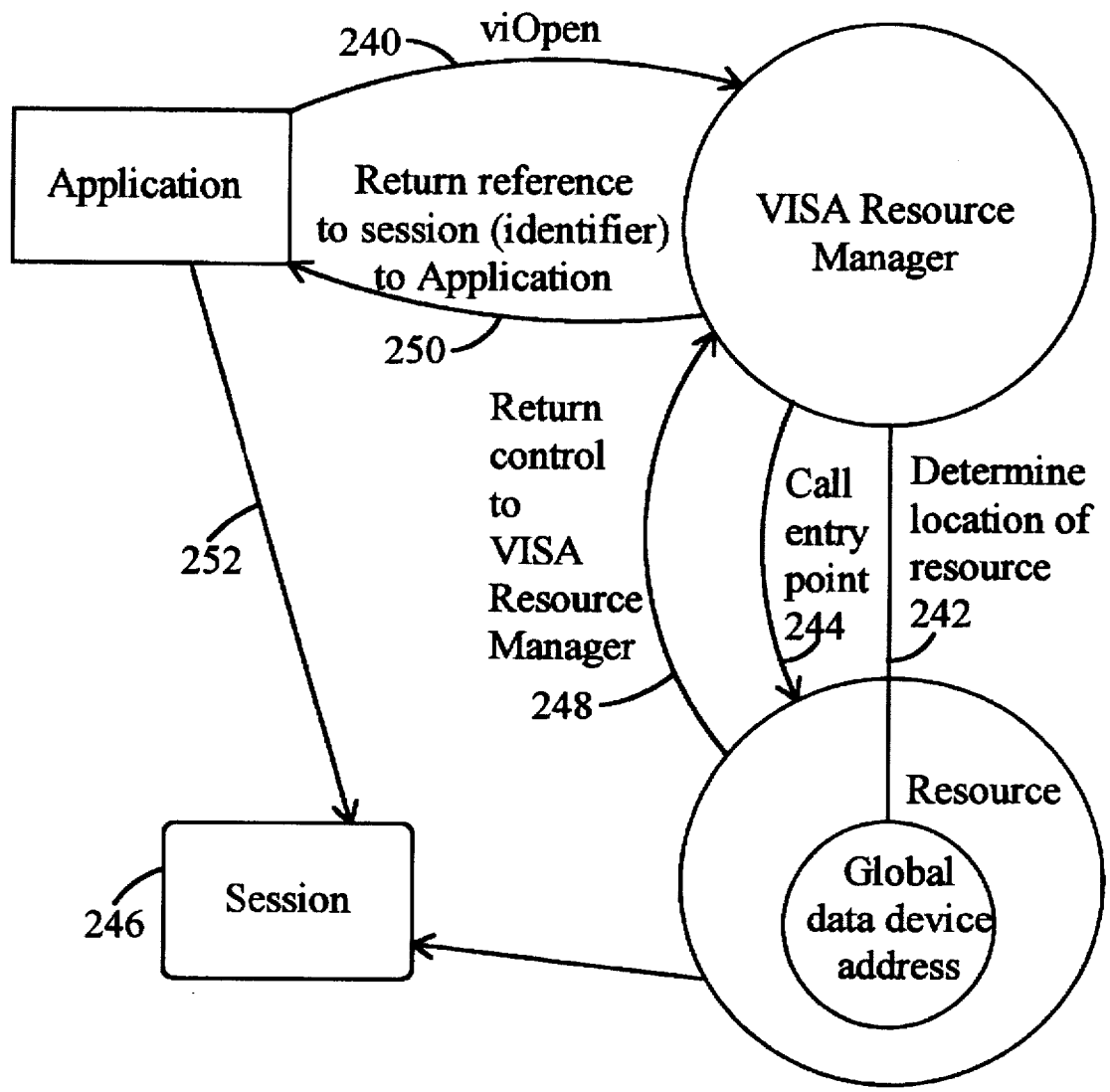
FIG. 18 illustrates the steps performed in FIG. 17A when a viOpen operation is used.

When a system according to the present invention receives a viOpen instruction in step 222, then in step 224 the VISA Resource Manager 140 determines the location of the resource specified in the address string of the viOpen instruction. In FIG. 18, the client application performing a viOpen operation on VISA Resource Manager is shown at 240, and step 124 where the VISA Resource Manager 140 determines the location of the resource is shown at 242. In step 226 the VISA Resource Manager 140 calls an entry point in the resource that services requests for the viOpen operation. This step is S illustrated at 244 in FIG. 18. In step 228 the resource creates a session, this session being shown at 246 in FIG. 18. As described above, a session is essentially an instance of a resource. Creating a session involves creating data that is needed for a particular instance of that resource.

In step 230 the resource returns control to the VISA Resource Manager 140, and this is shown at 248 in FIG. 18. In step 232 the VISA Resource Manager 140 returns a reference or session identifier to the user's application. This reference is provided in the variable "session i.d." to the user application, as shown at 250 in FIG. 18. The application can then use this session i.d. value to communicate with the resource, as shown at 252 in FIG. 18.

FIG. 17B illustrates more detail regarding how a resource creates a session in step 228 of FIG. 17A. As shown, when a resource creates a session the resource allocates instance data and initializes the session in step 240. In step 242 the resource determines if other sessions are needed in step 242. If so, then viOpen is called on those other resources in step 244 and control returns to step 242. If other sessions are not needed, then control advances to step 230 in FIG. 17A. It is noted that, if sessions to other resources are needed, when those sessions are actually created is indeterminate. If in order to create the data for a particular session it is first necessary to first open sessions to other resources, then these sessions are opened prior to the particular session. However, if in order to open these sessions it is necessary to first define how much space is available to create data, then these sessions may be opened after opening the particular session.

Non-VISA Application Opening a Session to VISA Resources

Figure 19:
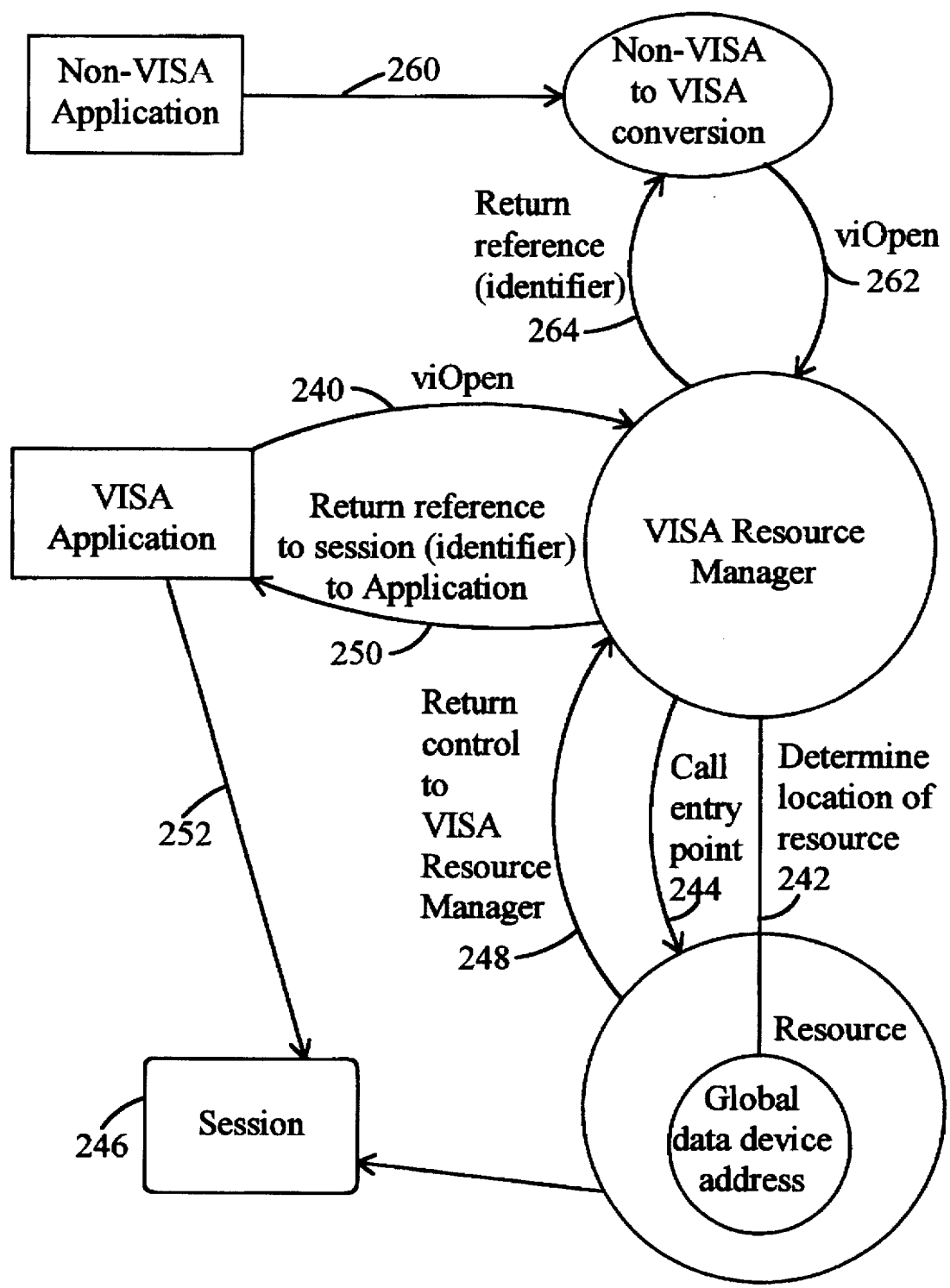
FIG. 19 illustrates the steps performed when a non-VISA application opens a session to a VISA resource using the Non-VISA to VISA conversion method of the present invention

FIG. 19 is a diagram similar to FIG. 18, but also shows how a non-VISA application, such as an application written for the SICL Driver level library, undergoes a conversion according to the present invention that enables it to operate within a VISA system. As shown, a non-VISA application which was developed according to a different software architecture or driver level library such as SICL can open sessions with VISA resources within a VISA system by means of the non-VISA to VISA conversion block. When the Non-VISA to VISA conversion block issues a viOpen operation, the VISA system performs the steps shown in FIG. 19 and described above with respect to FIG. 18, except that the reference or session identifier is returned to the Non-VISA to VISA conversion block instead of to a VISA application. The non-VISA to VISA conversion block also receives function calls from the non-VISA application and invokes various operations on resources in the VISA system to implement the steps in the non-VISA application.

In the preferred embodiment, the non-VISA application is an application developed according to the Standard Instrument Control Library (SICL) from Hewlett-Packard. The operation of the non-VISA to VISA conversion block in converting calls to SICL event commands into VISA event commands is discussed below. The operation of the non-VISA to VISA conversion block in converting calls to functions in the Standard Instrument Control Library (SICL) into equivalent VISA functions is also described below A, and pseudocode for the method is comprised in Appendix B.

VISA Event Model Background

Figure 20:
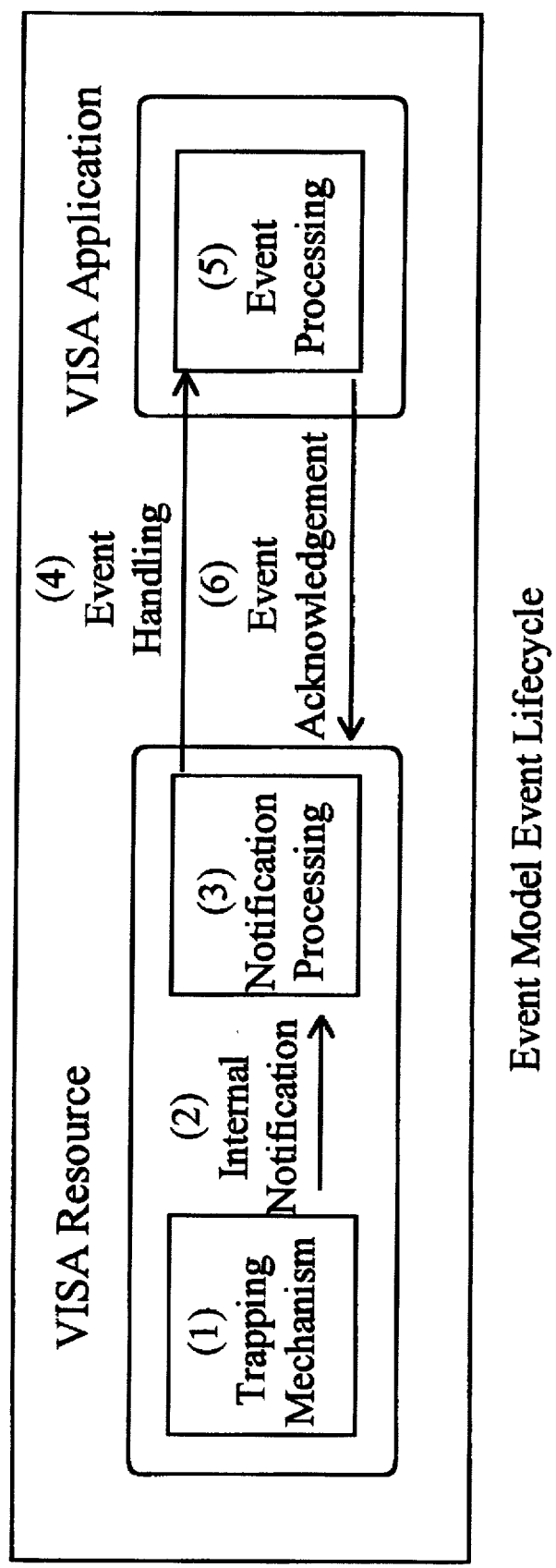
FIG. 20 illustrates the operation of event processing in a VISA system.

Referring now to FIG. 20, the VISA event model includes three aspects: trapping and notification, handling and processing, and acknowledgment. Event trapping and notification involves a resource becoming aware of the event and passing the event to sessions that are enabled to receive the event. This aspect is discussed in the section "Event Trapping and Notification." Handling and processing involve an application being informed that an event has occurred. In a VISA system, there are several ways that an application can request to receive events, and these are discussed in the section titled "Event Handling and Processing." Event acknowledgment is necessary for certain protocols that may require some form of handshaking. This is discussed in the section titled "Event Acknowledgment."

Event Model and Order/Sequence

Event Model Overview

Figure 21:
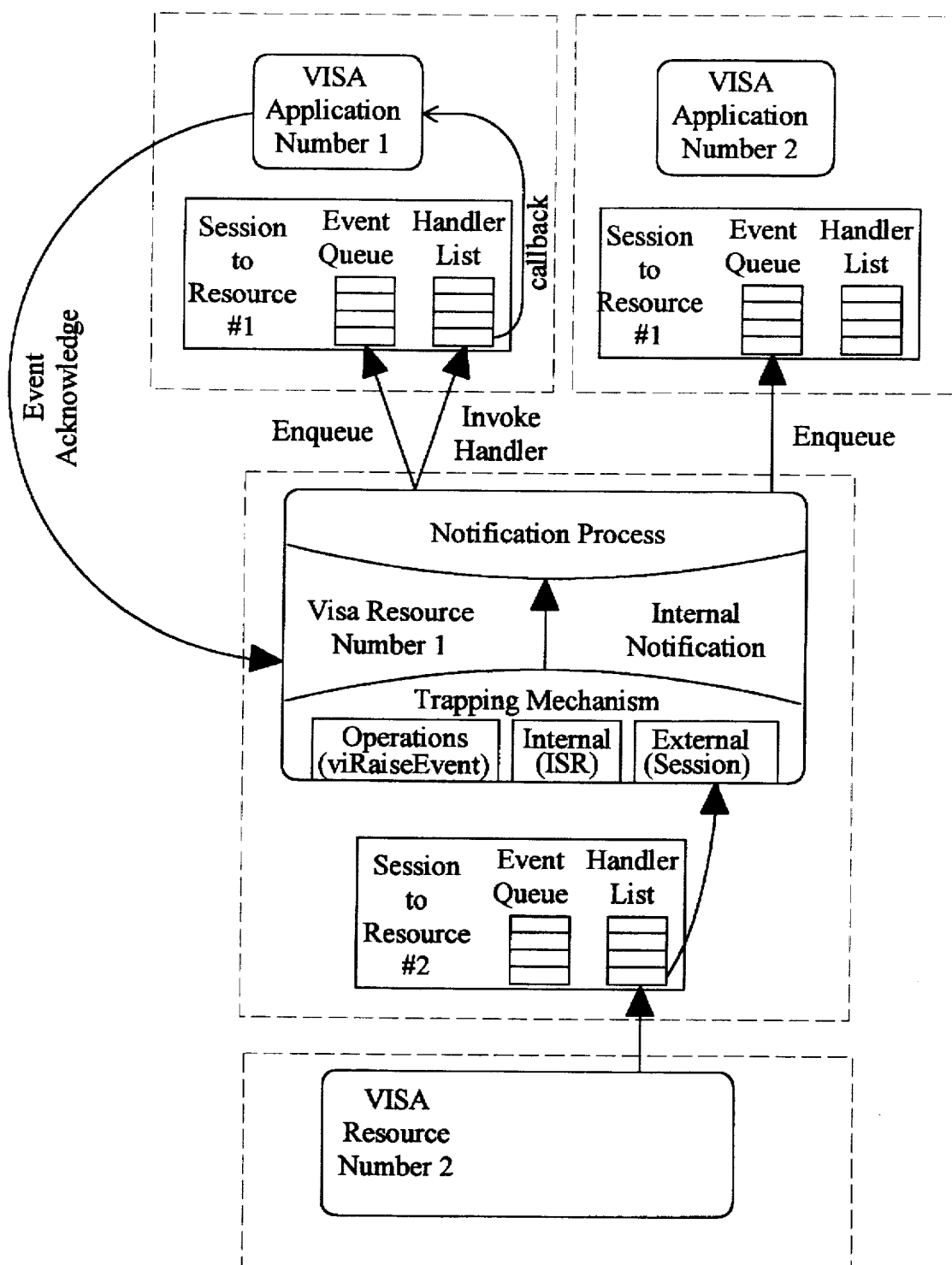
FIG. 21 is a more detailed diagram illustrating event processing according to a VISA system.

FIG. 21 is a detailed overview of the VISA event model. The application's view of the event handling mechanisms is as follows. An application can open multiple sessions to a resource and can then enable each session to receive events of a specified type using either the callback or the queuing mechanism, or both. This can be done using the viEnableEvent() operation. Before enabling for the callback mechanism, the application must install at least one handler using the viInstallHandler() operation. Once enabled, the resource will maintain for each session both a list of handlers to be invoked for an event type and the session's event queues.

A resource's implementation of the event model uses a three-step process that includes trapping events as well as notifying the applications. The resource obtains information of an event occurrence through the trapping mechanism. Once an event is trapped, the resource notifies the handling mechanism of the event occurrence using the resource's internal notification mechanism. Finally, the handling mechanism notifies the applications of the event occurrence. These three steps are described in more detail below.

The trapping mechanism allows a resource to be informed of an event occurrence in three possible ways: internal trapping, external trapping, and operations.

Once a resource traps an event (either internally or externally), the event is transmitted to the resource's notify mechanism. The means of transmitting is internal notification of event occurrence and is described by the arrow in the diagram from the trapping mechanism to the notify mechanism. Once the resource's handling mechanism is made aware of the event occurrence, the handling mechanism uses the method specified below for invoking the callback handlers and/or queuing the event occurrence for each enabled session.

Event Notification Method

---

For this specific event type
   For sessions enabled for callback mechanisms
      For all handlers in the handler list
         Invoke handler
   For each session waiting on this event
      Unblock wait
   For all other* sessions enabled for queuing mechanism on this event
      Queue the event occurrence.

---

*Other sessions are those on which a wait operation is not unblocked

Sometimes, an application's session may need to acknowledge the receipt of an event to the source of event. The session can do so using the acknowledgment mechanism provided by a VISA system. An application can use the viAcknowledgeEvent() operation to acknowledge the source of event notification. This is denoted by the lines from the application to the notification mechanism in FIG. 17, Overview of Event Model.

Event Trapping and Notification

There are three possible ways for a VISA resource to be informed of the occurrence of an event: internal trapping, external trapping, and operations. Internal trapping means that the event is first constructed in that resource, i.e., the need for the event was generated internally and the event occurrence was constructed within the resource. Examples of internal trapping include interrupt service routines (ISRs) and parameter validation errors or the overflow of queue in a session. External trapping means that the event was received from another resource. A resource can receive events from other resources in exactly the same fashion as an application does. Examples of receiving events externally from other resources are an alert condition such as a system failure (VI_EVENT_ALERT) and a resource coming on line (VI_EVENT_RSRC_ACTIVE). For trapping external event occurrences, the resource can either install callback routines or enable the queuing mechanism on other resources as described in the section titled "Event Handling and Processing." This allows the event handling mechanism to be consistent for a user application as well as to any other resource in the VISA system. Finally, the third method in a VISA system for trapping events is through the use of operations to programmatically generate an event within that resource. The VISA Resource Template defines an operation viRaiseEvent() for this specific purpose.

Once a resource has trapped an event, it passes the event to its notification mechanism. The notification mechanism then informs whichever sessions are enabled to receive that event, using each event handling mechanism for which the session is currently enabled.

An application can use the viRaiseEvent() operation to cause a resource to signal its sessions that an event has occurred. Through this operation, it is possible to target the notification of the event toward a specific session (the one on which the operation is invoked). The VISA model requires every VISA resource to support programmatic event notification for all the events that it supports.

Once a resource has trapped an event, the resource passes the event to its notification mechanism. The notification mechanism then informs the respective sessions that are enabled to receive that event, using each event handling mechanism for which the session is currently enabled. The passing of the event from the trapping mechanism to the notify mechanism is represented by an arrow in FIG. 21.

Every VISA resource allows programmatic event notification for all the event types that it supports. By allowing programmatic event notification, the VISA event model can be used to simulate events such as the occurrence of an interrupt.

Event Handling and Processing

The VISA event model provides two different ways for an application to receive event notification, these being event queuing and event callbacks. The first method is to place all the occurrences of a specified event type in a session-based queue, wherein there is one event queue per event type per session. The application can receive the event occurrences later by dequeuing them with either the viWaitOnEvent() or the viWaitOnMultipleEvents() operation. The other method is to call the application directly, invoking a function which the application installed prior to enabling the event. A callback handler is invoked on every occurrence of the specified event. There can be multiple handlers installed on the same event type on the same session.

Every VISA resource implements both the queuing and callback event handling mechanisms. The queuing and callback mechanisms are suitable for different programming styles. The queuing mechanism is generally useful for non-critical events that do not need immediate servicing. The callback mechanism, on the other hand, is useful when immediate responses are needed. These mechanisms work independently of each other, and both can be enabled at the same time. By default, a session is not enabled to receive any events by either mechanism. The viEnableEvent() operation can be used to enable a session to respond to a specified event type using either the queuing mechanism, the callback mechanism, or both. Similarly, the viDisableEvent() operation can be used to disable one or both mechanisms for receiving events. Because the two mechanisms work independently of each other, one can be enabled or disabled regardless of the current state of the other. The viQueryEventMechanism() operation can be used to get the currently enabled event handling mechanisms for a specific event.

prioritized based on time. In another embodiment, an additional priority scheme is incorporated. For example, in this embodiment, when a session is enabled for queuing, events for that session are placed in a priority queue, and each event also defines its own priority. The priority queue allows the highest priority events to be put ahead of lower-priority events that are already in the queue. Events of the same priority are put in FIFO order. A separate event queue is maintained for each individual session per event type. Each event which is to be placed on a queue is queued in the order of its priority. If an event is to be placed on a queue, and there are events on the queue of equal priority, then the event to be queued is placed in the queue such that it is dequeued after all the existing events.

An application retrieves event information by using either the viWaitOnEvent=1 operation or the viWaitOnMultipleEvents0 operation. If the specified event(s) exist in the queue, these operations retrieve the event information and return immediately. Otherwise, the application thread is blocked until the specified event(s) occur or until the timeout expires, whichever happens first. When an event occurrence unblocks a thread, the event is not queued for the session on which the wait operation was invoked.

Figure 22:
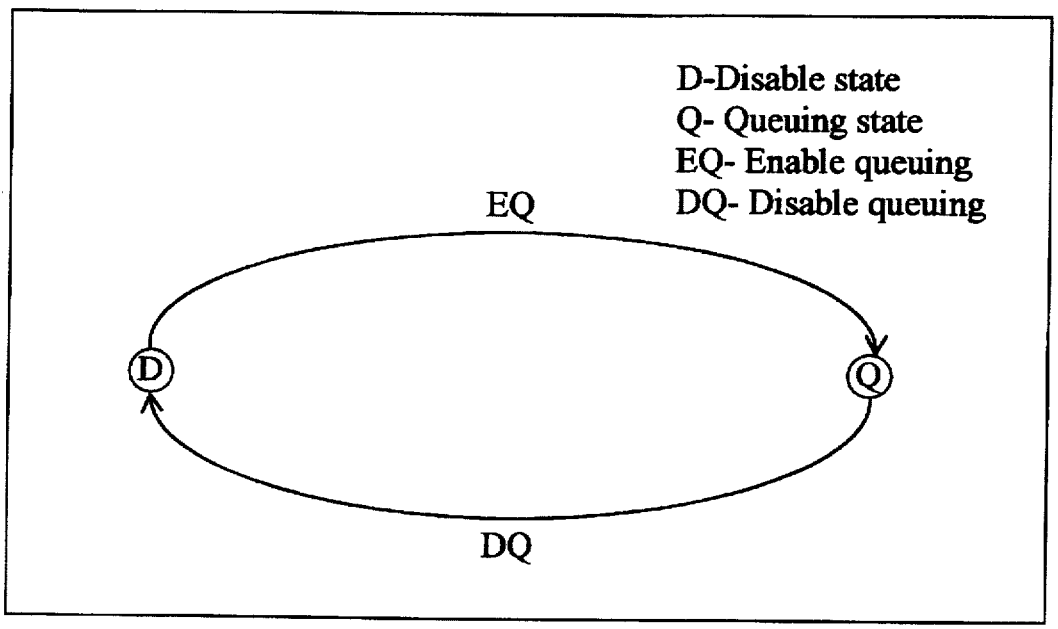
FIG. 22 illustrates a state diagram of the queuing mechanism of a VISA system.

Referring now to FIG. 22, a state diagram for the queuing mechanism is shown. This state diagram includes the enabling and disabling of the queuing mechanism and the corresponding operations. The queuing mechanism of a particular session can be in one of two different states: Disabled or Queuing (enabled for queuing). A session can transition between these two states using the viEnableEvent() or viDisableEvent() operation. Once a session is enabled for queuing (EQ transition to the Q state), all the event occurrences of the specified event type are queued. When a session is disabled for queuing (DQ transition to D state), any further event occurrences are not queued, but event occurrences that were already in the event queue are retained. The retained events can be dequeued at any time using either of the wait operations. An application can explicitly clear (flush) the event queue for a specified event type using the viDiscardEvent() operation.

If there are any events in a session's queue, and the queuing mechanism transitions between states, then the resource does not discard any events from the queue.

The following table lists the state transitions and the corresponding values for the mechanism parameter in the viEnableEvent() and viDisableEvent() operations.

TABLE

| | State Transitions for the Queuing Mechanism | | |
|---|---|---|---|
| Destination State | Paths Leading to Destination State | Value of mechanism parameter | Operations |
| Q | EQ | VI_QUEUE, VI_ALL_MECH | viEnableEvent |
| D | DQ | VI_QUEUE, VI_ALL_MECH | viDisableEvent |

The queuing mechanism is discussed in the section titled "Queuing Mechanism." The callback mechanism is described in the section titled "Callback Mechanism."

Queuing Mechanism

The queuing mechanism in a VISA system gives an application the flexibility to receive events only when it requests them. In the preferred embodiment, events are Callback Mechanism The VISA event model also allows applications to install functions which can be called back when a particular event type is received. The viInstallHandler() operation can be used to install handlers to receive specified event types. These handlers are invoked on every occurrence of the specified event, once the session is enabled for the callback mechanism. At least one handler must be installed before a session can be enabled for sensing using the callback mechanism.

If no handler is installed for an event type, and an application calls viEnableEvent(), and the mechanism parameter is VI_HNDLR, then the viEnableEvent() operation returns the error VI_ERROR_HNDLR_NINSTALLED.

A VISA system allows applications to install multiple handlers for an event type on the same session. Multiple handlers can be installed through multiple invocations of the viInstallHandler() operation, where each invocation adds to the previous list of handlers. If more than one handler is installed for an event type, each of the handlers is invoked on every occurrence of the specified event(s). VISA specifies that the handler installed last is the first to be invoked, then the one installed just before it, and so on. Thus, if multiple handlers are installed for an event type on the same session, then the handlers are invoked in the reverse order of the handlers' installation (LIFO order). When a handler is invoked, the VISA resource provides the event filter context as a parameter to the handler. The event filter context is filled in by the resource. Applications can also fill certain parts of the filter context while enabling the event by filling the context structure passed to viEnableEvent(). The context fields filled by an application are passed unchanged to the handlers when they are invoked.

Besides filling the event filter context, an application can also supply a reference to any application-defined value while installing handlers. This reference is passed back to the application as the userHandle parameter, to the callback routine during handler invocation. This allows applications to install the same handler with different application-defined contexts. For example, an application can install a handler with a fixed value 0×1 on a session for an event type. An application can install the same handler on the same session with a different value, say 0×2, for the same event type. The two installations of the same handler are different from each other. Both the handlers are invoked when the event of the given type occurs. However, in one invocation the value passed to userHandle is 0×1 and in the other it is 0×2. Thus, VISA event handlers are uniquely identified by a combination of the handler address and user context pair. This identification is particularly useful when different handling methods need to be performed depending on the user context data.

An application may install the same handler on multiple sessions. In this case, the handler is invoked in the context of each session for which it was installed. If a handler is installed on multiple sessions, then the handler is called once for each installation when an event occurs.

An application can uninstall any of the installed handlers using the viUninstallHandler() operation. This operation can also uninstall multiple handlers from the handler list at one time. The viQueryHandlers() operation can be used to query the currently installed handlers on an event type.

Figure 23:
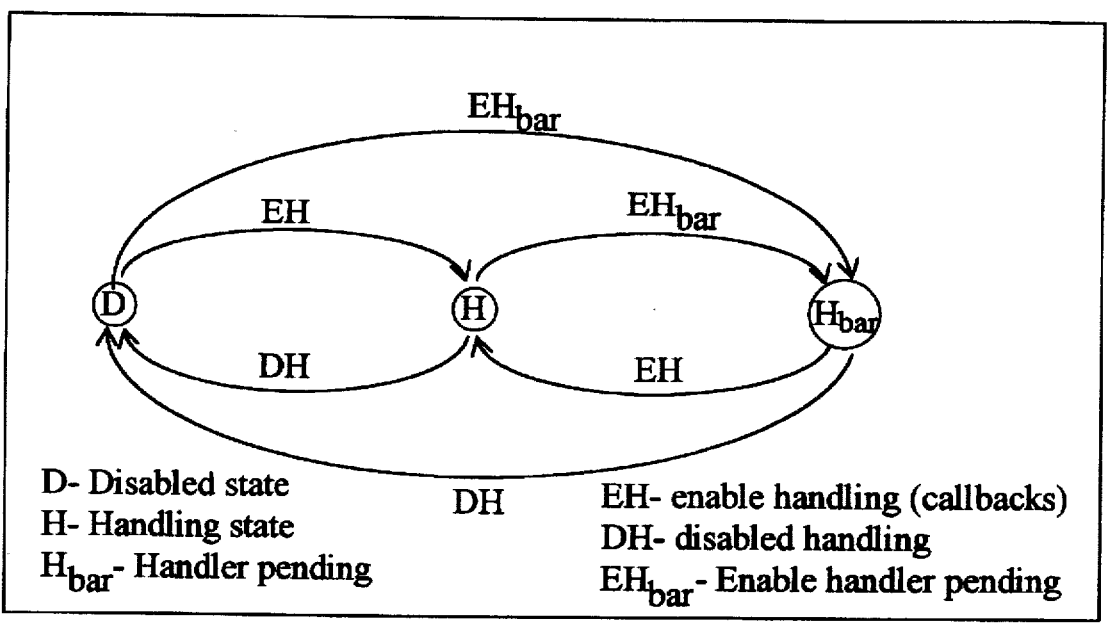
FIG. 23 illustrates a state diagram of the callback mechanism of a VISA system.

Referring now to FIG. 23, a state diagram of a resource implementing a callback mechanism is shown. This state diagram includes the enabling and disabling of the callback mechanism in different modes and also briefly describes the operations that can be used for state transitions. The table immediately below lists different state transitions and parameter values for the viEnableEvent() and viDisableEvent() operations.

The callback mechanism of a particular session can be in one of three different states: Disabled, Handling, or Suspended handling ($H_{bar}$). When a session transitions to the handling state (EH transition to H state), the callback handler is invoked for all the occurrences of the specified event type. When a session transitions to the suspended handling state ($EH_{bar}$, transition to $H_{bar}$), the callback handler is not invoked for any new event occurrences, but occurrences are kept in a suspended handler queue. The handler is invoked later, when a transition to the handling state occurs. When a session transitions to the disabled state (DH transition to the D state), the session is desensitized to any new event occurrences, but any pending occurrences are retained in the queue.

The following table lists the state transition diagram for the callback mechanism and the corresponding values for the mechanism parameter in the viEnableEvent() or viDisableEvent() operations.

TABLE

State Transition Table for the Callback Mechanism

| Destination State | Source State | Paths Leading to Destination State | Value of Mechanism Parameter | Operation |
|---|---|---|---|---|
| H | D | EH | VI_HNDLR, VI_ALL_MECH | viEnableEvent |
| H | $H_{bar}$ | EH | VI_HNDLR, VI_ALL_MECH | |
| $H_{bar}$ | D | $EH_{bar}$ | VI_SUSPEND_HNDLR | |
| $H_{bar}$ | H | $EH_{bar}$ | VI_SUSPEND_HNDLR | |
| D | H | DH | VI_HNDLR, VI_ALL_MECH | |
| D | $H_{bar}$ | DH | VI_SUSPEND_HNDLR, VI_ALL_MECH | viDisableEvent |

If the callback mechanism mode for event handling is changed from VI_SUSPEND_HNDLR to VI_HNDLR, then all the pending events for the event type specified in eventType parameter of viEnableEvent() are handled before viEnableEvent() completes.

It is noted that the queuing mechanism and the callback mechanism operate independently of each other. In a VISA system, sessions keep information for event occurrences separate for both mechanisms. If one mechanism reaches its predefined limit for storing event occurrences, it does not directly affect the other mechanism.

VISA Event Example

Figure 24:
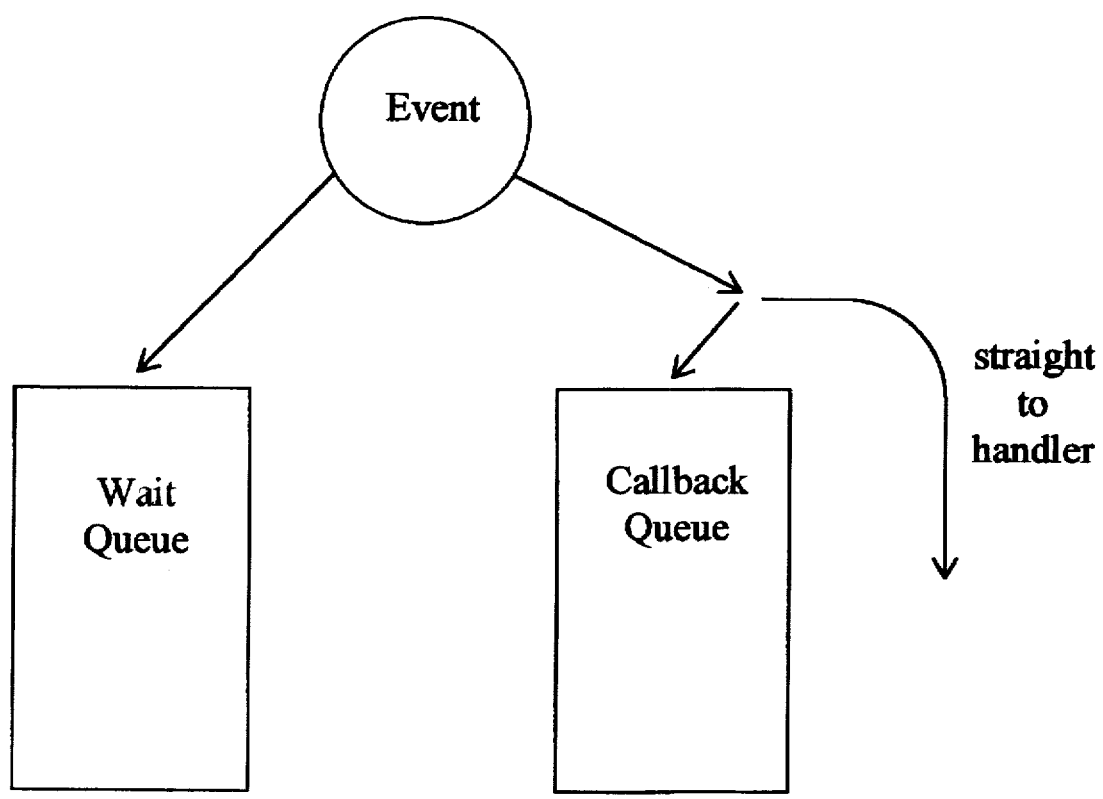
FIG. 24 illustrates the event model of a VISA system including Wait Queue and Callback queue options.

As discussed above, a VISA system includes a standard event handling mechanism. An event in a VISA system is any asynchronous occurrence that the VISA I/O control library can generate or process. Referring now to FIG. 24, there are two main modes of operation of this standard event mechanism called event queuing and event callbacks. As shown, a VISA system includes two ways for receiving events. An event in a VISA system is either placed on an Event Queue, also called a Wait Queue, or the event has an associated Callback handler that has been specified for the event. In the first case, when the event is placed or posted on the Event Queue, the event must be manually removed from the queue by an application. Thus the Event Queue is for those events which do not command a high priority. When the event has an associated Callback Handler, the event can either be temporarily placed on a Suspend Queue, also referred to as a Callback Queue, or the event directly invokes a Callback Handler, as shown.

The examples in FIGS. 25 and 26 contrast these different types of event handling methods. FIG. 25 illustrates a sample VISA, C language-type application which illustrates event queuing features of the present invention. FIG. 26 illustrates a sample VISA, C language-type application which illustrates event callback features of the present invention.

Referring now to FIG. 25, for event queuing, the emphasis is placed on the ability for the application to have the VISA system keep track of events as they occur and store this information on an internal VISA queue which the application can then access at a later time. As shown in the example, this process requires two basic steps after a session is opened to a device. This first step is to notify the VISA Resource Manager 140 to begin queuing up events of particular types. This is done with the viEnableEvent() operation specifying VI_QUEUE as a mode of operation. In this example, VI_EVENT_SERVICE_REQ specifies to listen to device level service request events (e.g. SRQ on the GPIB). The second step occurs at the point when the application wishes to query the VISA system about currently pending events. This querying may be done using the viWaitOnEvent() operation. viWaitOnEvent() allows the application to wait for a specified time for an event to enter the queue. A time of zero specifies to return immediately whether events exist on the queue or not.

Referring now to FIG. 26, for event callbacks the emphasis is placed on the ability for the application to have the VISA system invoke user supplied operations at the time that an event occurs. As shown in this example, this process requires three basic steps. The first step is to create a user-defined event handler that can handle the desired event (s) to be passed from the VISA system to the application. In the example, this is the function SRQHandlerFunc(). This function is written just like any other application function. The second step is to notify the VISA system about the function created in the first step. This is done via a viInstallHandler() operation. This operation logs the address of the function to invoke when an event occurs. The final step is to notify the VISA system to begin invoking the callback whenever the desired event(s) occur. This is done with the viEnableEvent() operation specifying VI_HNDLR as a mode of operation. In this example, VI_EVENT_SERVICE_REQ specifies to listen to device-level service request events. At this point, whenever a request for service event occurs, the user-defined callback is invoked.

As a general tool for both the queuing and callback event handling mechanisms of a VISA system, the operation viDisableEvent() can be invoked at any time to suspend or terminate the reception of events altogether. In some situations, it may be desirable to suspend callbacks for a period of time without losing events. In this case, when the application has already been enabled for callbacks, the user can use the viEnableEvent() operation specifying VI_SUSPEND_HNDLR to temporarily suspend callbacks. This causes events to be queued on an internal event callback queue, which is not the same queue used for the queuing mechanism. When callbacks are re-enabled via viEnableEvent() specifying VI_HNDLR, the user-defined callback is invoked once for every pending event on the queue. Using this method guarantees that no events are lost by the application.

SICL Event Model

The SICL event model does not include a Wait Queue as shown in FIG. 24. Thus events in SICL are either placed on the Callback Queue or directly invoke a Callback Handler specified for the event. In addition, event operations in VISA are session based, whereas certain event operations in SICL are process-based. Further, SICL includes a completely different methodology for handling events than does a VISA system. U.S. Pat. No. 5,361,336 titled "Method for Controlling an Instrument Through a Common Instrument Programming Interface" describes the SICL library and is incorporated herein by reference in its entirety, including Appendix A to the above patent, which is the SICL specification.

In order for applications written for the SICL I/O library to operate in a VISA system, i.e., with VISA resources, it is necessary to convert SICL event function calls to VISA calls. Therefore, a system and method is desired for mapping SICL event function calls to VISA function calls.

Comparison of SICL and VISA Event Models

In both the VISA and SICL event models, the enabling and disabling of events is session based. In VISA, the handling of events, including the queuing or disabling of events, is also session-based. However, in SICL, event handling is process-based. Also, VISA uses a single operation referred to as viEnableEvent which includes parameters that determine the path of the decision tree of FIG. 24, i.e., whether to place the event in the Wait Queue or the Callback Queue or to invoke the Callback Handler. In SICL, a function referred to as isetintr determines whether interrupts are enabled for a process. If interrupts are not enabled, then when an interrupt happens, nothing occurs. If interrupts are enabled, then when an interrupt occurs the interrupt is placed either on the Callback Queue or passes directly to the Callback Handler. Two SICL functions referred to as iintron and iintroff determine whether the event is placed on the Callback Queue or goes directly to the Callback Handler. These SICL function calls do not include any session parameters, but rather are process-based. Therefore the SICL to VISA conversion method keeps track of which sessions are affected by these two function calls.

The above SICL functions isetintr, iintron and iintroff are for the general interrupt case. SICL also has different functions for other types of interrupts. In VISA these other types of interrupts are treated just like other events. Thus SICL does not have the ability to enable or disable the SRQ event, so SICL includes a function referred to as ionsrq which sets a handler for the SRQ event. In SICL, the ionsrq function allows the application to set the callback handler for SRQ events, and this function also enables the application to receive SRQ events SICL includes a function referred to as ionintr which allows an application to set a callback procedure like the ionsrq function. However, ionintr does not automatically enable interrupts.

In the following flowcharts, it is noted that a success value or error value is returned after a VISA operation has been invoked depending on whether the operation completes successfully.

Mapping the SICL Function Call isetintr to VISA

The SICL function call isetintr includes three parameters referred to as id, intnum, and secval. The format of the isetintr function call is as follows:

isetintr(id, intnum, secval) The purpose of the isetintr function call is to enable specific interrupts within the system. The id parameter is a session identifier returned from an iopen() call or an igetintfsess() call in the SICL Driver level library. The intnum call determines the interrupt condition to enable or disable. The secval parameter determines whether interrupts should be enabled or disabled. The isetintr function call generally maps to the VISA operations referred to as viEnableEvent and viDisableEvent.

Figure 27:
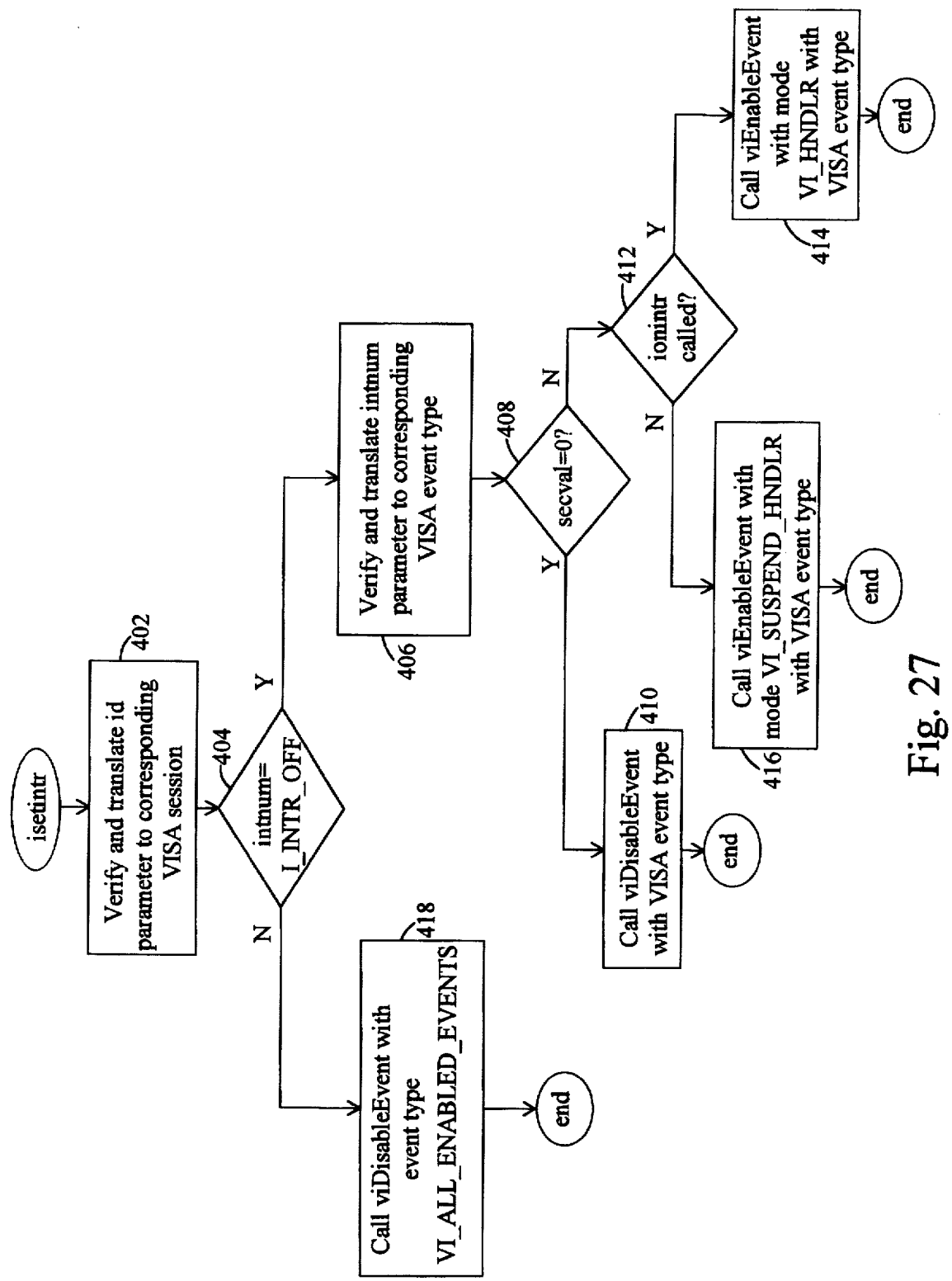
FIG. 27 is a flowchart diagram illustrating mapping of the SICL function call isetintr to a VISA system.

Referring now to FIG. 27, a flowchart diagram illustrating operation of a method for mapping the SICL isetintr call to a VISA system is shown. In step 402 the mapping method verifies and translates the id parameter to the corresponding VISA session and this parameter is used as the vi parameter in the VISA operation. In step 404, the method determines if intnum is equal to I_INTR_OFF. If so, the method calls the VISA operation viDisableEvent with event type equal to VI_ALL_ENABLED_EVENTS. If intnum is not equal to I_INTR_OFF, then the method advances to step 406. In step 406, the method verifies and translates the intnum parameter to the corresponding VISA event type.

In step 408 the method determines if secval equals zero. The method then calls either viEnableEvent or viDisableEvent, depending on the secval value. In other words, the SICL isetintr function maps to the viEnableEvent or viDisableEvent operation in VISA depending upon the value of secval. If the secval parameter is 0 in step 408, then in step 410 the method calls the VISA operation viDisableEvent with the VISA event type determined in step 404 and operation completes. Thus, a secval of 0 disables the interrupt. If the secval parameter is not 0 in step 408, then in step 412 the method determines if the ionintr SICL function has previously been called. If the ionintr SICL function call is determined to have previously been called in step 412, then in step 414 the method calls the VISA operation viEnableEvent with VI_HNDLR as a parameter and the VISA event type determined in step 404. If the ionintr SICL function is determined to have not been called in step 412, then in step 416 the method calls the VISA operation viEnableEvent with VI_SUSPEND_HNDLR as a parameter and the VISA event type determined in step 404. Therefore, when the secval parameter is 0, interrupts are disabled. If the secval parameter is non-zero, then interrupts are enabled with either the VI_HNDLR or VI_SUSPEND_HNDLR parameters, depending on whether ionintr has been called.

In the SICL Driver level library, installing an interrupt handler (ionintr) and enabling interrupt conditions (isetintr) are treated as independent events. Therefore, the isetintr function can be called before or after the ionintr function. If isetintr is called after ionintr, the mechanism parameter to the VISA operation viEnableEvent is set to VI_HNDLR so that the handler is invoked when events occur. If the isetintr function is called before the ionintr function is called, the mechanism parameter is preferably set to VI_SUSPEND_HNDLR so that handlers are queued on the callback queue and are not invoked. In this case, when the ionintr function is called later, the application calls the VISA operation viEnableEvent again with the mechanism set to VI_HNDLR to enable the callback handlers.

Mapping the SICL Function Call iintroff to VISA

Figure 28:
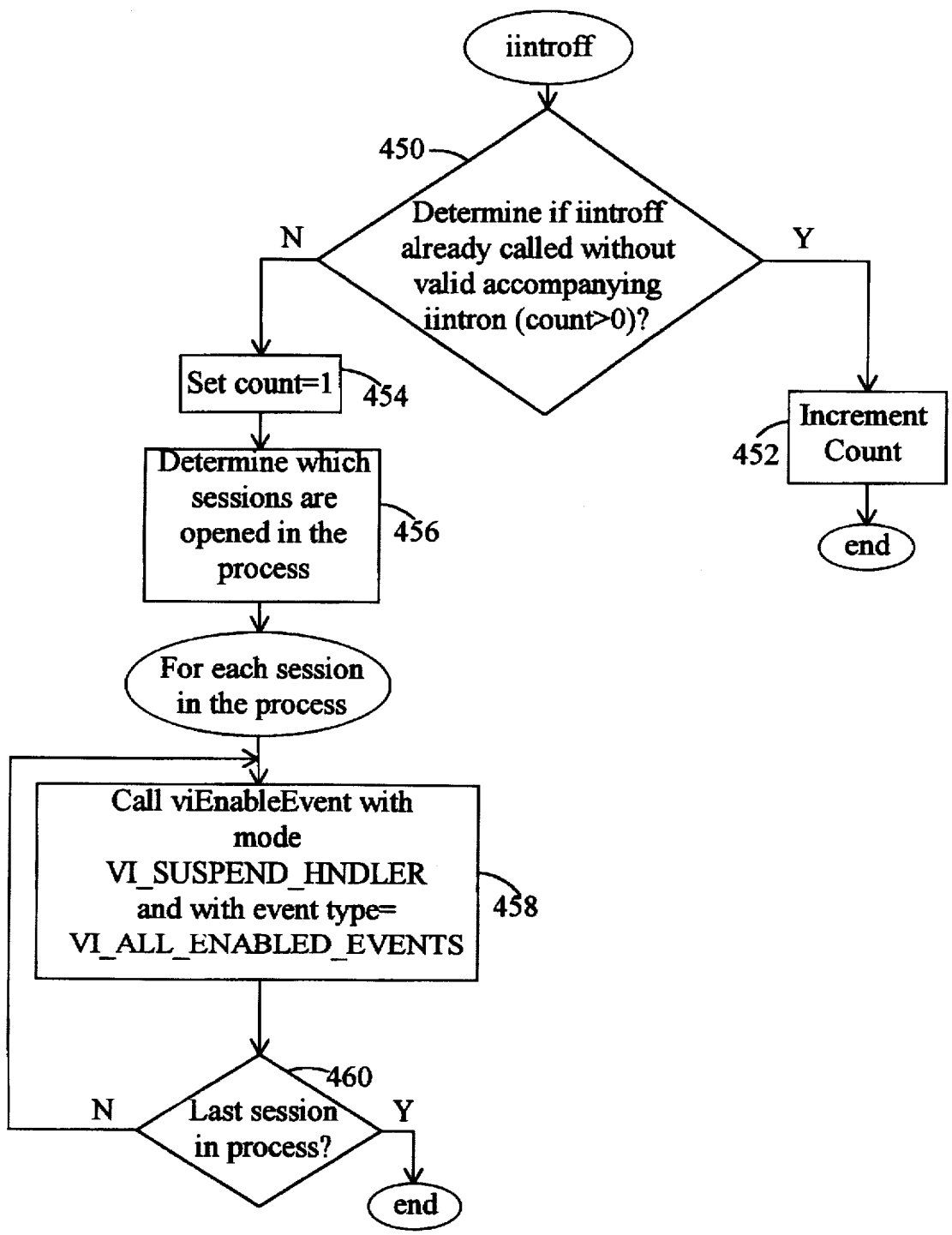
FIG. 28 is a flowchart diagram illustrating mapping of the SICL function call iintron to a VISA system.

Referring now to FIG. 28, a flowchart diagram illustrating mapping of the SICL function call iintroff to a VISA system is shown. The purpose of the SICL function call iintroff is to disable execution of asynchronous handlers. This function call generally maps to the VISA operation viEnableEvent. This function call is process based, i.e., this function call disables execution of asynchronous handlers for all sessions within a given process. The iintroff function does not include any parameters.

As shown in FIG. 28 when the iintroff function is called, in step 450 the method determines if the function iintroff has already been called without an accompanying iintron. The iintron function is described below with regard to FIG. 29. This determination is made because the iintroff and iintron function calls can be nested and if iintroff is called multiple times, the application must call iintron the same number of times to reenable execution of asynchronous handlers. This determination is performed by checking a count value and determining if count is greater than 0. The default value of count is 0. If in step 450 the method determines that iintroff has already been called without an accompanying iintron, i.e., count is greater than 0, then count is incremented in step 452 and operation completes. If iintroff has not already been called without an accompanying iintron in step 450, i.e. , count equals 0, then in step 454 the method sets count =1.

In step 456 the method examines a data structure to determine which sessions are enabled for the respective process. The method then performs the following operations for each session within the process. In step 458 the method calls the VISA operation viEnableEvent with mode VI_SUSPEND_HNDLR and event type VI_ALL_ENABLED_EVENTS. In step 460 the method determines if this was the last session in the process. If not, the method returns and repeats step 458. If this is determined to be the last session in the process in step 460, then operation completes.

Therefore, the SICL function call iintroff disables all asynchronous handlers for all sessions in a given process. This function maps to a VISA system through a series of calls to the VISA operation viEnableEvent with the mechanism parameter set to VI_SUSPEND_HNDLR to suspend execution of handlers for all currently enabled interrupt events for all sessions. It is noted that the events that occur afterwards are still queued and as soon as the handlers are enabled again, these events are processed. In performing this mapping, the method of the present invention maintains a list of all of the sessions within a given process, and this list is preferably created during an iopen instruction. The VISA system also maintains a data structure that lists all of the events related to interrupts for each type of session.

Mapping the SICL Function Call iintron to VISA

Figure 29:
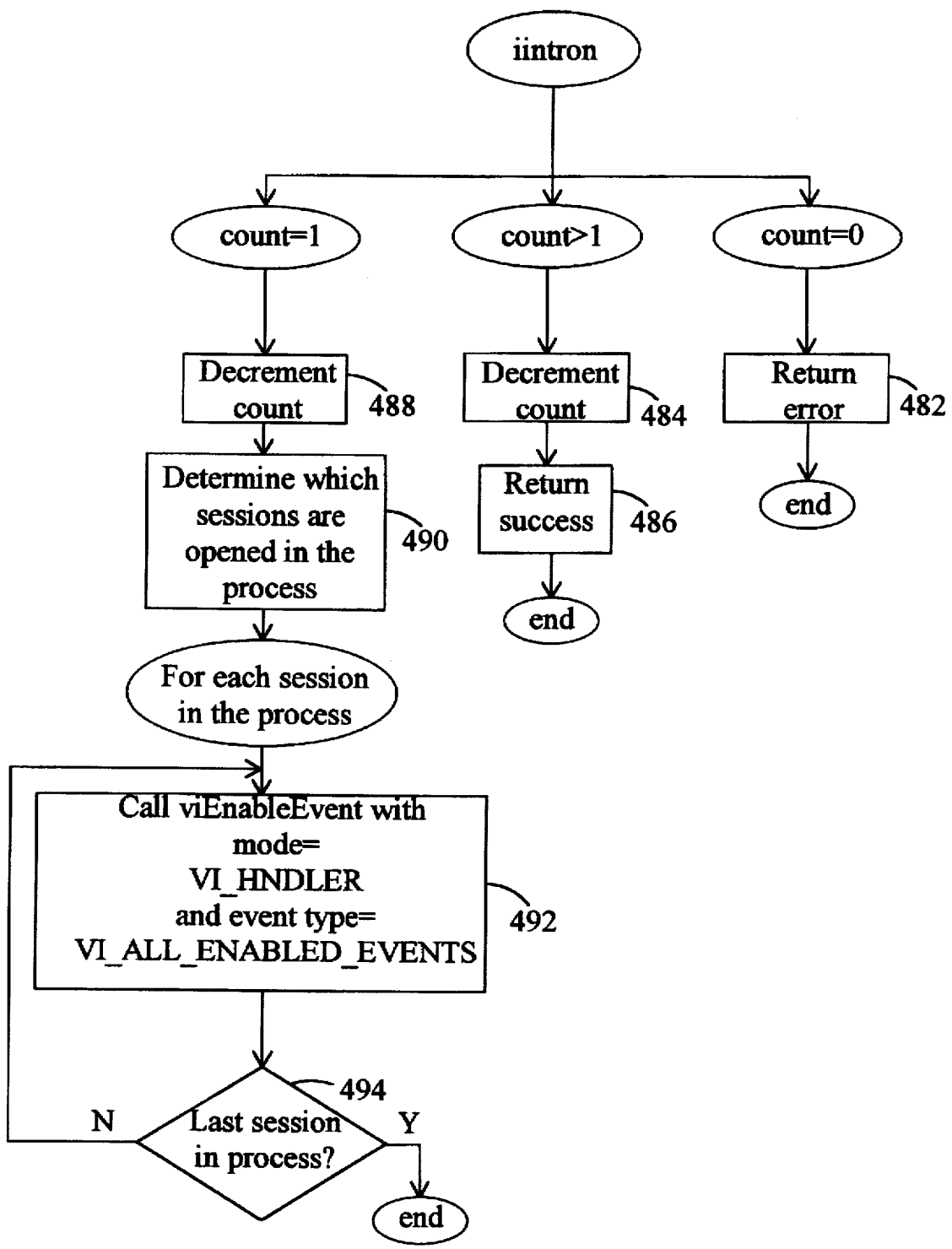
FIG. 29 is a flowchart diagram illustrating mapping of the SICL function call iintroff to a VISA system.

Referring now to FIG. 29, a flowchart diagram illustrating mapping of the SICL function iintron to corresponding VISA operations according to the preferred embodiment of the invention is shown. The SICL function iintron enables execution of asynchronous handlers. This function call is process based, i.e. , this function call enables execution of asynchronous handlers for all sessions within a given process. The iintron function does not include any parameters.

As shown in FIG. 29, the SICL function iintron is mapped depending upon the count value discussed above. As mentioned above, calls to the SICL functions iintroff and iintron can be nested. Thus, if the SICL function iintroff is called multiple times, the application calls the iintron function the same number of times to reenable the execution of asynchronous handlers. Therefore, the present invention maintains a count of the number of times the iintroff function has been called.

When the iintron function is called, the count value is examined. As shown in FIG. 29, if count is zero then an error is returned in step 482. If count is greater than 1, then in step 484 the count value is decremented and a success value is returned in step 486. If count is equal to 1, then in step 488 the count value is decremented. In step 490 the method determines which sessions are opened in the process. The following operations are then performed for each session in the process. In step 492 the method calls the VISA operation viEnableEvent and sets the mode to VI_HNDLR and the event type to VI_ALL_ENABLED_EVENTS. This operates to enable execution of handlers for all events enabled for the session. The operation of viEnableEvent with event type to VI_ALL_ENABLED_EVENTS is described below with regard to FIG. 33. The method then determines in step 494 if this is the last session in the process. If not, then the method returns and again performs step 492 for the next session. If this is the last session in the process, then operation completes.

Therefore, the method of the present invention maps the SICL function call iintron to numerous VISA viEnableEvent operations. The method maintains a data structure of all of the respective VISA sessions within a SICL process and uses this data structure when the SICL function call iintron is called to invoke the VISA operation viEnableEvent for each of the sessions corresponding to the SICL process. The present invention also maintains a count value since calls to the iintroff and iintron SICL functions can be nested. In performing this mapping, the method of the present invention maintains a list of all of the sessions within a given process, and this list is preferably created during an iopen instruction. The VISA system also maintains a data structure that lists all of the events related to interrupts for each type of session.

Mapping the SICL Function Call ionintr to VISA

Figure 30:
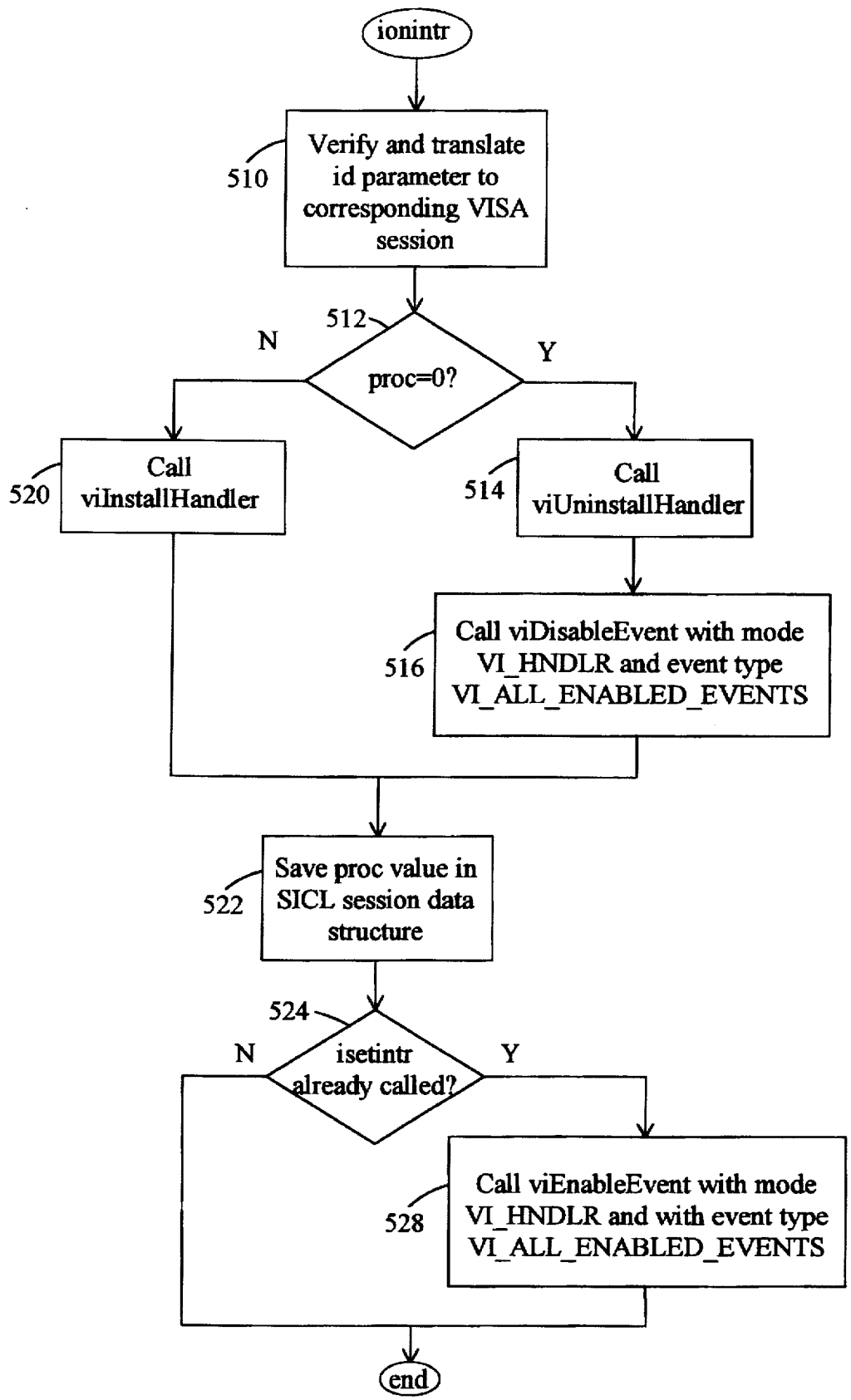
FIG. 30 is a flowchart diagram illustrating mapping of the SICL function call ionintr to a VISA system.

Referring now to FIG. 30, a flowchart diagram illustrating mapping of the SICL function call ionintr to a VISA system is shown. The purpose of the SICL function call ionintr is to install an interrupt handler. The ionintr function call includes two function parameters, referred to as id and proc. The id parameter is a session identifier returned from a SICL function call iopen() or igetintfsess(). The proc parameter identifies a procedure to be installed as an interrupt handler. This function maps to one of four VISA operations, referred to as viInstallHandler, viUninstallHandler, viEnableEvent and viDisableEvent.

It is noted that VISA cannot call a SICL program's handler directory because of different prototypes used. Therefore, the method of the present invention installs a handler that is called by the VISA system which in turn calls the user's handler. Therefore, when ionintr is called, the method of the present invention installs a common callback routine for whichever events have been enabled and also saves the value of proc in a SICL session data structure.

As shown in FIG. 30, when the SICL ionintr function call is received, the method verifies and translates (if necessary) the id parameter to a corresponding VISA session which is used as the vi parameter in VISA operations. In step 512 the method determines if the proc parameter is equal to zero. If so, the method calls the VISA operation viUninstallHandler in step 514. The method then calls the VISA operation viDisableEvent in step 516 with mode VI_HNDLR and with event type=VI_ALL_ENABLED_EVENTS. Therefore, if the proc parameter is set to zero, the method uninstalls the callback routine by calling the VISA operation viUninstallHandler and disables any events which are currently enabled by calling the VISA operation viDisableEvent. The method then advances to step 526.

If the proc value is determined to not be set to zero in step 512, then in step 520 the method calls the VISA operation viInstallHandler. Here, the method installs a handler that can be called by the VISA system and which in turn calls the user's handler. In step 522 the method determines if the SICL function isetintr has already been called. If so, then in step 524, the method calls the VISA operation viEnableEvent with the mechanism parameter set to VI_HNDLR and with event type=VI_ALL_ENABLED_EVENTS. If the SICL function isetintr is determined to not have already been called in step 522, then operation proceeds directly to step 526. In step 526 the method saves the value of the proc parameter in a SICL session data structure and operation then completes.

As noted above, in the SICL Driver level library, installing an interrupt handler and enabling interrupt conditions are treated as independent events. Therefore, the function ionintr can be called before or after the SICL function isetintr. If the SICL function call ionintr is called before isetintr, then the method maps the ionintr function call to the VISA operation viInstallHandler. If the SICL function call ionintr is called after the SICL function isetintr, then the method of the present invention calls both VISA operations viInstallHandler and viEnableEvent.

Mapping the SICL Function Call ionsrq to VISA

Figure 31:
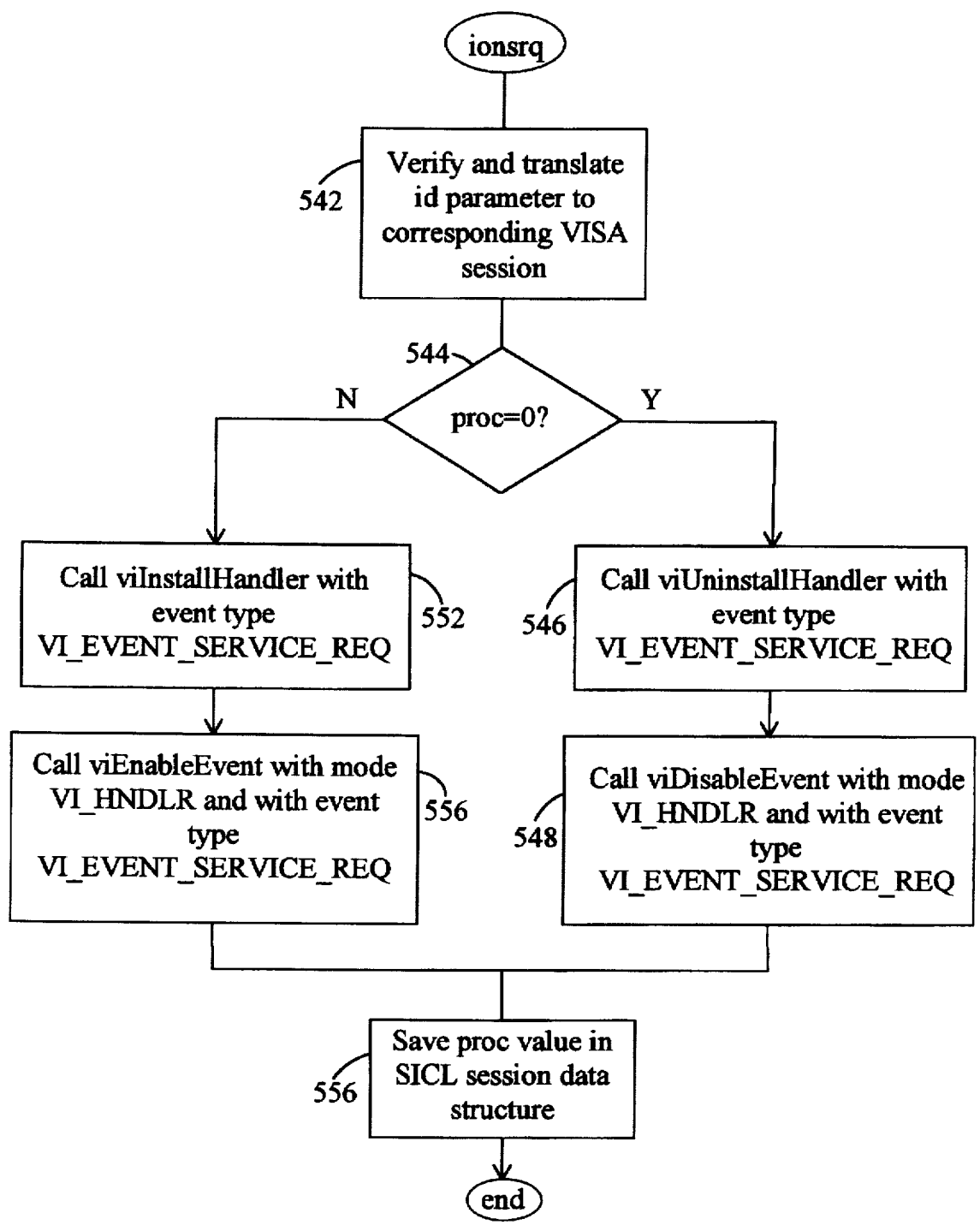
FIG. 31 is a flowchart diagram illustrating mapping of the SICL function call ionsrq to a VISA system.

Referring now to FIG. 31, a flowchart diagram illustrating mapping of the SICL function call ionsrq to a VISA system is shown. The purpose of the SICL function call ionsrq is to install an SRQ handler. In SICL, SRQ interrupts are treated differently than other interrupts, and thus a separate function to install the SRQ handler is included in addition to the SICL function call ionintr, which installs interrupt handlers for all other interrupts. The SICL function call ionsrq includes two parameters referred to as id and proc. As mentioned above, the id parameter is a session identifier returned from a SICL function iopen() or igetintfsess(). The proc parameter identifies a procedure to be installed as the srq handler. The SICL function call ionsrq maps to four possible VISA operations, these being viInstallHandler, viUninstallHandler, viEnableEvent, and viDisableEvent.

As shown in FIG. 31, in step 542 the method verifies and translates (if necessary) the id parameter to the corresponding VISA session. This parameter is then used as the vi parameter in subsequent VISA operations. In step 544 the method determines if the proc parameter is equal to zero. If the proc value is equal to zero, indicating that no handler should be installed, then in step 546 the method calls the VISA operation viUninstallHandler with the event type VI_EVENT_SERVICE_REQ to uninstall the callback routine. In step 548 the method calls the VISA operation viDisableEvent to disable receiving of the SRQ event for the specified session. The method then advances to step 556.

If the proc value is determined to not be zero in step 544, then in step 552 the method calls the VISA operation viInstallHandler with event type VI_EVENT_SERVICE_REQ to install a callback routine for the VISA event VI_EVENT_SERVICE_REQ. In step 554 the method calls viEnableEvent with mode VI HNDLR and event type VI_EVENT_SERVICE_REQ. In step 556 the method then saves the proc value in a SICL data structure, and operation then completes.

As with the SICL function call ionintr, a VISA system cannot call a SICL program's handler directory because of different prototypes used. Therefore, the system and method of the present invention installs a handler that can be called by a VISA system and which in turn calls the user's handler in the SICL application. Therefore, when the SICL function ionsrq is received, the method installs a callback routine preferably for the VI_EVENT_SERVICE_REQ event. The method also saves the proc value in a SICL session data structure for later use.

Mapping the SICL Function Call ionerror to VISA

Figure 32:
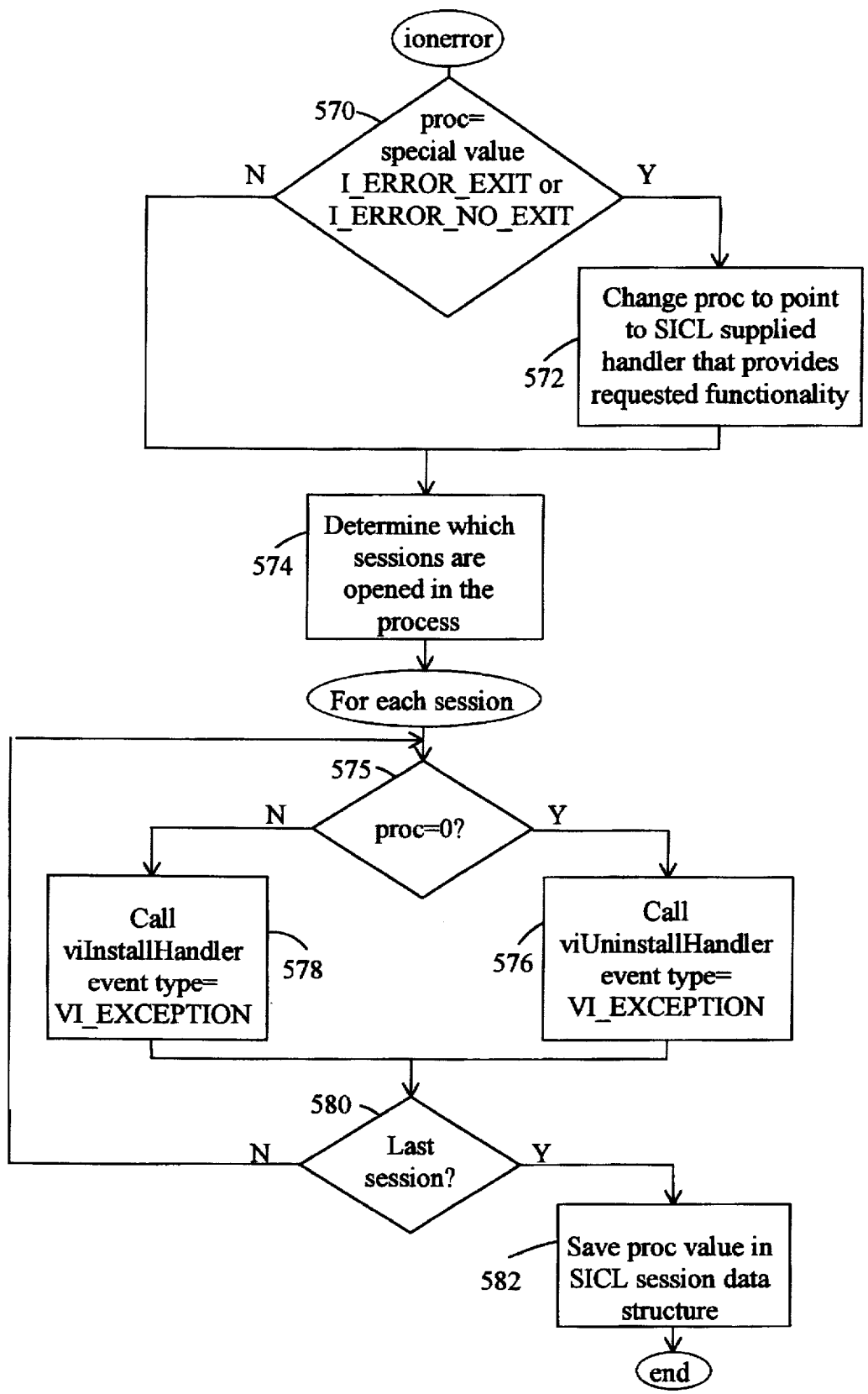
FIG. 32 is a flowchart diagram illustrating mapping of the SICL function call ionerror to a VISA system.

An exception is essentially a software interrupt, i.e., an interrupt generated by the software application or an Driver level library. In VISA, an exception is treated like any other event. In the SICL Driver level library, an exception invokes an error handling routine which is called by the SICL function call ionerror. Referring now to FIG. 32, a flowchart diagram illustrating mapping of the SICL function call ionerror to a VISA system is shown. In VISA, exception handling is session based, whereas in SICL the error handling performed when an exception occurs is process based. The purpose of the SICL function call ionerror is to install an error handler for all sessions of a process. The SICL function call ionerror includes one parameter, referred to as proc. The proc parameter references an error handler that is installed for all sessions of the process. The function call ionerror maps to either of two VISA operations, referred to as viInstallHandler and viUninstallHandler.

As shown in FIG. 32, in step 570 the method determines if proc is equal to a special value such as I_ERROR_EXIT or I_ERROR_NO_EXIT. The SICL library includes two special error handlers required by the SICL Driver level library. The first error handler referred to as I_ERROR_EXIT prints a diagnostic message to the stderr of the process and terminates the process. The second error handler referred to as I_ERROR_NO_EXIT also prints a message to the stderr of the process, but allows the process to continue execution. The user preferably installs one of these handlers as the error handler by setting the proc parameter to either I_ERROR_EXIT or I_ERROR_NO_EXIT, respectively. If proc is equal to one of these special values, then in step 572 the method changes the parameter proc to point to a SICL supplied handler that provides the requested function. The method then performs the following operations for each session in the process.

In step 574 the method determines which sessions are opened in the process. In step 575 the method determines if the proc parameter is equal to zero. If so, then in step 576 the method calls the VISA operation viUninstallHandler with event type VI_EXCEPTION. If the proc parameter is determined to not equal zero in step 575, then in step 578 the method calls the VISA operation viInstallHandler with event type VI_EXCEPTION. After either of steps 576 or 578, the method determines if this is the last session in the process in step 580. If not, then operation returns to step 575 where the above steps are repeated for the next respective session in the process. If this session is determined to be the last session in the process in step 580, then in step 582 the proc value is saved as a process global, and operation completes.

Therefore, as discussed above, since a VISA system cannot call a SICL program's handler directly because of different prototypes used, the system and method of the present invention installs a handler that can be called by a VISA system and which in turn calls the user's handler. The system and method of the present invention installs a handler for every session in the respective process because error handling is performed per session in VISA and performed per process in SICL. It is also noted that each time a new SICL session is opened after the SICL function call ionerror has been called, the method of the present invention installs the handler on that new session as well. If the proc parameter is set to zero for the new session, then the callback routine is uninstalled for that session. Therefore, step 575 and either of steps 576 or 578 are performed for each new session after the SICL function call ionerror has been called.

Event Type VI_ALL_ENABLED_EVENTS

Figure 33:
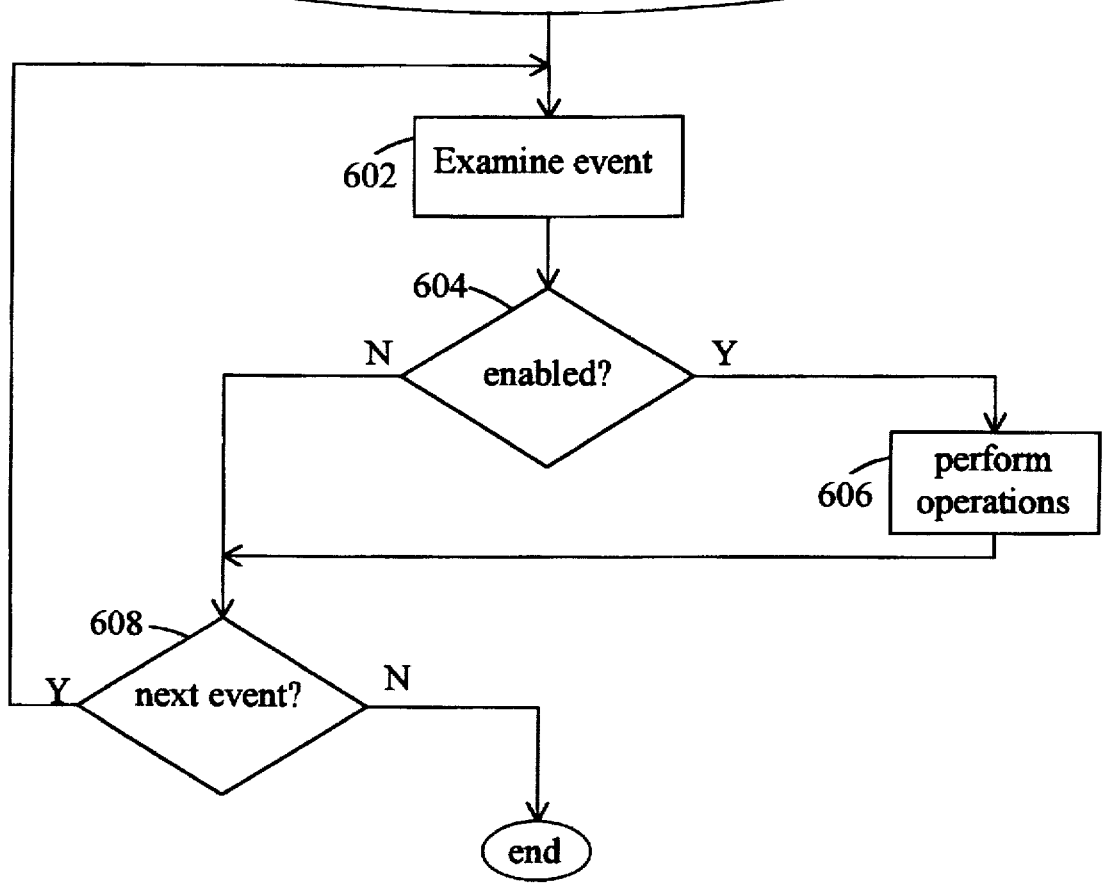
FIG. 33 is a flowchart diagram illustrating the VISA operations viEnableEvent and viDisableEvent with event type equal to VI_ALL_ENABLED_EVENTS.

Referring now to FIG. 33, a flowchart diagram illustrating operation of a VISA system executing a viEnableEvent or viDisableEvent operation with event type VI_ALL_ENABLED_EVENTS is shown. In step 602 the method examines an event and in step 604 determines if the event is enabled. If so, in step 606 the method performs the operation indicated by the viEnableEvent operation or the viDisableEvent operation. In step 608 the method then determines if this is the last event for the session. The VISA system preferably maintains a data structure which indicates all enabled events for a session, and this data structure is checked in step 608. If additional events are enabled for the session, the method returns to step 602 and performs the above steps again. If this is the last event enabled for the session, then operation completes.

Mapping the SICL Function Call iintron to VISA— Alternate Embodiment

Figure 34:
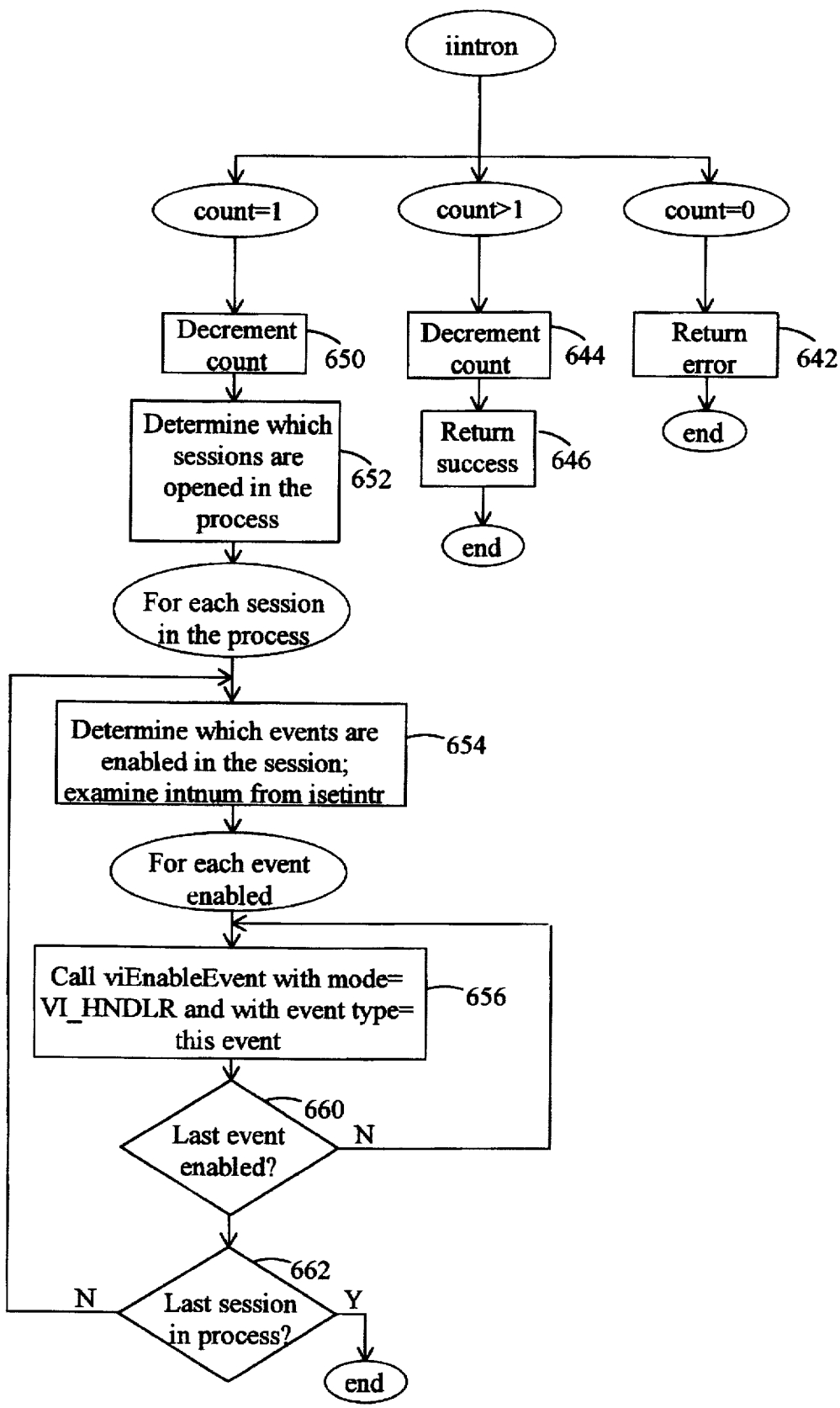
FIG. 34 is a flowchart diagram illustrating mapping of the SICL function call iintron to a VISA system according to an alternate embodiment of the invention.

Referring now to FIG. 34, a flowchart diagram illustrating mapping of the SICL function iintron to corresponding VISA operations according to an alternate embodiment of the invention is shown. It is noted that the pseudo-code listing included as Appendix 2 describes this alternate embodiment. As described above, the SICL function iintron enables execution of asynchronous handlers. This function call is process based, i.e., this function call enables execution of asynchronous handlers for all sessions within a given process. This embodiment does not use the VISA operation viEnableEvent with event type VI_ALL_ENABLED_EVENTS, but rather the mapping system and method calls viEnableEvent multiple times for all enabled events in the session.

As shown in FIG. 34 and as described above, the SICL function iintron is mapped depending upon a count value. Calls to the SICL functions iintroff and iintron can be nested. Thus, if the SICL function iintroff is called multiple times, the application calls the iintron function the same number of times to reenable the execution of asynchronous handlers. Therefore, the present invention maintains a count of the number of times the iintroff function has been called.

When the iintron function is called, the count value is examined. As shown in FIG. 34, if count is zero then an error is returned in step 642 and operation completes. If count is greater than 1, then in step 644 the count value is decremented and a success value is returned in step 646, and operation completes. If count is equal to 1, then in step 650 the count value is decremented. In step 652 the method determines which sessions are opened in the process. The following operations are then performed for each session in the process. In step 654 the method determines which events are enabled for the respective session by examining the intnum parameter used in the prior isetintr call. For each event enabled in the session, the method calls the VISA operation viEnableEvent in step 456 using the mode VI_HNDLR. The method then determines if this is the last event for the respective session. If not, then the method returns and again performs step 456 for the next event. If this is the last event enabled for the respective session, then the method determines in step 462 if this is the last session in the process. If not, the method returns to step 454 and performs steps 454 and 456 and 460 for the next session in the process. If this is determined to be the last session in the process in step 462, then operation completes.

Therefore, this alternate method maps the SICL function call iintron to numerous VISA viEnableEvent operations. The method preferably maintains a data structure of all of the respective VISA sessions within a SICL process and uses this data structure when the SICL function call iintron is called to invoke the VISA operation viEnableEvent for each of the sessions corresponding to the SICL process. The present invention also maintains a count value since calls to the iintroff and iintron SICL functions can be nested. In performing this mapping, the method of the present invention maintains a list of all of the sessions within a given process, and this list is preferably created during an iopen instruction. The method of the present invention also maintains a data structure that lists all of the events related to interrupts for each type of session.

Mapping the SICL Function Call iintroff to VISA— Alternate Embodiment

Figure 35:
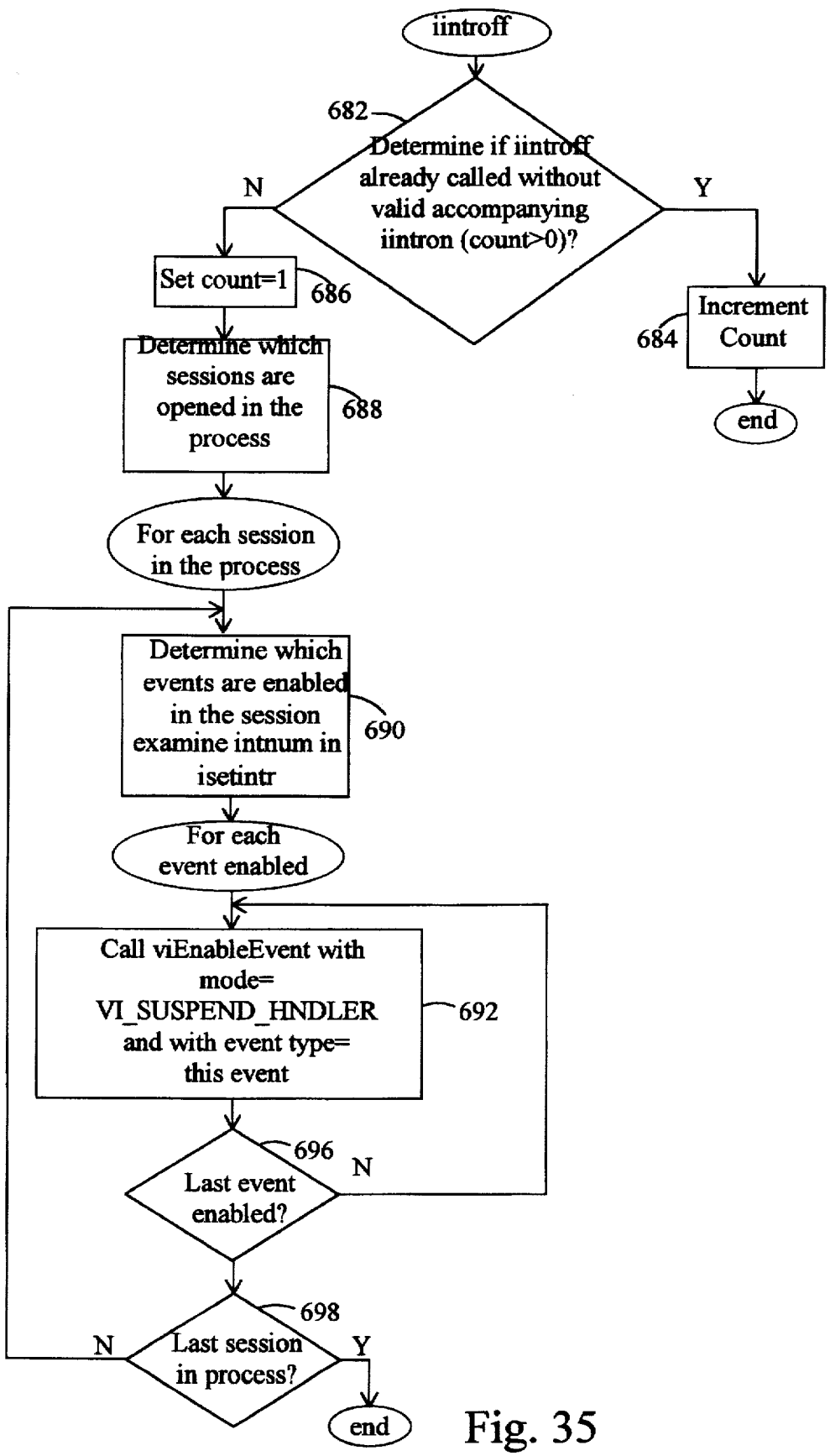
FIG. 35 is a flowchart diagram illustrating mapping of the SICL function call iintroff to a VISA system according to an alternate embodiment of the invention.

Referring now to FIG. 35, a flowchart diagram illustrating mapping of the SICL function call iintroff to a VISA system according to an alternate embodiment of the invention is shown. As described above, the purpose of the SICL function call iintroff is to disable execution of asynchronous handlers, and this function call generally maps to the VISA operation viEnableEvent. This embodiment does not use viEnableEvent with event type VI_ALL_ENABLED_EVENTS, but rather calls viEnableEvent multiple times for all enabled events in the session.

As shown in FIG. 35 when the iintroff function is called, in step 682 the method determines if the function iintroff has already been called without an accompanying iintron. This determination is made because the iintroff and iintron function calls can be nested, as mentioned above, and if iintroff is called multiple times, the application must call iintron the same number of times to reenable execution of asynchronous handlers. If in step 682 the method determines that iintroff has already been called without an accompanying iintron, then a count is incremented in step 684 and operation completes.

If iintroff has not already been called without an accompanying iintron in step 682, then in step 686 the method sets count=1. In step 688 the method examines a data structure to determine which sessions are opened in the respective process. The method then performs the following operations for each session within the process. In step 690 the method determines which events are enabled in a respective session by examining the intnum parameter in a prior isetintr function call. The method then performs the following operations for each event enabled in a respective session. In step 692 the method calls the VISA operation viEnableEvent with mode VI_SUSPEND_HNDLR. In step 696 the method determines if this was the last event enabled for the respective session. If not, the method returns and repeats step 692 for each of the remaining enabled events in the session. If this is determined to be the last event enabled in the session in step 696, then in step 698 the method determines if this is the last session in the process. If not, then the method returns to step 690 and performs steps 690, 692 and 696 for the next session in the process. If this is determined to be the last session in the process in step 698, then operation completes.

Therefore, the SICL function call iintroff disables all asynchronous handlers for all sessions in a given process. This function maps to a VISA system through a series of calls to the VISA operation viEnableEvent with the mechanism parameter set to viSuspendHandler to suspend execution of handlers for all currently enabled interrupt events for all sessions. As noted above, this method does not invoke viEnableEvent with event type VI_ALL_ENABLED_EVENTS, but rather invokes viEnableEvent multiple times for each event enabled in the session.

Conclusion

Therefore, a system and method for mapping SICL event function calls to a VISA system is shown and described. The enabling and disabling of execution of handlers in the SICL Driver level library are session-based and thus the method of the present invention maintains a data structure storing the VISA sessions corresponding to each respective SICL process. The method of the present invention also maintains various data structures, preferably within the VISA system, storing information regarding which events are enabled and disabled in respective VISA sessions corresponding to SICL processes. Further, since the SICL function calls iintron and iintroff can be nested, the method of the present invention maintains a count to properly map these function calls to VISA operations. In addition, since the SICL function calls iintron and iintroff are process-based, the method of the present invention is required to invoke numerous VISA operations corresponding to VISA sessions within a respective process when the above two SICL functions are called. In addition, since a VISA system cannot call a SICL Driver level library's program handler directory because of different prototypes, the method of the present invention installs a handler which is called by the VISA system and which in turn calls the user's handler desired to be called.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

The following discloses the manner in which a non-VISA application, specifically an application conforming to the Standard Instrument Control Library (SICL), maps to a VISA system according to one embodiment of the present invention.

Section 1
VISA-4 Overview

1.1 Introduction

Scope and Objective

This document describes how to build a library that can accommodate SICL applications running on a VISA system. This SICL-to-VISA Mapping Library (hereafter referred to as a SICL Mapping Library) works as a translator that converts SICL function calls into zero, one, or more calls to VISA. This document describes how to translate or map every SICL function call into VISA and how to map error codes returned by the VISA operations to SICL error codes.

In addition to explaining how to map SICL to VISA, this document explains some of the differences between SICL and VISA in terms of their model and approach and how these differences affect the mapping. It also explains how to bridge these differences. You can find this information in the overview section and the function description sections of this document.

This document is not meant to be a comprehensive reference for either SICL or VISA. This document refers frequently to SICL functions and VISA operations without describing those functions or operations in full detail. Refer to the respective specification documents for full descriptions of the SICL functions and VISA operations.

Audience

The primary audience of this document consists of software developers who intend to build a SICL Mapping Library to support SICL applications running on a VISA system. System architects and software developers who are interested in porting SICL applications to VISA will also find useful information in this document. However, this document is not intended to be a porting guide, and should not be used as such.

The audience is assumed to have read the SICL and VISA specifications and be familiar with both SICL and VISA. This document uses terms, concepts, functions, and operations from both SICL and VISA, and the reader is assumed to be familiar with them.

1.2 Related Documentation

The following documents contain information that you may find helpful as you read this document:

- VISA-1, *Virtual Instrument Software Architecture Main Specification*, Revision 2.0, May 2, 1994, National Instruments Corporation

- *Hewlett-Packard SICL*, Revision 3.8, August 10, 1993, Hewlett-Packard Co.

1.3 Overview

This section contains an overview of how SICL maps to VISA as an architecture. The topics covered in this section are laid out in a similar order as they appear in the SICL specification, although some SICL topics are grouped together here because they have certain concepts in common. A per-function mapping is covered in the following sections of this document, and all functions are discussed in the same order as they appear in the SICL specification.

Conformance to Support Levels

VISA has the ability to support a complete SICL implementation, which is designated as Level 3F. This means that all SICL session types (device, interface, and commander) are available, in addition to the formatted I/O functions. The current list of VISA resources includes support for the following interface types: GPIB, VXI, and Serial. While the GPIO and MSIB interfaces are not currently supported, there is nothing inherent in VISA that prevents such support. This document is based on SICL revision 3.8.

Address Strings

An address in VISA is a string (or other language construct) that is used to identify a particular resource. There is the option to set initial values for attributes in the address string and the option to specify additional resources that will be mounted to that resource. What this essentially means is that a VISA address identifies (or can identify) a number of resources. Because of this flexibility, one can construct a lengthy VISA address string. However, an address string in VISA can be shortened by substituting the full address string with an identifier that is equivalent to the full address string. The equivalence relation can be specified in a configuration file which has entries consisting of (identifier, full address string) pairs.

An address in SICL is used to identify a particular interface or a device on that interface. An interface or device in SICL usually corresponds to several resources in VISA. You can determine in advance the set of VISA resources that corresponds to an interface or device in SICL. You can store the VISA address string that identifies the set of VISA resources, along with an identifier, in the configuration file. The process of translating a SICL address to a VISA address during runtime, then, is a simple matter of translating the SICL address to an identifier that can be passed directly into VISA. VISA will be responsible for extracting the full address string from the configuration file.

Opening and Closing Sessions

Both VISA and SICL define a session as a communication channel to some object. In VISA, that object is a resource. In SICL, that object is an interface or device (either commander or servant). Because a SICL device, interface, or commander session generally corresponds to multiple VISA resources, the closest VISA approximation to a SICL session is a VISA session to the set of resources that corresponds to a SICL device, interface, or commander session.

Organizing multiple resources under one VISA session gives you control over the underlying resources through one session. As far as mapping SICL to VISA is concerned, such a VISA session behaves like a SICL session. However, this masks out a big difference between SICL and VISA, which is the granularity of what a session can control. Because VISA sessions can also be used to control much finer-grained objects such as read, write, or trigger resources, using one VISA session to control all resources associated with a SICL session minimizes this difference to a degree where it is hardly noticeable at the session layer. However, the difference in the kinds of hardware and software services that SICL and VISA provide is not affected by grouping control of several resources into a single VISA session.

In a SICL Mapping Library, a SICL session identifier can be implemented as a reference to a data structure. This structure contains information about the session, including the corresponding VISA session identifier and other information such as session type (device, interface or commander). We will not list all the information stored in the session data structure here, but the descriptions for the individual SICL functions will point out what information needs to be stored in the session data structure.

Nonformatted I/O

Nonformatted I/O functions are used to send and receive unformatted blocks of data to and from a device. How the blocks of data are interpreted is dependent on what the device is and how it has been programmed. Operations that carry out nonformatted I/O functions in SICL are very similar to those in VISA, with minor differences. For example, whether to send an END indicator is specified in SICL as part of the function call itself, while in VISA it is an attribute.

Formatted I/O

Most of the formatted I/O functions in SICL correspond directly to VISA operations, with only a few differences. First, iprintf() and the related functions in SICL return the number of parameters formatted, but viPrintf() and the related operations in VISA return a standard VISA status (by default), which is VI_SUCCESS for success. However, these VISA operations can also return the number of bytes or parameters formatted; this is controlled by the attribute VI_ATTR_RETURN_MODE. This attribute should be set to VI_PARAMETERS whenever a session is opened, which will make the VISA operations return a status value compatible with SICL.

The second difference is that isprintf(), isscanf(), and the related functions in SICL do not take a session parameter, while the corresponding VISA operations do. This is because the VISA operations, while not using the formatting buffers, still use the attributes for the given session (for example, specifying and recognizing a termination character). For this reason, a SICL Mapping Library should create a default session to the formatted I/O resource (per process) to be used by these functions.

One particular area of similarity between the two models is that just as SICL formatted I/O functions use the iread() and iwrite() calls at a lower level, the VISA formatted I/O resource makes use of the read and write resources. Therefore, in both SICL and VISA, a given session should use either nonformatted or formatted I/O calls, but not both.

Device/Interface Control

The main difference in this section is that the ihint() function in SICL specifies whether DMA should be used in reads and writes, but the VISA attribute VI_ATTR_TRANSFER_MECH also applies to viMove(). There is no harm in this, as the SICL specification does not disallow it. The VISA model gives you more precise control over the supported hardware capabilities.

Service Requests, Interrupts, and Asynchronous Events

Interrupts that a user application is enabled to receive are modeled as events in VISA. When an interrupt occurs within a VISA resource, the resource notifies the appropriate session(s) that an event occurred. Then the event handlers on those sessions are invoked and/or the event is queued. (The terms *event handlers, interrupt handlers,* and *callback routines* are synonymous.) Event handlers in VISA can perform the functionality of interrupt handlers in SICL, although events in VISA have a wider scope than interrupts. One difference between event handlers in VISA and interrupt handlers in SICL is that while there is only one interrupt handler per session in SICL, there can be many event handlers per session in VISA, one or more for each type of event.

To map between SICL interrupts and VISA events, you need to know the set of VISA events that are related to SICL interrupts for each session type (device, interface or commander) and each interface type (GPIB, VXI, or Serial). You also need to know which event(s) correspond to a particular type of interrupt in order to map functions like isetintr(). All this information can be determined in advance and can be stored in a data structure for use at run time.

Service requests, or SRQs, are also treated as events in VISA. Much of the preceding information about interrupts also applies to SRQs. Mapping SRQs between SICL and VISA is straightforward because there is an SRQ event in VISA.

The prototype of a VISA callback routine is different from that of its SICL counterpart. When a user installs a SICL callback routine, VISA cannot call that routine directly. Instead, a SICL Mapping Library should provide a common callback routine that can be called from VISA, and that routine can in turn call the appropriate SICL handler with the right parameters. This callback routine also wakes up any threads or processes sleeping in the iwaithdlr() function. The implementor of the library can make this common callback routine handle both interrupt and SRQ callbacks, as well as exceptions (errors).

Locking and Timeouts

The locking mechanism of VISA is a superset of that of SICL. VISA supports various types of locking (exclusive locks and non-exclusive locks) as well as a mechanism to share locks between sessions and processes. SICL supports one mode of lock, the one equivalent to exclusive locks in VISA without lock sharing. As such, in mapping SICL lock calls to VISA, you should use only exclusive locks.

Timeouts are implemented as attributes in VISA. Timeout periods are determined by a combination of two attributes: the timeout value and the timeout unit. Because SICL uses milliseconds as the timeout unit, set the timeout unit to milliseconds and refrain from modifying it.

VISA has two different types of timeouts. One is a timeout due to the operation taking too much time to execute and the other is a timeout due to waiting for a resource that was locked. SICL, however, does not distinguish between these two kinds of timeouts, and so in mapping SICL to VISA, simply set both timeouts to whatever timeout value is specified in the SICL itimeout() function.

One further distinction is that while SICL timeouts are per session, timeouts in VISA are per session per resource. However, because a single VISA session can control multiple resources, setting a timeout on the session affects all resources that the session controls.

Miscellaneous Functions

A logical unit in SICL is a number associated with a particular interface card. SICL lets you obtain information about the number of interface cards plugged into the system, and then get information about any given interface. VISA also lets you obtain information about what kinds of interfaces are available, but the interfaces are not numbered, as they are in SICL. In VISA, each interface card has a resource that can be found using viFindRsrc(), which is the CPU Interface Resource. The information can then be retrieved by opening a session to that resource, and getting the necessary attributes. A SICL Mapping Library can perform these actions when it is loaded, and it can assign numbers at that time.

The remaining miscellaneous SICL functions are handled in a SICL Mapping Library and are not mapped to VISA operations. Most of these functions involve concepts that are not applicable in VISA (such as getting the session type) or simple operations that can be implemented without calling VISA operations (such as byte swapping).

Error Handling

Error handling in VISA is done on a per-session basis, while error handling in SICL is done on a per-process basis. In both SICL and VISA, however, the error handler is invoked in the context of the thread that caused the error. When a process sets an error handler in SICL, a SICL Mapping Library has to set the error handler of all VISA sessions currently opened and all VISA sessions subsequently opened (which will be done during an iopen() or igetintfsess() call).

Because VISA does error handling on a per-session basis, a session must be opened before error handling can be done. Therefore, errors that occurred in iopen() cannot be handled with the error handling mechanism of VISA. However, this difference is not important, because the SICL Mapping Library can call the user's error handler (if one is installed) when any non-success value is returned by viOpen().

A single SICL function call can be mapped into making a series of VISA operations. If an error occurs after one or more VISA operations has been carried out, it may be necessary to *roll back* those operations or perform some compensating operations to restore the system to the state it was in prior to the function call. Although it is not always possible to undo operations, every SICL-to-VISA mapping call will guarantee that the system is in a consistent state.

Mapping and Low-Level I/O

The way memory mapping is performed is quite different between SICL and VISA. In SICL, a single session can have multiple low-level mappings simultaneously. However, these mappings can be distinguished only by the address that was mapped, because there is not a separate ID for each map. One result of this is that the byte order must be passed to all low-level block copy operations, because this may vary from one mapping to another within the same session. Another effect is that all the parameters that were passed to imap() must also be passed to iunmap() when undoing a SICL mapping.

In VISA, each mapping represents a unique session to the low-level mapping interface. Therefore, there is a unique ID for each map. This approach allows for finer control over such attributes as byte order, which can be specified at the time of the map rather than in each copy operation. In addition, only the session ID that was mapped needs to be passed to viUnmap().

For each call to imap(), a SICL Mapping Library must open a session to the low-level resource and store this ID in the SICL session structure. It is on this new ID that the VISA operation viMap() is then called. Therefore, when any of the SICL low-level calls are made (for example, iunmap()), this ID must be retrieved from the SICL session structure associated with the ID passed into that call (that is, iunmap()) by searching for the specified address. This map ID is then used on the corresponding VISA operation(s).

GPIB Specifics

Most of the GPIB-specific SICL functions correspond to the VISA operations viSetAttribute() and viGetAttribute(). The remaining functionality maps easily to other VISA GPIB operations.

VXI Specifics

The only difference in this area is that the SICL function ivxirminfo() lets you get information about *any* logical address, not just the one specified by the session ID passed to that function. In a SICL Mapping Library, this function needs to open a session to the device at the specified logical address. However, that session ID does not need to be stored in any structure, as it should be closed at the end of the routine.

Serial Specifics

Most of the serial-specific SICL functions correspond to the VISA operations viSetAttribute() and viGetAttribute(). The remaining functionality maps easily to other VISA serial operations.

In the SICL function iserialstat(), two values that can be retrieved include I_SERIAL_MSL and I_SERIAL_STAT, which describe both the current state of several values and whether those values have changed since they were last read. While the current state is available in VISA via the operation viGetAttribute(), a SICL Mapping Library must keep a soft copy each time it is read to determine whether any values have changed. Alternately, the library could monitor the serial-specific VISA events to provide the same functionality.

1.4 SICL Functions

The following sections of this document contain descriptions of all the functions documented in the SICL specification. For each SICL function, there is a list of the VISA operation(s) that are necessary to implement that function. This document also shows how each parameter from the SICL function maps to an argument in a VISA operation. Finally, all relevant return codes from the VISA operations are matched to the SICL error codes that would be returned in each case. Other VISA error codes that either should not occur or do not apply are not listed.

In certain cases, a SICL function must be implemented completely in the SICL Mapping Library. One example of this is the iversion() function, which returns SICL version information. This function must be implemented in the SICL Mapping Library because the version of SICL is private to SICL and does not correspond to the version of VISA. The function descriptions in this document indicate which functions should be implemented solely within the SICL Mapping Library.

Section 2
Conformance to Support Levels

```
int iversion(siclversion, implversion)
```

Purpose
   Returns version information.

Parameters

| Name | Type | Description |
|---|---|---|
| siclversion | int * | Location to store version of SICL |
| implversion | int * | Location to store version of the library |

VISA Operation(s)
   This function is implemented in the SICL Mapping Library.

Overview
   This function can be used by an application to determine which version of SICL the library supports. In addition, it provides information about the implementation version of the SICL Mapping Library itself. This function always returns a success return code.

Note: *Similar functionality is available in VISA by getting the* VI_ATTR_RSRC_VERSION *attribute on a given session. This returns version information about the specific resource that the session is accessing.*

Section 3
Opening and Closing Sessions

`INST iopen(addr)`

Purpose
   Creates a session and returns a reference to a data structure used by the library.

Parameter

| Name | Type | Description |
|---|---|---|
| addr | char * | Address of a device, interface, or commander |

VISA Operation(s)

`ViStatus viOpen(sesn, rsrcName, accessMode, timeout, vi)`

Overview
   `iopen()` maps to the `viOpen()` operation in VISA. The `addr` parameter in `iopen()` is similar to the `rsrcName` parameter in `viOpen()` in that they both specify the entity to be opened (a resource or resource list in VISA, or a device, interface or commander in SICL). However, because the format of the `addr` string in SICL is different from the format of `rsrcName` in VISA, some conversion is required.

`viOpen()` has the additional parameters `sesn`, `accessMode`, `timeout`, and `vi`. The `sesn` parameter refers to a session to the VISA Resource Manager, which should be `viDefaultRM`. The `accessMode` parameter describes what kind of locking to perform on the resource (exclusive, non-exclusive, or none). Because `iopen()` cannot perform any locking, `accessMode` should be set to no lock. The `timeout` parameter is useful only when trying to set a lock when opening a session, so this should be set to 0. Unlike `iopen()`, which returns the session through the return value, `viOpen()` returns the session through the `vi` parameter.

The session and interface type which was opened should be recorded because it is necessary to know this information in order to map subsequent SICL calls (for example, `iwrite()`). The session data structure is used to store various other information necessary to map SICL functions to VISA. The usage of this information is described in the relevant SICL functions.

If an error handler has been set for the process (through `ionerror()`), the common event handler should be installed on the VISA session using the `viInstallHandler()` operation.

Note: *The following return values show the error codes that would be passed to the error handler, because the SICL function returns a valid session handle on success and (INST) 0 on failure.*

Return Values

| VISA | SICL |
|---|---|
| VI_SUCCESS | Session handle value |
| VI_ERROR_RSRC_NFOUND | I_ERR_BADADDR<br>I_ERR_SYMNAME<br>I_ERR_INVLADDR |
| VI_ERROR_INV_RSRC_NAME | I_ERR_SYNTAX |
| VI_ERROR_ALLOC_FAILED | I_ERR_NORSRC |

```
int iclose(id)
```

Purpose
Closes a session.

Parameter

| Name | Type | Description |
|---|---|---|
| id | INST | Session identifier returned from iopen() |

VISA Operation(s)

```
ViStatus viClose(vi)
```

Overview
iclose() maps to the viClose() operation in VISA. iclose() should call viClose() with the VISA session identifier stored in the session data structure, free the session data structure, and return the converted error code. In addition, if the session is of device or commander type, check if an interface session has been created through an igetintfsess() call. If this is the case, close the interface session as well.

Return Values

| VISA | SICL |
|---|---|
| VI_SUCCESS | I_ERR_NOERROR |
| VI_ERROR_INV_SESSION | I_ERR_BADID |
| VI_ERROR_CLOSING_FAILED | I_ERR_OS |

INST igetintfsess(id)

Purpose

Returns an interface session associated with the interface where the device resides.

Parameter

| Name | Type | Description |
|---|---|---|
| id | INST | Session identifier returned from iopen() |

VISA Operation(s)

```
ViStatus viOpen(sesn, rsrcName, accessMode, timeout, vi)
```

Overview

To get an interface session associated with the interface on which the device or commander is located, simply open a session to that interface. To get the interface name, take the address string of the device or commander, which can be stored in the SICL session data structure, and extract the interface name. For example, if the SICL address string is "VXI0,1", the interface name is "VXI0". However, because the format of the addr string in SICL is different from the format of rsrcName in VISA, some conversion is required before this string can be passed to viOpen().

Upon opening the interface session, the session identifier should be stored in the SICL session data structure associated with id so that the same interface session will be given on subsequent igetintfsess() calls for this device or commander session. In addition, when the device or commander session is closed, the SICL Mapping Library should automatically close the interface session.

Note: *The following return values show the error codes that would be passed to the error handler, because the SICL function returns a valid session handle on success and (INST) 0 on failure.*

Return Values

| VISA | SICL |
|---|---|
| VI_SUCCESS | Session handle value |
| VI_ERROR_INV_SESSION | I_ERR_BADID |
| VI_ERROR_ALLOC_FAILED | I_ERR_NORSRC |

Section 4
Nonformatted I/O

```
int iwrite(id, buf, datalen, end, actualcnt)
```

Purpose
    Performs an unbuffered write to a device, interface, or commander session.

Parameters

| Name | Type | Description |
|---|---|---|
| id | INST | Session identifier returned from iopen() or igetintfsess() |
| buf | char * | Location of buffer of data to be written |
| datalen | unsigned long | Length in bytes of data to be written |
| end | int | Whether END should be sent with last byte |
| actualcnt | unsigned long * | Location to store number of bytes actually written |

VISA Operation(s)

```
ViStatus viSetAttribute(vi, attribute, attrState)
ViStatus viWrite(vi, buf, count, retCount)
ViStatus viGPIBWrite(vi, buf, count, retCount)
ViStatus viAsrlWrite(vi, buf, count, retCount)
```

Overview
    The id parameter is first verified and translated (if necessary) to the corresponding VISA session, which will be used as the vi parameter in the VISA operation. The SICL function iwrite() maps to viWrite() if the session type is device or commander, and maps to an interface-specific write operation if the session type is interface. In SICL, not all interfaces support write operations on interface sessions (for example, GPIB does but VXI does not). The VI_ATTR_SEND_END_EN attribute needs to be set prior to the write operation to specify whether to send END with the last byte.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_RAW_WR_PROT_VIOL<br>VI_ERROR_RAW_RD_PROT_VIOL<br>VI_ERROR_INP_PROT_VIOL<br>VI_ERROR_BERR<br>VI_ERROR_NADDRESSED | I_ERR_IO |
| VI_ERROR_ABORT<br>VI_ERROR_CLR_ABORT | I_ERR_ABORTED |
| VI_ERROR_IN_PROGRESS | I_ERR_BUSY |
| VI_ERROR_INV_SETUP | I_ERR_BADCONFIG |
| VI_ERROR_NLISTENERS | I_ERR_NODEV | int iread(id, buf, bufsize, reason, actualcnt)

Purpose

Performs an unbuffered read from a device, interface, or commander session.

Parameters

| Name | Type | Description |
|---|---|---|
| id | INST | Session identifier returned from iopen() or igetintfsess() |
| buf | char * | Location of buffer to store data that is read |
| bufsize | unsigned long | Length in bytes of buffer |
| reason | int * | Location to store reason why function terminated |
| actualcnt | unsigned long * | Location to store number of bytes actually read |

VISA Operation(s)

```
ViStatus viRead(vi, buf, count, retCount)
ViStatus viGPIBRead(vi, buf, count, retCount)
ViStatus viAsrlRead(vi, buf, count, retCount)
```

Overview

The id parameter is first verified and translated (if necessary) to the corresponding VISA session, which will be used as the vi parameter in the VISA operation. The SICL function iread() maps to the viRead() operation if the session type is device or commander, and maps to an interface-specific read operation if the session type is interface. In SICL, not all interfaces support read operations on interface sessions (for example, GPIB does but VXI does not). In VISA, the return code includes the reason for termination of the read operation, so the reason parameter should be set according to the status returned.

Return Values

| VISA | SICL |
|---|---|
| VI_SUCCESS<br>VI_SUCCESS_TERM_CHAR<br>VI_SUCCESS_MAXCNT | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_RAW_WR_PROT_VIOL<br>VI_ERROR_RAW_RD_PROT_VIOL<br>VI_ERROR_OUTP_PROT_VIOL<br>VI_ERROR_BERR<br>VI_ERROR_NADDRESSED | I_ERR_IO |
| VI_ERROR_ABORT<br>VI_ERROR_CLR_ABORT | I_ERR_ABORTED |
| VI_ERROR_IN_PROGRESS | I_ERR_BUSY |
| VI_ERROR_INV_SETUP | I_ERR_BADCONFIG | int itermchr(id, chr)

Purpose
    Sets the termination character.

Parameters

| Name | Type | Description |
|------|------|-------------|
| id | INST | Session identifier returned from iopen() or igetintfsess() |
| chr | int | Termination character |

VISA Operation(s)

ViStatus SetAttribute(vi, attribute, attrState)

Overview
    To set the termination character in VISA, set the VI_ATTR_TERMCHAR_EN attribute to VI_FALSE if chr is -1; otherwise, set it to VI_TRUE and set the VI_ATTR_TERMCHAR attribute to the actual termination character.

Return Values

| VISA | SICL |
|------|------|
| VI_SUCCESS | I_ERR_NOERROR |
| VI_ERROR_INV_SESSION | I_ERR_BADID |
| VI_ERROR_NSUP_ATTR | I_ERR_NOTSUPP |
| VI_ERROR_NSUP_ATTR_STATE | I_ERR_PARAM | int igettermchr(id, chr)

Purpose
    Gets the termination character.

Parameters

| Name | Type | Description |
|------|------|-------------|
| id | INST | Session identifier returned from iopen() or igetintfsess() |
| chr | int * | Location to store termination character |

VISA Operation(s)

ViStatus viGetAttribute(vi, attribute, attrState)

Overview
    To get the termination character in VISA, get the value of the VI_ATTR_TERMCHAR_EN attribute to find out whether the termination character is disabled. If it is VI_FALSE, set chr to -1; otherwise, get the value of the VI_ATTR_TERMCHAR attribute and store it in chr.

Return Values

| VISA | SICL |
|------|------|
| VI_SUCCESS | I_ERR_NOERROR |
| VI_ERROR_INV_SESSION | I_ERR_BADID |
| VI_ERROR_NSUP_ATTR | I_ERR_NOTSUPP |

Section 5
Formatted I/O

```
int iprintf(id, fmt, arg1, arg2, ...)
```

Purpose
Formats the data and then performs a buffered write to a device, interface, or commander session.

Parameters

| Name | Type | Description |
| --- | --- | --- |
| id | INST | Session identifier returned from iopen() or igetintfsess() |
| fmt | char * | String describing formatting to perform |
| arg1, arg2, ... | | Parameters to be formatted |

VISA Operation(s)

```
ViStatus viPrintf(vi, writeFmt, arg1, arg2, ...)
ViStatus viVPrintf(vi, writeFmt, params)
```

Overview
The id parameter is first verified and translated (if necessary) to the corresponding VISA session, which will be used as the vi parameter in the VISA operations. Because the VISA formatted I/O resource offers a superset of format codes over the SICL formatted I/O functions, the fmt parameter can be passed directly as the writeFmt parameter to VISA. The arguments themselves are compatible as well, which means that when converting a SICL *program* to VISA, the arguments could be used as is, with the function viPrintf(). However, in implementing a SICL Mapping Library, the arguments can be passed only by reference, which requires using viVPrintf() rather than viPrintf(). If the attribute VI_ATTR_RETURN_TYPE is set to VI_PARAMETERS when the session is opened, the VISA operation will return the number of parameters formatted, which is compatible with SICL.

Note: *The following return values show the error codes that would be passed to the error handler, because the SICL function returns the number of parameters formatted on success and 0 on failure.*

Return Values

| VISA | SICL |
|---|---|
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_IO | I_ERR_IO |
| VI_ERROR_INV_FMT<br>VI_ERROR_NSUP_FMT | I_ERR_BADFMT |
| VI_ERROR_ABORT | I_ERR_ABORTED |

```
int iscanf(id, fmt, arg1, arg2, ...)
```

Purpose

Performs a buffered read from a device, interface, or commander session, and then converts the formatted data.

Parameters

| Name | Type | Description |
|---|---|---|
| id | INST | Session identifier returned from `iopen()` or `igetintfsess()` |
| fmt | char * | String describing formatting to perform |
| arg1, arg2, ... | | Parameters to be formatted |

VISA Operation(s)

```
ViStatus viScanf(vi, readFmt, arg1, arg2, ...)
ViStatus viVScanf(vi, readFmt, params)
```

Overview

The id parameter is first verified and translated (if necessary) to the corresponding VISA session, which will be used as the vi parameter in the VISA operation. Because the VISA formatted I/O resource offers a superset of format codes over the SICL formatted I/O functions, the fmt parameter can be passed directly as the readFmt parameter to VISA. The arguments themselves are compatible as well, which means that when converting a SICL *program* to VISA, the arguments could be used as is, with the viScanf() operation. However, in implementing a SICL Mapping Library, the arguments can be passed only by reference, which requires using viVScanf() rather than viScanf(). If the attribute VI_ATTR_RETURN_TYPE is set to VI_PARAMETERS when the session is opened, the VISA operation will return the number of parameters formatted, which is compatible with SICL.

*Note: The following return values show the error codes that would be passed to the error handler, because the SICL function returns the number of parameters formatted on success and 0 on failure.*

Return Values

| VISA | SICL |
|---|---|
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_IO | I_ERR_IO |
| VI_ERROR_INV_FMT<br>VI_ERROR_NSUP_FMT | I_ERR_BADFMT |
| VI_ERROR_ABORT | I_ERR_ABORTED |

```
int ipromptf(id, writefmt, readfmt, arg1, arg2, ...)
```

Purpose

Formats the data, performs a buffered write (prompt) to a device or interface session, and flushes the write buffer. Performs a buffered read on the same session, and then converts the formatted data.

Parameters

| Name | Type | Description |
|---|---|---|
| id | INST | Session identifier returned from iopen() or igetintfsess() |
| writefmt | char * | String describing formatting to perform on the write |
| readfmt | char * | String describing formatting to perform on the read |
| arg1, arg2, ... | | Parameters to be formatted |

VISA Operation(s)

```
ViStatus viQueryf(vi, writeFmt, readFmt, arg1, arg2, ...)
ViStatus viVQueryf(vi, writeFmt, readFmt, params)
```

Overview

The id parameter is first verified and translated (if necessary) to the corresponding VISA session, which will be used as the vi parameter in the VISA operation. Because the VISA formatted I/O resource offers a superset of format codes over the SICL formatted I/O functions, the writefmt and readfmt parameters can be passed directly as the writeFmt and readFmt parameters to VISA. The arguments themselves are compatible as well, which means that when converting a SICL *program* to VISA, the arguments could be used as is, with the viQueryf() operation. However, in implementing a SICL Mapping Library, the arguments can be passed only by reference, which requires using viVQueryf() rather than viQueryf(). If the attribute VI_ATTR_RETURN_TYPE is set to VI_PARAMETERS when the session is opened, the VISA operation will return the number of parameters formatted, which is compatible with SICL. This function returns an error for commander sessions.

Note: *The following return values show the error codes that would be passed to the error handler, because the SICL function returns the number of parameters formatted on success and 0 on failure.*

Return Values

| VISA | SICL |
|---|---|
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_IO | I_ERR_IO |
| VI_ERROR_INV_FMT<br>VI_ERROR_NSUP_FMT | I_ERR_BADFMT |
| VI_ERROR_ABORT | I_ERR_ABORTED |

Section 5. Formatted I/O int ivprintf(id, fmt, params)

Purpose

Formats the data and then performs a buffered write to a device, interface, or commander session.

Parameters

| Name | Type | Description |
|---|---|---|
| id | INST | Session identifier returned from iopen() or igetintfsess() |
| fmt | char * | String describing formatting to perform |
| params | va_list | Parameters to be formatted |

VISA Operation(s)

ViStatus viVPrintf(vi, writeFmt, params)

Overview

The id parameter is first verified and translated (if necessary) to the corresponding VISA session, which will be used as the vi parameter in the VISA operations. Because the VISA formatted I/O resource offers a superset of format codes over the SICL formatted I/O functions, the fmt parameter can be passed directly as the writeFmt parameter to VISA. The params argument is compatible as well. If the attribute VI_ATTR_RETURN_TYPE is set to VI_PARAMETERS when the session is opened, the VISA operation will return the number of parameters formatted, which is compatible with SICL.

*Note: The following return values show the error codes that would be passed to the error handler, because the SICL function returns the number of parameters formatted on success and 0 on failure.*

Return Values

| VISA | SICL |
|---|---|
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_IO | I_ERR_IO |
| VI_ERROR_INV_FMT<br>VI_ERROR_NSUP_FMT | I_ERR_BADFMT |
| VI_ERROR_ABORT | I_ERR_ABORTED |

```
int ivscanf(id, fmt, params)
```

Purpose

Performs a buffered read from a device, interface, or commander session, and then converts the formatted data.

Parameters

| Name | Type | Description |
|---|---|---|
| id | INST | Session identifier returned from iopen() or igetintfsess() |
| fmt | char * | String describing formatting to perform |
| params | va_list | Parameters to be formatted |

VISA Operation(s)

```
ViStatus viVScanf(vi, readFmt, params)
```

Overview

The id parameter is first verified and translated (if necessary) to the corresponding VISA session, which will be used as the vi parameter in the VISA operation. Because the VISA formatted I/O resource offers a superset of format codes over the SICL formatted I/O functions, the fmt parameter can be passed directly as the readFmt parameter to VISA. The params argument is compatible as well. If the attribute VI_ATTR_RETURN_TYPE is set to VI_PARAMETERS when the session is opened, the VISA operation will return the number of parameters formatted, which is compatible with SICL.

Note: *The following return values show the error codes that would be passed to the error handler, because the SICL function returns the number of parameters formatted on success and 0 on failure.*

Return Values

| VISA | SICL |
|---|---|
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_IO | I_ERR_IO |
| VI_ERROR_INV_FMT<br>VI_ERROR_NSUP_FMT | I_ERR_BADFMT |
| VI_ERROR_ABORT | I_ERR_ABORTED | int ivpromptf(id, writefmt, readfmt, params)

Purpose

Formats the data, performs a buffered write (prompt) to a device or interface session, and flushes the write buffer. Performs a buffered read on the same session, and then converts the formatted data.

Parameters

| Name | Type | Description |
|---|---|---|
| id | INST | Session identifier returned from iopen() or igetintfsess() |
| writefmt | char * | String describing formatting to perform on the write |
| readfmt | char * | String describing formatting to perform on the read |
| params | va_list | Parameters to be formatted |

VISA Operation(s)

ViStatus viVQueryf(vi, writeFmt, readFmt, params)

Overview

The id parameter is first verified and translated (if necessary) to the corresponding VISA session, which will be used as the vi parameter in the VISA operation. Because the VISA formatted I/O resource offers a superset of format codes over the SICL formatted I/O functions, the writefmt and readfmt parameters can be passed directly as the writeFmt and readFmt parameters to VISA. The params argument is compatible as well. If the attribute VI_ATTR_RETURN_TYPE is set to VI_PARAMETERS when the session is opened, the VISA operation will return the number of parameters formatted, which is compatible with SICL. This function returns an error for commander sessions.

*Note: The following return values show the error codes that would be passed to the error handler, because the SICL function returns the number of parameters formatted on success and 0 on failure.*

Return Values

| VISA | SICL |
|---|---|
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_IO | I_ERR_IO |
| VI_ERROR_INV_FMT<br>VI_ERROR_NSUP_FMT | I_ERR_BADFMT |
| VI_ERROR_ABORT | I_ERR_ABORTED |

```
int isprintf(buf, fmt, arg1, arg2, ...)
```

Purpose

Formats the data and then writes it to a user-supplied buffer.

Parameters

| Name | Type | Description |
|---|---|---|
| buf | char * | User-supplied output buffer |
| fmt | char * | String describing formatting to perform |
| arg1, arg2, ... | | Parameters to be formatted |

VISA Operation(s)

```
ViStatus viSPrintf(vi, buf, writeFmt, arg1, arg2, ...)
ViStatus viSVPrintf(vi, buf, writeFmt, params)
```

Overview

All parameters are compatible from the SICL function to the VISA operation, because the VISA formatted I/O resource offers a superset of format codes over the SICL formatted I/O functions. When converting a SICL *program* to VISA, the variable arguments could be used as is, with the viSPrintf() operation. However, in implementing a SICL Mapping Library, the arguments can be passed only by reference, which requires using viSVPrintf() rather than viSPrintf(). If the attribute VI_ATTR_RETURN_TYPE is set to VI_PARAMETERS when the session is opened, the VISA operation will return the number of parameters formatted, which is compatible with SICL. One difference is that the VISA operations take a session parameter, so the SICL library creates a default session to be used for this purpose.

Note: *The following return values show the error codes that would be passed to the error handler, because the SICL function returns the number of parameters formatted on success and 0 on failure.*

Return Values

| VISA | SICL |
|---|---|
| VI_ERROR_RSRC_LOCKED | I_ERR_LOCKED<br>I_ERR_TIMEOUT |
| VI_ERROR_TMO | I_ERR_TIMEOUT |
| VI_ERROR_INV_FMT<br>VI_ERROR_NSUP_FMT | I_ERR_BADFMT |
| VI_ERROR_ABORT | I_ERR_ABORTED | int isvprintf(buf, fmt, params)

Purpose
Formats the data and then writes it to a user-supplied buffer.

Parameters

| Name   | Type    | Description                           |
|--------|---------|---------------------------------------|
| buf    | char *  | User-supplied output buffer           |
| fmt    | char *  | String describing formatting to perform |
| params | va_list | Parameters to be formatted            |

VISA Operation(s)

```
ViStatus visVPrintf(vi, buf, writeFmt, params)
```

Overview
All parameters are compatible from the SICL function to the VISA operation, because the VISA formatted I/O resource offers a superset of format codes over the SICL formatted I/O functions. If the attribute VI_ATTR_RETURN_TYPE is set to VI_PARAMETERS when the session is opened, the VISA operation will return the number of parameters formatted, which is compatible with SICL. One difference is that the VISA operations take a session parameter, so the SICL library creates a default session to be used for this purpose.

> Note: *The following return values show the error codes that would be passed to the error handler, because the SICL function returns the number of parameters formatted on success and 0 on failure.*

Return Values

| VISA                               | SICL                         |
|------------------------------------|------------------------------|
| VI_ERROR_RSRC_LOCKED               | I_ERR_LOCKED<br>I_ERR_TIMEOUT |
| VI_ERROR_TMO                       | I_ERR_TIMEOUT                |
| VI_ERROR_INV_FMT<br>VI_ERROR_NSUP_FMT | I_ERR_BADFMT              |
| VI_ERROR_ABORT                     | I_ERR_ABORTED                |

```
int isscanf(buf, fmt, arg1, arg2, ...)
```

Purpose

Reads and converts formatted data from a user-supplied buffer.

Parameters

| Name | Type | Description |
|---|---|---|
| buf | char * | User-supplied input buffer |
| fmt | char * | String describing formatting to perform |
| arg1, arg2, ... | | Parameters to be formatted |

VISA Operation(s)

```
ViStatus viSScanf(vi, buf, readFmt, arg1, arg2, ...)
ViStatus viSVScanf(vi, buf, readFmt, params)
```

Overview

All parameters are compatible from the SICL function to the VISA operation, because the VISA formatted I/O resource offers a superset of format codes over the SICL formatted I/O functions. When converting a SICL *program* to VISA, the variable arguments could be used as is, with the viSScanf() operation. However, in implementing a SICL Mapping Library, the arguments can be passed only by reference, which requires using viSVScanf() rather than viSScanf(). If the attribute VI_ATTR_RETURN_TYPE is set to VI_PARAMETERS when the session is opened, the VISA operation will return the number of parameters formatted, which is compatible with SICL. One difference is that the VISA operations take a session parameter, so the SICL library creates a default session to be used for this purpose.

Note: *The following return values show the error codes that would be passed to the error handler, because the SICL function returns the number of parameters formatted on success and 0 on failure.*

Return Values

| VISA | SICL |
|---|---|
| VI_ERROR_RSRC_LOCKED | I_ERR_LOCKED<br>I_ERR_TIMEOUT |
| VI_ERROR_TMO | I_ERR_TIMEOUT |
| VI_ERROR_INV_FMT<br>VI_ERROR_NSUP_FMT | I_ERR_BADFMT |
| VI_ERROR_ABORT | I_ERR_ABORTED |

```
int isvscanf(buf, fmt, params)
```

Purpose

Reads and converts formatted data from a user-supplied buffer.

Parameters

| Name | Type | Description |
|---|---|---|
| buf | char * | User-supplied input buffer |
| fmt | char * | String describing formatting to perform |
| params | va_list | Parameters to be formatted |

VISA Operation(s)

```
VIstatus visVscanf(vi, buf, readFmt, params)
```

Overview

All parameters are compatible from the SICL function to the VISA operation, because the VISA formatted I/O resource offers a superset of format codes over the SICL formatted I/O functions. If the attribute VI_ATTR_RETURN_TYPE is set to VI_PARAMETERS when the session is opened, the VISA operation will return the number of parameters formatted, which is compatible with SICL. One difference is that the VISA operations take a session parameter, so the SICL library creates a default session to be used for this purpose.

*Note: The following return values show the error codes that would be passed to the error handler, because the SICL function returns the number of parameters formatted on success and 0 on failure.*

Return Values

| VISA | SICL |
|---|---|
| VI_ERROR_RSRC_LOCKED | I_ERR_LOCKED<br>I_ERR_TIMEOUT |
| VI_ERROR_TMO | I_ERR_TIMEOUT |
| VI_ERROR_INV_FMT<br>VI_ERROR_NSUP_FMT | I_ERR_BADFMT |
| VI_ERROR_ABORT | I_ERR_ABORTED |

```
int ifwrite(id, buf, datalen, end, actualcnt)
```

Purpose
Performs a buffered write to a device, interface, or commander session.

Parameters

| Name | Type | Description |
|---|---|---|
| id | INST | Session identifier returned from iopen() or igetintfsess() |
| buf | char * | Location of buffer of data to be written |
| datalen | unsigned long | Length in bytes of data to be written |
| end | int | Whether END should be sent with last byte |
| actualcnt | unsigned long * | Location to store number of bytes actually written |

VISA Operation(s)

```
ViStatus viSetAttribute(vi, attribute, attrState)
ViStatus viBWrite(vi, buf, count, retcount)
```

Overview
The id parameter is first verified and translated (if necessary) to the corresponding VISA session, which will be used as the vi parameter in the VISA operations. The VI_ATTR_SEND_END_EN attribute needs to be set prior to the write operation to specify whether to send END with the last byte. The other arguments to ifwrite() correspond directly to arguments to viBWrite().

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_IO | I_ERR_IO |
| VI_ERROR_ABORT | I_ERR_ABORTED |

```
int ifread(id, buf, bufsize, reason, actualcnt)
```

Purpose
    Performs a buffered read from a device, interface, or commander session.

Parameters

| Name | Type | Description |
|---|---|---|
| id | INST | Session identifier returned from iopen() or igetintfsess() |
| buf | char * | Location of buffer to store data that is read |
| bufsize | unsigned long | Length in bytes of buffer |
| reason | int * | Location to store reason why function terminated |
| actualcnt | unsigned long * | Location to store number of bytes actually read |

VISA Operation(s)

```
ViStatus viBRead(vi, buf, count, retcount)
```

Overview
    The id parameter is first verified and translated (if necessary) to the corresponding VISA session, which will be used as the vi parameter in the VISA operation. The other arguments to ifread(), with the exception of reason, correspond directly to arguments to viBRead(). In VISA, the return code includes the reason for termination of the read operation, so the reason parameter should be set according to the status returned.

Return Values

| VISA | SICL |
|---|---|
| VI_SUCCESS<br>VI_SUCCESS_TERM_CHAR<br>VI_SUCCESS_MAXCNT | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_IO | I_ERR_IO |
| VI_ERROR_ABORT | I_ERR_ABORTED |

```
int iflush(id, mask)
```

Purpose

Manually flushes or discards the read and/or write buffers for the given session.

Parameters

| Name | Type | Description |
|---|---|---|
| id | INST | Session identifier returned from iopen() or igetintfsess() |
| mask | int | Bit field describing which buffers to flush or discard |

VISA Operation(s)

```
ViStatus viFlush(vi, mask)
```

Overview

The id parameter is first verified and translated (if necessary) to the corresponding VISA session, which will be used as the vi parameter in the VISA operation. The mask argument to iflush() corresponds directly to the mask argument to viFlush().

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_IO | I_ERR_IO |
| VI_ERROR_ABORT | I_ERR_ABORTED |
| VI_ERROR_INV_MASK | I_ERR_PARAM |

```
int isetbuf(id, mask, size)
```

Purpose
Specifies the size and behavior of the read or write buffer for the given session.

Parameters

| Name | Type | Description |
|---|---|---|
| id | INST | Session identifier returned from iopen() or igetintfsess() |
| mask | int | Bit field describing which buffer to set |
| size | int | Set size and operational mode of specified buffer |

VISA Operation(s)

```
ViStatus viSetBuf(vi, mask, size)
ViStatus viSetAttribute(vi, attribute, attrState)
```

Overview
The id parameter is first verified and translated (if necessary) to the corresponding VISA session, which will be used as the vi parameter in the VISA operations. The mask argument to isetbuf corresponds directly to the mask argument to viSetBuf(). The absolute value of the size parameter is used to set the buffer size in viSetBuf(). If successful, the sign of size is then used to set the operational mode via viSetAttribute(). The attribute, based on the value of mask, is VI_ATTR_RD_BUF_OPER_MODE or VI_ATTR_WR_BUF_OPER_MODE.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_ALLOC_FAILED | I_ERR_NORSRC |
| VI_ERROR_INV_MASK | I_ERR_PARAM |

```
int isetubuf(id, mask, size, buf)
```

Purpose
Specifies the size, behavior, and location of the read or write buffer for the given session.

Parameters

| Name | Type | Description |
|---|---|---|
| id | INST | Session identifier returned from iopen() or igetintfsess() |
| mask | int | Bit field describing which buffer to set |
| size | int | Set size and operational mode of specified buffer |
| buf | char * | Pointer to user-supplied buffer |

VISA Operation(s)

```
ViStatus viSetUBuf(vi, mask, size, buf)
ViStatus viSetAttribute(vi, attribute, attrState)
```

Overview

The id parameter is first verified and translated (if necessary) to the corresponding VISA session, which will be used as the vi parameter in the VISA operations. The mask and buf arguments to isetubuf correspond directly to the mask and buf arguments to viSetUBuf(). The absolute value of the size parameter is used to set the buffer size in viSetUBuf(). If successful, the sign of size is then used to set the operational mode via viSetAttribute(). The attribute, based on the value of mask, is VI_ATTR_RD_BUF_OPER_MODE or VI_ATTR_WR_BUF_OPER_MODE.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_INV_MASK | I_ERR_PARAM |

Section 6
Device/Interface Control

```
int iclear(id)
```

Purpose
  Performs a clear (device or interface) and flushes the formatted I/O buffers.

Parameter

| Name | Type | Description |
|------|------|-------------|
| id | INST | Session identifier returned from iopen() or igetintfsess() |

VISA Operation(s)

```
ViStatus viClear(vi)
ViStatus viSendIFC(vi)
ViStatus viAssertUtilBusSignal(vi, signal=VI_SYSRESET, mode)
ViStatus viAsrlSendBreak(vi, unit=VI_ASRL_FRAME_TIME, length)
```

Overview
  The id parameter is first verified and translated (if necessary) to the corresponding VISA session, which will be used as the vi parameter in the VISA operations. For device sessions, the viClear() operation is invoked, and the formatted I/O buffers are automatically cleared by this operation. For interface sessions, iclear() maps to an interface-specific VISA operation: viSendIFC() for GPIB, viAssertUtilBusSignal() for VXI, and viAsrlSendBreak() for Serial. This function returns an error for commander sessions.

Return Values

| VISA | SICL |
|------|------|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_IO | I_ERR_IO |
| VI_ERROR_ABORT | I_ERR_ABORTED |
| VI_ERROR_NSYS_CNTLR | I_ERR_NOINTF |

```
int ireadstb(id, stb)
```

Purpose

Reads the status byte from a device.

Parameters

| Name | Type | Description |
|---|---|---|
| id | INST | Session identifier returned from iopen() |
| stb | unsigned char * | Location where the status byte will be placed |

VISA Operation(s)

```
ViStatus viReadSTB(vi, status)
```

Overview

The id parameter is first verified and translated (if necessary) to the corresponding VISA session, which will be used as the vi parameter in the VISA operation. For device sessions, ireadstb() maps directly to viReadSTB(), and the stb parameter corresponds to the status parameter. This function returns an error for interface and commander sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_SRQ_NOCCURRED | I_ERR_NODEV |

```
int isetstb(id, stb)
```

Purpose

Sets the status byte for the session and conditionally asserts SRQ, depending on its value.

Parameters

| Name | Type | Description |
|---|---|---|
| id | INST | Session identifier returned from iopen() |
| stb | unsigned char | The value of the new status byte |

VISA Operation(s)

```
ViStatus ViRequestServ(vi, request, status)
```

Overview

The id parameter is first verified and translated (if necessary) to the corresponding VISA session, which will be used as the vi parameter in the VISA operation. For commander sessions, isetstb() invokes viRequestServ(). The request parameter is based on bit 6 of the stb parameter, which specifies whether to assert SRQ. The status parameter is the same as the stb parameter. This function returns an error for device and interface sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_INV_SERV_REQUEST | I_ERR_PARAM |

```
int itrigger(id)
```

Purpose

Performs a software trigger on a device or interface.

Parameter

| Name | Type | Description |
|------|------|-------------|
| id | INST | Session identifier returned from iopen() or igetintfsess() |

VISA Operation(s)

```
ViStatus viAssertTrigger(vi, protocol)
ViStatus viSetAttribute(vi, attribute, attrState)
```

Overview

The id parameter is first verified and translated (if necessary) to the corresponding VISA session, which will be used as the vi parameter in the VISA operation. For device sessions, itrigger() invokes viAssertTrigger() with the VI_TRIG_PROT_DEFAULT protocol. For GPIB interface sessions, itrigger() also maps to viAssertTrigger() with the VI_TRIG_PROT_DEFAULT protocol. For VXI interface sessions, it calls viAssertTrigger() with the VI_TRIG_PROT_SYNC protocol for each line that the SICL-defined value I_TRIG_STD is mapped to. For Serial interface sessions, it calls viSetAttribute() twice to *pulse* the attribute VI_ATTR_ASRL_DTR_STATE. This function returns an error for commander sessions.

Return Values

| VISA | SICL |
|------|------|
| VI_SUCCESS | I_ERR_NOERROR |
| VI_ERROR_INV_SESSION | I_ERR_BADID |
| VI_ERROR_RSRC_NEXISTS<br>VI_ERROR_NSUP_OPER | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_LINE_NCONFIG | I_ERR_BADCONFIG |
| VI_ERROR_LINE_IN_USE<br>VI_ERROR_OPER_NCOMPLETE<br>VI_ERROR_ACK_PENDING | I_ERR_BUSY | int ixtrig(id, which)

Purpose

Performs an interface-specific extended trigger.

Parameters

| Name | Type | Description |
|---|---|---|
| id | INST | Session identifier returned from iopen() or igetintfsess() |
| which | unsigned long | Type of interface trigger |

VISA Operation(s)

```
ViStatus viAssertTrigger(vi, protocol)
ViStatus viSetAttribute(vi, attribute, attrState)
```

Overview

The id parameter is first verified and translated (if necessary) to the corresponding VISA session, which will be used as the vi parameter in the VISA operation. For GPIB interface sessions, itrigger() maps to viAssertTrigger() with the VI_TRIG_PROT_DEFAULT protocol. For VXI interface sessions, it calls viAssertTrigger() with the VI_TRIG_PROT_SYNC protocol for each line specified by the which parameter. For Serial interface sessions, it calls viSetAttribute() twice to *pulse* the attribute (either VI_ATTR_ASRL_DTR_STATE or VI_ATTR_ASRL_RTS_STATE, depending on the value of which). This function returns an error for device and commander sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS<br>VI_ERROR_NSUP_OPER | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_LINE_NCONFIG | I_ERR_BADCONFIG |
| VI_ERROR_LINE_IN_USE<br>VI_ERROR_OPER_NCOMPLETE<br>VI_ERROR_ACK_PENDING | I_ERR_BUSY |
| VI_ERROR_RSRC_NFOUND<br>VI_ERROR_NSUP_ATTR | I_ERR_PARAM |

```
int ihint(id, hint)
```

Purpose

Changes method of I/O communication on a session.

Parameters

| Name | Type | Description |
|------|------|-------------|
| id | INST | Session identifier returned from iopen() or igetintfsess() |
| hint | int | Preferred method of communication |

VISA Operation(s)

```
ViStatus ViSetAttribute(vi, attribute, attrState)
```

Overview

The id parameter is first verified and translated (if necessary) to the corresponding VISA session, which will be used as the vi parameter in the VISA operation. The communication method in VISA is specified by the VI_ATTR_TRANSFER_MECH attribute, which is set via viSetAttribute(). If the value of hint is I_HINT_DONTCARE, I_HINT_USEPOLL, or I_HINT_USEINTR, the attribute value in VISA is VI_PIO. If hint is I_HINT_USEDMA, I_HINT_SYSTEM, or I_HINT_IO, the attribute value is VI_DMA. In VISA, the attribute is also used for block moves, whereas in SICL, the hint is only for reads and writes.

Return Values

| VISA | SICL |
|------|------|
| VI_SUCCESS | I_ERR_NOERROR |
| VI_ERROR_NSUP_ATTR | |
| VI_ERROR_NSUP_ATTR_STATE | |
| VI_ERROR_INV_SESSION | I_ERR_BADID |

```
int iremote(id)
```

Purpose
Puts device in remote mode.

Parameter

| Name | Type | Description |
|---|---|---|
| id | INST | Session identifier returned from iopen() |

VISA Operation(s)

```
ViStatus viRemoteEnable(vi, ren=VI_TRUE)
ViStatus viGPIBCommand(vi, buf, count, retcount)
ViStatus viSendCommand(vi, command=VI_CMD_MISC_WS, param)
ViStatus viSetAttribute(vi, attribute, attrState)
```

Overview
The id parameter is first verified and translated (if necessary) to the corresponding VISA session, which will be used as the vi parameter in the VISA operations. For GPIB device sessions, iremote() calls viRemoteEnable() and then viGPIBCommand(), which addresses the device to listen; for VXI device sessions, it sends the Word Serial *Set Lock* command in the param argument using viSendCommand(); and for Serial device sessions, it sets the VI_ATTR_ASRL_DTS_STATE attribute to VI_ASSERTED. This function returns an error for interface and commander sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_ABORT | I_ERR_ABORTED |
| VI_ERROR_NSYS_CNTLR<br>VI_ERROR_NCIC | I_ERR_NOINTF |
| VI_ERROR_NLISTENERS | I_ERR_NODEV |
| VI_ERROR_BERR<br>VI_ERROR_RAW_WR_PROT_VIOL<br>VI_ERROR_RAW_RD_PROT_VIOL<br>VI_ERROR_INP_PROT_VIOL<br>VI_ERROR_OUTP_PROT_VIOL | I_ERR_IO |

```
int ilocal(id)
```

Purpose
Puts device in local mode.

Parameter

| Name | Type | Description |
|---|---|---|
| id | INST | Session identifier returned from iopen() |

VISA Operation(s)

```
ViStatus viLocal(vi)
ViStatus viSendCommand(vi, command=VI_CMD_MISC_WS, param)
ViStatus viSetAttribute(vi, attribute, attrState)
```

Overview
The id parameter is first verified and translated (if necessary) to the corresponding VISA session, which will be used as the vi parameter in the VISA operation. For GPIB device sessions, ilocal() maps to viLocal(); for VXI device sessions, it sends the Word Serial *Clear Lock* command in the param argument using viSendCommand(); and for Serial device sessions, it sets the VI_ATTR_ASRL_DTS_STATE attribute to VI_UNASSERTED. This function returns an error for interface and commander sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_ABORT | I_ERR_ABORTED |
| VI_ERROR_BERR<br>VI_ERROR_RAW_WR_PROT_VIOL<br>VI_ERROR_RAW_RD_PROT_VIOL<br>VI_ERROR_INP_PROT_VIOL<br>VI_ERROR_OUTP_PROT_VIOL | I_ERR_IO |

```
int iabort(id)
```

Purpose

Aborts any SICL calls currently executing with the specified session id.

Parameter

| Name | Type | Description |
|---|---|---|
| id | INST | Session identifier returned from iopen() |

VISA Operation(s)

```
ViStatus viTerminate(vi, target=VI_SESSION, degree=VI_ABORT,
                     jobId=VI_ALL, immediate, flagFlushData)
```

Overview

The id parameter is first verified and translated (if necessary) to the corresponding VISA session, which will be used as the vi parameter in the VISA operation. The VISA operation viTerminate() can be used to abort any VISA operations currently executing with the specified session. When the degree parameter to viTerminate() is VI_ABORT, the immediate and flagFlushData parameters are ignored. This function returns an error for interface and commander sessions.

Return Values

| VISA | SICL |
|---|---|
| VI_SUCCESS | I_ERR_NOERROR |
| VI_ERROR_INV_SESSION | I_ERR_BADID |

Section 7
Service Requests, Interrupts, and Asynchronous Events int ionsrq(id, proc)

Purpose
  Installs the SRQ handler.

Parameters

| Name | Type | Description |
|------|------|-------------|
| id   | INST | Session identifier returned from iopen() or igetintfsess() |
| proc | void(*)() | Procedure to be installed as SRQ handler |

VISA Operation(s)

ViStatus viInstallHandler(vi, eventType, handler, userHandle)
    ViStatus viUninstallHandler(vi, eventType, handler, userHandle)
    ViStatus viEnableEvent(vi, eventType, mechanism, context)
    ViStatus viDisableEvent(vi, eventType, mechanism)

Overview

The id parameter is first verified and translated (if necessary) to the corresponding VISA session, which will be used as the vi parameter in the VISA operations. Because VISA cannot call a SICL program's handler directly (because of different prototypes), the SICL Mapping Library must install a handler that can be called by VISA and in turn calls the user's handler. Therefore, the ionsrq() function needs to install the common callback routine for the VI_EVENT_SERVICE_REQ event, and save the value of proc in the SICL session data structure. If the proc parameter is set to 0, uninstall the common callback routine by calling viUninstallHandler() instead.

In addition to installing or uninstalling the handler, the SICL function also automatically enables or disables the receiving of the SRQ event for the specified session. This is accomplished by calling the VISA operation viEnableEvent() or viDisableEvent(), based on whether proc is 0.

Note: *When writing a VISA program, it is still necessary to call both* viInstallHandler() *and* viEnableEvent() *to receive events via a callback routine. The common callback routine discussed here is necessary only because of different callback prototypes between SICL and VISA.*

Return Values

| VISA | SICL |
|------|------|
| VI_SUCCESS | I_ERR_NOERROR |
| VI_ERROR_INV_SESSION | I_ERR_BADID |

```
int igetonsrq(id, proc)
```

Purpose
    Returns the SRQ handler.

Parameters

| Name | Type | Description |
|---|---|---|
| id | INST | Session identifier returned from iopen() or igetintfsess() |
| proc | void(**)() | Address of SRQ handler |

VISA Operation(s)
    This function is implemented in the SICL Mapping Library.

Overview
    The current SRQ handler is stored in the SICL session data structure associated with id during ionsrq(). This function retrieves that value and returns it to the user in proc.

Note: *When writing a VISA program, the current handler for the* VI_EVENT_SERVICE_REQ *event can be retrieved via the* viQueryHandlers() *operation. The handler is stored in the SICL session data structure here because of different callback prototypes between SICL and VISA.* int ionintr(id, proc)

Purpose
Installs an interrupt handler.

Parameters

| Name | Type | Description |
|---|---|---|
| id | INST | Session identifier returned from iopen() or igetintfsess() |
| proc | void(*)() | Procedure to be installed as interrupt handler |

VISA Operation(s)

ViStatus viInstallHandler(vi, eventType, handler, userHandle)
    ViStatus viUninstallHandler(vi, eventType, handler, userHandle)
    ViStatus viEnableEvent(vi, eventType, mechanism, context)
    ViStatus viDisableEvent(vi, eventType, mechanism)

Overview

The id parameter is first verified and translated (if necessary) to the corresponding VISA session, which will be used as the vi parameter in the VISA operations. Because VISA cannot call a SICL program's handler directly (because of different prototypes), the SICL Mapping Library must install a handler that can be called by VISA and in turn calls the user's handler. Therefore, the ionintr() function needs to install the common callback routine for whichever events have been enabled, and save the value of proc in the SICL session data structure. If the proc parameter is set to 0, uninstall the common callback routine by calling viUninstallHandler() instead, and disable any events which are currently enabled by calling viDisableEvent().

In SICL, installing an interrupt handler and enabling interrupt conditions are treated as independent events. Therefore, ionintr() can be called before or after isetintr(). If ionintr() is called *before* isetintr(), ionintr() simply maps to viInstallHandler(). If it is called *after* isetintr(), the call to viInstallHandler() is followed by a call to viEnableEvent() with the mechanism parameter set to VI_HNDLR.

> Note: *When writing a VISA program, it is still necessary to call both* viInstallHandler() *and* viEnableEvent() *to receive events via a callback routine. The common callback routine discussed here is necessary only because of different callback prototypes between SICL and VISA.*

Return Values

| VISA | SICL |
|---|---|
| VI_SUCCESS | I_ERR_NOERROR |
| VI_ERROR_INV_SESSION | I_ERR_BADID |

`int igetonintr(id, proc)`

Purpose
    Returns the interrupt handler.

Parameters

| Name | Type | Description |
|------|------|-------------|
| id | INST | Session identifier returned from iopen() or igetintfsess() |
| proc | void(**)() | Address of interrupt handler |

VISA Operation(s)
    This function is implemented in the SICL Mapping Library.

Overview
    The current interrupt handler is stored in the SICL session data structure associated with id during ionintr(). This function retrieves that value and returns it to the user in proc.

*Note: When writing a VISA program, the current handler for a specific interrupt event can be retrieved via the viQueryHandlers() operation. The handler is stored in the SICL session data structure here because of different callback prototypes between SICL and VISA.*

```
int isetintr(id, intnum, secval)
```

Purpose
    Enables specific interrupts.

Parameters

| Name | Type | Description |
|---|---|---|
| id | INST | Session identifier returned from iopen() or igetintfsess() |
| intnum | int | Determines the interrupt condition to enable or disable |
| secval | long | Determines whether interrupts should be enabled or disabled |

VISA Operation(s)

```
ViStatus viEnableEvent(vi, eventType, mechanism, context)
ViStatus viDisableEvent(vi, eventType, mechanism)
```

Overview

The id parameter is first verified and translated (if necessary) to the corresponding VISA session, which will be used as the vi parameter in the VISA operation. The isetintr() function maps to the viEnableEvent() or viDisableEvent() operation in VISA, depending on the value of secval. A secval of 0 disables the interrupt and non-zero enables the interrupt. Each intnum should map to some event type in VISA, and this mapping can be predetermined and stored in a data structure. Thus, mapping isetintr() simply requires looking up the corresponding event type for a particular intnum and calling the appropriate VISA operation.

In SICL, installing an interrupt handler and enabling interrupt conditions are treated as independent events. Therefore, isetintr() can be called before or after ionintr(). If isetintr() is called *after* ionintr(), the mechanism parameter to viEnableEvent() should be set to VI_HNDLR, so that the handler is invoked when events occur. If it is called *before* ionintr(), mechanism should be set to VI_SUSPEND_HNDLR, so that events are queued and handlers are not invoked. Then when ionintr() is called later, the application should call viEnableEvent() again with the mechanism parameter set to VI_HNDLR to enable the handlers.

Return Values

| VISA | SICL |
|---|---|
| VI_SUCCESS | I_ERR_NOERROR |
| VI_ERROR_INV_SESSION | I_ERR_BADID |
| VI_ERROR_RSRC_LOCKED | I_ERR_LOCKED<br>I_ERR_TIMEOUT |
| VI_ERROR_INV_EVENT | I_ERR_PARAM |

```
int iintroff()
```

Purpose
    Disables execution of asynchronous handlers.

Parameters
    None

VISA Operation(s)

`viEnableEvent(vi, eventType, mechanism=VI_SUSPEND_HNDLR, context)`

Overview
    iintroff() disables all asynchronous handlers for all sessions in the given process. This is mapped to VISA by making a series of viEnableEvent() calls with the mechanism parameter set to VI_SUSPEND_HNDLR to suspend execution of handlers for all currently enabled interrupt events for all sessions. The events that occurred afterwards will still be queued and as soon as the handlers are enabled again, those events will be processed. There needs to be a list of all the sessions belonging to a process, which could be filled in during iopen(), and a data structure that lists all the events related to interrupts for each type of session.

Calls to iintroff() and iintron() can be nested. If iintroff() is called multiple times, the application must call iintron() the same number of times to reenable the execution of asynchronous handlers. Therefore, a count needs to be maintained in the system.

Return Values

| VISA | SICL |
|---|---|
| VI_SUCCESS | I_ERR_NOERROR |
| VI_ERROR_INV_SESSION | I_ERR_BADID | int iintron()

Purpose
Enables execution of asynchronous handlers.

Parameters
None

VISA Operation(s)

viEnableEvent(vi, eventType, mechanism=VI_HNDLR, context)

Overview iintron() enables all asynchronous handlers for all sessions in the given process. This is mapped to VISA by making a series of viEnableEvent() calls with the mechanism parameter set to VI_HNDLR to route to handlers all currently enabled interrupt events for all sessions. There needs to be a list of all the sessions belonging to a process, which could be filled in during iopen(), and a data structure that lists all the events related to interrupts for each type of session.

Calls to iintroff() and iintron() can be nested. If iintroff() is called multiple times, the application must call iintron() the same number of times to reenable the execution of asynchronous handlers. Therefore, a count has to be maintained in the system.

Return Values

| VISA | SICL |
|---|---|
| VI_SUCCESS | I_ERR_NOERROR |
| VI_ERROR_INV_SESSION | I_ERR_BADID |
| VI_SUCCESS_EVENT_EN | I_ERR_BADCONFIG |

```
int iwaithdlr(timeout)
```

Purpose

Waits for enabled SRQ or interrupt to occur and the relevant handler to be executed.

Parameter

| Name | Type | Description |
|---|---|---|
| timeout | long | Timeout value |

VISA Operation(s)

This function is implemented in the SICL Mapping Library.

Overview

This function causes the process or thread to suspend until any enabled SRQ or interrupt condition occurs and the relevant handler is executed. `iwaithdlr()` can use a mechanism provided by the operating system (like a semaphore) to sleep or block itself. Because all SICL SRQs and interrupts must first pass through the common callback routine because of different prototypes for SICL and VISA callback routines (refer to the overview section on Interrupts and Handlers), the common callback routine can *wake up* the threads or processes suspended in `iwaithdlr()` after calling the relevant handler.

> Note: *A VISA application can wait for any event (or a specific one) by calling* `viWaitOnEvent()`. *However, its functionality is per-session rather than per-process. This is why* `iwaithdlr()` *must be implemented in the SICL Mapping Library.*

Section 8
Locking and Timeouts

```
int ilock(id)
```

Purpose
   Locks the device or interface specified by id.

Parameter

| Name | Type | Description |
|------|------|-------------|
| id   | INST | Session identifier returned from iopen() or igetintfsess() |

VISA Operation(s)

ViStatus ViGetAttribute(vi, attribute, attrState)
   ViStatus ViLock(vi, lockType, shareType, timeout, lockId)

Overview

The id parameter is first verified and translated (if necessary) to the corresponding VISA session, which will be used as the vi parameter in the VISA operation. The type of lock to be used in viLock() is an exclusive lock (VI_EXCLUSIVE_LOCK) because ilock() enforces exclusive access (that is, only the session that has the lock can access the device/interface).

The timeout parameter should be passed either the value 0 or the timeout value associated with this session, depending on the value previously set by isetlockwait(). That function specifies whether other functions wait for a lock to be released or return immediately with an error code. The timeout value attribute, VI_ATTR_LOCK_WAIT_TMO_VALUE, can be retrieved via viGetAttribute().

The shareType parameter is used for sharing locks in VISA. Because this feature is not present in SICL, this parameter should be VI_NON_SHARABLE. The returned lockId should be stored in the SICL session data structure, because viUnlock() needs it.

Calls to ilock() and iunlock() can be nested. If ilock() is called multiple times, the application must call iunlock() the same number of times to free the lock on the device or interface. Therefore, a count needs to be maintained in the system.

Return Values

| VISA | SICL |
|------|------|
| VI_SUCCESS | I_ERR_NOERROR |
| VI_ERROR_INV_SESSION | I_ERR_BADID |
| VI_ERROR_RSRC_LOCKED | I_ERR_LOCKED<br>I_ERR_TIMEOUT |

```
int iunlock(id)
```

Purpose
    Unlocks the device or interface specified by id.

Parameter

| Name | Type | Description |
|---|---|---|
| id | INST | Session identifier returned from iopen() or igetintfsess() |

VISA Operation(s)

```
ViStatus viUnlock(vi, lockId)
```

Overview

The id parameter is first verified and translated (if necessary) to the corresponding VISA session, which will be used as the vi parameter in the VISA operation. The lockId is the value which was stored in the SICL session data structure by ilock(), and it needs to be retrieved and passed to viUnlock().

Calls to ilock() and iunlock() can be nested. If ilock() is called multiple times, the application must call iunlock() the same number of times to free the lock on the device or interface. Therefore, a count needs to be maintained in the system.

Return Values

| VISA | SICL |
|---|---|
| VI_SUCCESS | I_ERR_NOERROR |
| VI_ERROR_INV_SESSION | I_ERR_BADID |
| VI_ERROR_INV_LOCK_ID | I_ERR_NOLOCK |

```
int isetlockwait(id, flag)
```

Purpose

Controls whether operations on locked devices will suspend or generate errors.

Parameters

| Name | Type | Description |
|---|---|---|
| id | INST | Session identifier returned from iopen() or igetintfsess() |
| flag | int | Determines whether operations will suspend or generate an error. |

VISA Operation(s)

```
ViStatus viGetAttribute(vi, attribute, attrState)
ViStatus viSetAttribute(vi, attribute, attrState)
```

Overview

In VISA, the VI_ATTR_LOCK_WAIT_TMO_VALUE and VI_ATTR_LOCK_WAIT_TMO_UNIT attributes determine how long an operation should wait in case the resource is locked. If the VI_ATTR_LOCK_WAIT_TMO_VALUE is set to 0, the operation returns immediately and reports an error if the resource is locked. The VI_ATTR_LOCK_WAIT_TMO_VALUE attribute is different from the VI_ATTR_TMO_VALUE attribute in that the former specifies the timeout period for waiting for a lock, whereas the latter specifies the timeout period for carrying out an operation. In SICL, however, there are no separate quantities for the two timeout periods, so the value should be the same for both attributes.

The id parameter is first verified and translated (if necessary) to the corresponding VISA session, which will be used as the vi parameter in the VISA operations. If the flag parameter is 0, set the VI_ATTR_LOCK_WAIT_TMO_VALUE attribute's value to 0 via the viSetAttribute() operation. Otherwise, the attribute's value should be the same as the value of the VI_ATTR_TMO_VALUE attribute, which can be retrieved by viGetAttribute().

VI_ATTR_TMO_UNIT and VI_ATTR_LOCK_WAIT_TMO_UNIT determine the timeout units to be used, so these attributes should be set to VI_MILLI_SEC when the session is opened, and never modified.

Return Values

| VISA | SICL |
|---|---|
| VI_SUCCESS | I_ERR_NOERROR |
| VI_ERROR_INV_SESSION | I_ERR_BADID |
| VI_ERROR_NSUP_ATTR_STATE | I_ERR_PARAM | int igetlockwait(id, flag)

Purpose

Returns the current state of the lockwait flag.

Parameters

| Name | Type | Description |
|---|---|---|
| id | INST | Session identifier returned from iopen() or igetintfsess() |
| flag | int * | Reflects whether operations will suspend or generate an error |

VISA Operation(s)

```
VIstatus viGetAttribute(vi, attribute, attrState)
```

Overview

The id parameter is first verified and translated (if necessary) to the corresponding VISA session, which will be used as the vi parameter in the VISA operation. The VI_ATTR_LOCK_WAIT_TMO_VALUE attribute can be retrieved via viGetAttribute(). If the value is 0, set the flag parameter to 0. Otherwise, set flag to 1.

Return Values

| VISA | SICL |
|---|---|
| VI_SUCCESS | I_ERR_NOERROR |
| VI_ERROR_INV_SESSION | I_ERR_BADID |

```
int itimeout(id, val)
```

Purpose

Sets the timeout value.

Parameters

| Name | Type | Description |
|------|------|-------------|
| id | INST | Session identifier returned from iopen() or igetintfsess() |
| val | long | Timeout value in milliseconds. |

VISA Operation(s)

VIStatus viGetAttribute(vi, attribute, attrState)
VIStatus viSetAttribute(vi, attribute, attrState)

Overview

In VISA, the VI_ATTR_TMO_VALUE and VI_ATTR_TMO_UNIT attributes determine how long an operation can take to perform before timing out. The VI_ATTR_LOCK_WAIT_TMO_VALUE and VI_ATTR_LOCK_WAIT_TMO_UNIT attributes are different from the first two attributes, in that the former attributes specify the timeout period for waiting for a lock, whereas the latter specify the timeout period for carrying out an operation. SICL, however, does not have separate quantities for the two timeout periods, so the value should be the same for both sets of attributes.

The id parameter is first verified and translated (if necessary) to the corresponding VISA session, which will be used as the vi parameter in the VISA operations. If the val parameter is 0, the value of the VI_ATTR_TMO_VALUE attribute should be set to VI_INFINITE. Otherwise, the value should be set to val. If the value of the attribute VI_ATTR_LOCK_WAIT_TMO_VALUE is non-zero (which can be determined via viGetAttribute()), that attribute should be set to have the same value as VI_ATTR_TMO_VALUE.

VI_ATTR_TMO_UNIT and VI_ATTR_LOCK_WAIT_TMO_UNIT determine the timeout units to be used, so these attributes should be set to VI_MILLI_SEC when the session is opened, and never modified.

Return Values

| VISA | SICL |
|------|------|
| VI_SUCCESS | I_ERR_NOERROR |
| VI_ERROR_INV_SESSION | I_ERR_BADID |
| VI_ERROR_NSUP_ATTR_STATE | I_ERR_PARAM |

```
int igettimeout(id, val)
```

Purpose
   Gets the timeout value.

Parameters

| Name | Type | Description |
|---|---|---|
| id | INST | Session identifier returned from iopen() or igetintfsess() |
| val | long * | Location to store current timeout period |

VISA Operation(s)

```
ViStatus viGetAttribute(vi, attribute, attrState)
```

Overview
The id parameter is first verified and translated (if necessary) to the corresponding VISA session, which will be used as the vi parameter in the VISA operation. The VI_ATTR_TMO_VALUE attribute can be retrieved via viGetAttribute(). If the value is VI_INFINITE, set the val parameter to 0. Otherwise, set val to whatever value is returned in attrState.

Return Values

| VISA | SICL |
|---|---|
| VI_SUCCESS | I_ERR_NOERROR |
| VI_ERROR_INV_SESSION | I_ERR_BADID |

Section 9
Miscellaneous Functions

```
int igetaddr(id, addr)
```

Purpose
Returns a pointer to the address string passed to the iopen() call.

Parameters

| Name | Type | Description |
|---|---|---|
| id | INST | Session identifier returned from iopen() or igetintfsess() |
| addr | char ** | Location where the reference to the original iopen() string will be placed |

VISA Operation(s)
This function is implemented in the SICL Mapping Library.

Overview
The address string passed to an iopen() call is stored in the SICL session data structure associated with id during iopen(). This function retrieves that value and returns it to the user in addr.

Note: *In VISA, similar functionality is achieved by retrieving the resource name attribute, VI_ATTR_RSRC_NAME, using the* viGetAttribute() *operation. In VISA, however, this may not always be the same string that was used in* viOpen(). *For example, if an alias was used when the resource was opened, this retrieves the resource's actual name.*

```
int isetdata(id, data)
```

Purpose

Stores a pointer to a data structure associated with a session.

Parameters

| Name | Type | Description |
|---|---|---|
| id | INST | Session identifier returned from `iopen()` or `igetintfsess()` |
| data | void * | Reference to a private data structure to be associated with the session |

VISA Operation(s)

```
VIStatus viSetAttribute(vi, attribute, attrState)
```

Overview

The id parameter is first verified and translated (if necessary) to the corresponding VISA session, which will be used as the vi parameter in the VISA operation. The VI_ATTR_USER_DATA attribute can be set via `viSetAttribute()` to any user-defined value.

Return Values

| VISA | SICL |
|---|---|
| VI_SUCCESS | I_ERR_NOERROR |
| VI_ERROR_INV_SESSION | I_ERR_BADID | int igetdata(id, data)

Purpose

Retrieve the pointer previously stored by the isetdata() function.

Parameters

| Name | Type | Description |
|------|------|-------------|
| id | INST | Session identifier returned from iopen() or igetintfsess() |
| data | void ** | Location where the reference of the private session data set by isetdata() will be placed |

VISA Operation(s)

ViStatus viGetAttribute(vi, attribute, attrState)

Overview

The id parameter is first verified and translated (if necessary) to the corresponding VISA session, which will be used as the vi parameter in the VISA operation. The VI_ATTR_USER_DATA attribute can be retrieved via viGetAttribute(). The value returned is whatever user-defined value was previously set in a call to isetdata(), or NULL if no user-defined data had been previously stored.

Return Values

| VISA | SICL |
|------|------|
| VI_SUCCESS | I_ERR_NOERROR |
| VI_ERROR_INV_SESSION | I_ERR_BADID | int igetintftype(id, data)

Purpose
Returns the interface type of the session.

Parameters

| Name | Type | Description |
|------|------|-------------|
| id   | INST | Session identifier returned from iopen() or igetintfsess() |
| data | int * | Location where the interface type associated with the session will be placed |

VISA Operation(s)
This function is implemented in the SICL Mapping Library.

Overview
The interface type (GPIB, VXI, or Serial) is stored in the SICL session data structure associated with id during iopen(). This function retrieves that value and returns it to the user in data.

```
int igetsesstype(id, data)
```

Purpose
   Returns the session type.

Parameters

| Name | Type | Description |
|------|------|-------------|
| id | INST | Session identifier returned from iopen() or igetintfsess() |
| data | int * | Location where the session type of id will be placed |

VISA Operation(s)
   This function is implemented in the SICL Mapping Library.

Overview
   The session type (device, interface, or commander) is stored in the SICL session data structure associated with id during iopen(). This function retrieves that value and returns it to the user in data.

```
int igetdevaddr(id, prim, sec)
```

Purpose
Returns the primary and secondary address of a device.

Parameters

| Name | Type | Description |
|---|---|---|
| id | INST | Session identifier returned from iopen() |
| prim | int * | Location where the primary address of the device will be placed |
| sec | int * | Location where the secondary address of the device will be placed |

VISA Operation(s)

```
ViStatus viGetAttribute(vi, attribute, attrState)
```

Overview
The id parameter is first verified and translated (if necessary) to the corresponding VISA session, which will be used as the vi parameter in the VISA operation. The VI_ATTR_PHYS_ADDR attribute can be retrieved via viGetAttribute(). The attribute value is a structure which includes the primary and secondary addresses of the device if it belongs to a GPIB interface, the logical address of the device if it belongs to a VXI interface, or other information appropriate for the device on other types of interfaces. This function returns an error for interface and commander sessions.

Return Values

| VISA | SICL |
|---|---|
| VI_SUCCESS | I_ERR_NOERROR |
| VI_ERROR_INV_SESSION | I_ERR_BADID |

```
int igetlu(id, lu)
```

Purpose

Returns the logical unit associated with the session.

Parameters

| Name | Type | Description |
|------|------|-------------|
| id   | INST | Session identifier returned from iopen() or igetintfsess() |
| lu   | int * | Location where the logical unit number of the session will be placed |

VISA Operation(s)

This function is implemented in the SICL Mapping Library.

Overview

The logical unit (unique integer for the specified interface card) is stored in the SICL session data structure associated with id during iopen(). This function retrieves that value and returns it to the user in lu.

```
int ibeswap(addr, length, datasize)
int ileswap(addr, length, datasize)
int iswap  (addr, length, datasize)
```

Purpose
    Performs byte swapping.

Parameters

| Name | Type | Description |
|---|---|---|
| addr | char * | Location of the data to be processed |
| length | unsigned long | Length of the data in bytes |
| datasize | int | Specifies the size of data and type of byte swapping to perform |

VISA Operation(s)
    This function is implemented in the SICL Mapping Library.

Overview
    These functions provide a convenient, architectural independent way of byte swapping data read from or written to a remote device. Whether byte swapping is actually done in the ibeswap() and ileswap() functions depends on the native byte ordering of the local machine. These three functions can be implemented by looping through the buffer and performing the necessary byte swapping.

*Note: VISA provides a capability for performing on-the-fly byte swapping in both the Formatted I/O and the High Level Access resources. Because it is encapsulated at that level, VISA does not provide utility functions such as these.*

```
int igetlulist(lulist)
```

Purpose

Returns a list of valid logical unit numbers on this system.

Parameter

| Name | Type | Description |
|---|---|---|
| lulist | int ** | Location where the reference to the integer list of valid logical unit numbers for the system will be placed |

VISA Operation(s)

```
ViStatus viFindRsrc(vi, expr, accessLink)
```

Overview

A logical unit in SICL is a number uniquely associated with an interface card. Although VISA does not assign numbers to interface cards, the SICL Mapping Library can query VISA for the interface cards connected to the system by using the viFindRsrc() operation to search for all CPU Interface resources, and then assign each card a unique number. The library could do this when it is initialized, and store the information in a global data structure. This SICL function, then, would simply copy the list of valid logical unit numbers from that data structure into lulist.

```
int igetluinfo(lu, info)
```

Purpose

Gets information about the specified logical unit.

Parameters

| Name | Type | Description |
|------|------|-------------|
| lu | int | Logical unit number for the lu_info query |
| info | struct lu_info * | Location where the lu_info for the specified lu will be placed |

VISA Operation(s)

```
ViStatus viOpen(sesn, rsrcName, accessMode, timeout, vi)
ViStatus viGetAttribute(vi, attribute, attrState)
ViStatus viClose(vi)
```

Overview

Because a logical unit is associated directly with an interface board, getting information about that logical unit can be implemented in VISA by opening a session to that interface card (via viOpen()) and getting the necessary attributes. Because the session is being opened for the sole purpose of getting information, it should be closed with viClose() before the function returns.

Return Values

| VISA | SICL |
|------|------|
| VI_SUCCESS | I_ERR_NOERROR |
| VI_ERROR_INV_SESSION<br>VI_ERROR_INV_RSRC_NAME<br>VI_ERROR_RSRC_NFOUND | I_ERR_PARAM |

Section 10
Error Handling

`int ionerror(proc)`

Purpose
Installs an error handler for all sessions of the process.

Parameter

| Name | Type | Description |
|------|------|-------------|
| proc | void (*)() | Error handler |

VISA Operation(s)

ViStatus viInstallHandler(vi, eventType, handler, userHandle)
    ViStatus viUninstallHandler(vi, eventType, handler, userHandle)

Overview
Because VISA cannot call a SICL program's handler directly (because of different prototypes), the SICL Mapping Library must install a handler that can be called by VISA and in turn calls the user's handler. Therefore, the ionerror() function needs to install the common callback routine for the VI_EXCEPTION event, and save the value of proc in a per-process global data structure in the library. The SICL Mapping Library must install the handler for every session in the process, because error handling is per-session in VISA and per-process in SICL. In addition, every time a new SICL session is opened after ionerror() has been called, the handler must be installed on that new session as well. If the proc parameter is set to 0, uninstall the common callback routine (from every session) by calling viUninstallHandler() instead.

The library also needs to provide two special error handlers required by SICL. One prints a diagnostic message to the stderr of the process and terminates the process; the other also prints a message but allows the process to continue execution. The user can install these handlers as the error handler by setting the proc parameter to I_ERROR_EXIT or I_ERROR_NO_EXIT, respectively.

Note: *When writing a VISA program, it is still necessary to call* viInstallHandler() *to receive the* VI_EXCEPTION *event via a callback routine. The common callback routine discussed here is necessary only because of different callback prototypes between SICL and VISA.*

```
int igetonerror(proc)
```

Purpose

Returns the currently installed error handler.

Parameter

| Name | Type | Description |
|------|------|-------------|
| proc | void(**)() | Location to store error handler |

VISA Operation(s)

This function is implemented in the SICL Mapping Library.

Overview

The current error handler is stored in the SICL per-process global data structure during ionerror(). This function retrieves that value and returns it to the user in proc.

Note: *When writing a VISA program, the current handler for the VI_EXCEPTION event can be retrieved via the viQueryHandlers() operation. The handler is stored in the SICL global data structure here because of different callback prototypes between SICL and VISA.*

```
int igeterrno()
```

Purpose
  Returns the error number of the last error that occurred.

Parameters
  None

VISA Operation(s)
  This function is implemented in the SICL Mapping Library.

Overview
  To support igeterrno(), every SICL function should store the error status in a per-thread global variable if there is an error. igeterrno() will then simply return the value of this global variable.

Note: *In VISA, similar functionality can be achieved with the* viGetEventInfo() *operation. This operation provides information about the last event of a given type (in this case, VI_EXCEPTION), which includes an error number and a string description. In VISA, this is session-based rather than process-based.*

```
int icauseerr(id, error, flag)
```

Purpose
   Simulates an error condition.

Parameters

| Name  | Type | Description                                           |
|-------|------|-------------------------------------------------------|
| id    | INST | Session identifier returned from iopen() or igetintfsess() |
| error | int  | Error number to generate                              |
| flag  | int  | Specifies whether the error handler should be called  |

VISA Operation(s)
   This function is implemented in the SICL Mapping Library.

Overview
   To map the icauseerr() function, set the per-process global variable that contained the error status to error (this variable is also used in the igeterrno() function). If flag is 0, no further action is required. If flag is 1, it is also necessary to call the process-wide error handler.

*Note: In VISA, similar functionality can be achieved by the viRaiseEvent() operation. This operation lets you raise a specified event (in this case, VI_EXCEPTION) on the given session. However, if a user handler is installed for this event, it will always be invoked.*

```
char *igeterrstr(errno)
```

Purpose

Gets the error string associated with the specified error number.

Parameter

| Name  | Type | Description  |
|-------|------|--------------|
| errno | int  | Error number |

VISA Operation(s)

This function is implemented in the SICL Mapping Library.

Overview

Mapping the igeterrstr() function requires a table that contains the list of all error numbers and their corresponding error description strings. igeterrstr() then must search for the entry with the matching error number and return the corresponding error description string. If the error number in the errno parameter is invalid, this function returns NULL.

> Note: *In VISA, similar functionality can be achieved by the* viGetEventInfo() *operation. This operation provides information about the last event of a given type (in this case, VI_EXCEPTION), which includes an error number and a string description. In VISA, this is session-based rather than process-based.*

Section 11
Mapping and Low-Level I/O

```
char *imap(id, map_space, pagestart, pagecnt, suggested)
```

Purpose

Maps all or part of specified memory space into data space of a process.

Parameters

| Name | Type | Description |
|---|---|---|
| id | INST | Session identifier returned from iopen() or igetintfsess() |
| map_space | int | Memory space to be mapped |
| pagestart | unsigned int | Which page in memory space to start mapping |
| pagecnt | unsigned int | Number of pages of memory to map |
| suggested | char * | User's preferred return value |

VISA Operation(s)

```
ViStatus viOpen(sesn, rsrcName, accessMode, timeout, vi)
ViStatus viMap(vi, mapSpace, mapBase, mapSize, owner=VI_TRUE,
               suggested, address)
```

Overview

The id parameter is first verified and translated (if necessary) to the corresponding VISA session, which will be used as the sesn parameter in the VISA operation to viOpen, which opens a session to the low-level resource. The vi value returned from viOpen() must be stored in the session structure, and it is used in the subsequent call to viMap(). The map_space argument to imap() corresponds directly to the mapSpace argument to viMap(). The pagestart argument, which is in absolute pages even for device sessions, must be converted to bytes. For device sessions, this value is relative to the memory location of the device in A24/A32 space for VISA. Similarly, the pagecnt argument must be converted to bytes, based on the map_space argument. The suggested parameter can be passed as is. The address parameter returned from viMap() is used as the return value for imap(). This function returns NULL for non-VXI sessions.

Note: *The following return values show the error codes that would be passed to the error handler, because the SICL function returns a valid pointer on success and NULL on failure.*

Return Values

| VISA | SICL |
|---|---|
| VI_SUCCESS | Mapped pointer |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_INV_SPACE<br>VI_ERROR_INV_OFFSET<br>VI_ERROR_NSUP_BYTE_ORDER<br>VI_ERROR_NSUP_OFFSET<br>VI_ERROR_NSUP_PRIV | I_ERR_BADMAP |

```
int iunmap(id, addr, map_space, pagestart, pagecnt)
```

Purpose

Removes previously mapped memory from data space of the process.

Parameters

| Name | Type | Description |
|---|---|---|
| id | INST | Session identifier returned from iopen() or igetintfsess() |
| addr | char * | Mapped pointer returned from imap |
| map_space | int | Memory space that was mapped |
| pagestart | unsigned int | Which page in memory space the mapping started |
| pagecnt | unsigned int | Number of pages of memory that were mapped |

VISA Operation(s)

```
ViStatus viUnmap(vi)
ViStatus viClose(vi)
```

Overview

The id parameter is first verified and translated (if necessary) to the corresponding VISA session. The session structure is then searched for the addr parameter to find the vi associated with that resource. That vi value is then used with viUnmap() and viClose(). The second call is necessary because sessions to the low-level resource are explicitly opened during calls to imap(). Because the session is being closed anyway, the call to viUnmap() is actually optional because the session would be implicitly unmapped during the closing phase. All other parameters to iunmap() are ignored. This function returns an error for non-VXI sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_WINDOW_NMAP | I_ERR_PARAM | int imapinfo(id, map_space, numwindows, winsize)

Purpose

Gets information about hardware mapping capabilities for given session.

Parameters

| Name | Type | Description |
|---|---|---|
| id | INST | Session identifier returned from iopen() or igetintfsess() |
| map_space | int | Memory space to get information about |
| numwindows | int * | Location to store total number of windows in given space |
| winsize | int * | Location to store smallest window size (in pages) in given space |

VISA Operation(s)

ViStatus viGetAttribute(vi, attribute, attrState)

Overview

The id parameter is first verified and translated (if necessary) to the corresponding VISA session, which will be used as the vi parameter in the VISA operation. The attribute parameter, depending on the value of map_space, will be either VI_ATTR_A16_SPC_INFO, VI_ATTR_A24_SPC_INFO, or VI_ATTR_A32_SPC_INFO. The information returned from viGetAttribute() is a structure containing information about the given space, so the appropriate fields are then copied from this structure into the numwindows and winsize parameters. This function returns an error for non-VXI sessions.

Return Values

| VISA | SICL |
|---|---|
| VI_SUCCESS | I_ERR_NOERROR |
| VI_ERROR_INV_SESSION | I_ERR_BADID |
| VI_ERROR_NSUP_ATTR | I_ERR_NOTSUPP<br>I_ERR_PARAM |

```
void ibpoke(addr, val)
void iwpoke(addr, val)
void ilpoke(addr, val)
```

Purpose

Stores a single value (of given size) at previously mapped address.

Parameters

| Name | Type | Description |
|---|---|---|
| addr | unsigned char *<br>unsigned short*<br>unsigned long * | Previously mapped address, returned from imap |
| val | unsigned char<br>unsigned short<br>unsigned long | Value to store at given location |

VISA Operation(s)

```
void viPoke8 (vi, addr, val)
void viPoke16(vi, addr, val)
void viPoke32(vi, addr, val)
```

Overview

The addr and val arguments to i*poke() correspond directly to the addr and val arguments to viPoke*(). The vi argument to viPoke*() is the same session that was passed to viMap() (although the vi argument is ignored for most accesses), and it must be retrieved by looking for the addr parameter in the session table.

As the SICL specification suggests, these functions could also be implemented as macros by the SICL Mapping Library.

Return Values

None

```
unsigned char   ibpeek(addr)
unsigned short  iwpeek(addr)
unsigned long   ilpeek(addr)
```

Purpose
    Reads single value (of given size) from previously mapped address.

Parameter

| Name | Type | Description |
|---|---|---|
| addr | unsigned char * <br> unsigned short* <br> unsigned long * | Previously mapped address, returned from imap |

VISA Operation(s)

```
void viPeek8 (vi, addr, val)
void viPeek16(vi, addr, val)
void viPeek32(vi, addr, val)
```

Overview
    The addr argument to i*peek() corresponds directly to the addr argument to viPeek*(). The val argument to viPeek*() is a reference to a local variable, whose value is then used as the return value for i*peek(). The vi argument to viPeek*() is the same session that was passed to viMap() (although the vi argument is ignored for most accesses), and it must be retrieved by looking for the addr parameter in the session table.

As the SICL specification suggests, these functions could also be implemented as macros by the SICL Mapping Library.

Return Values
    None (does not reflect the status)

```
int ibblockcopy(id, src, dest, cnt)
int iwblockcopy(id, src, dest, cnt, swap)
int ilblockcopy(id, src, dest, cnt, swap)
```

Purpose
Copies block of data (of given size) from one location of memory to another.

Parameters

| Name | Type | Description |
|---|---|---|
| id | INST | Session identifier returned from iopen() or igetintfsess() |
| src | unsigned char * unsigned short* unsigned long * | Location from which to copy data |
| dest | unsigned char * unsigned short* unsigned long * | Location to which to copy data |
| cnt | unsigned long | Number of elements (of given size) to copy |
| swap | int | Whether multi-byte values need to be byte-swapped |

VISA Operation(s)
This function is implemented in the SICL Mapping Library.

Overview
This function copies the data from the address specified by the src parameter to the address specified by the dest parameter. Both the src and dest pointers are incremented. The copy should take place in the SICL Mapping Library, and should always return successfully.

> Note: *VISA offers similar functionality, but copying data is done through a high-level operation rather than a low-level operation. This SICL function is used for copying data to or from a VXI address that has been mapped. In VISA, you would call* viMove() *with the user buffer and the VXI address, without needing to map the address first and then unmap it later.*

```
int ibpushfifo(id, src, fifo, cnt)
int iwpushfifo(id, src, fifo, cnt, swap)
int ilpushfifo(id, src, fifo, cnt, swap)
```

Purpose

Writes block of data (of given size) to single address.

Parameters

| Name | Type | Description |
| --- | --- | --- |
| id | INST | Session identifier returned from iopen() or igetintfsess() |
| src | unsigned char * <br> unsigned short* <br> unsigned long * | Location from which to copy data |
| fifo | unsigned char * <br> unsigned short* <br> unsigned long * | Location to which to copy data |
| cnt | unsigned long | Number of elements (of given size) to copy |
| swap | int | Whether multi-byte values need to be byte-swapped |

VISA Operation(s)

This function is implemented in the SICL Mapping Library.

Overview

This function copies the data from the address specified by the src parameter to the address specified by the fifo parameter. The src pointer is incremented but the fifo pointer is not. The copy should take place in the SICL Mapping Library, and should always return successfully.

> Note: *VISA offers similar functionality, but copying data is done through a high-level operation rather than a low-level operation. This SICL function is used for copying data to or from a VXI address that has been mapped. In VISA, you would call* viMove() *with the user buffer and the VXI address, without needing to map the address first and then unmap it later. This VISA operation accommodates FIFO accesses through attributes (in this case,* VI_ATTR_DEST_INCREMENT *would be 0).*

```
int ibpopfifo(id, fifo, dest, cnt)
int iwpopfifo(id, fifo, dest, cnt, swap)
int ilpopfifo(id, fifo, dest, cnt, swap)
```

Purpose

Reads block of data (of given size) from single address.

Parameters

| Name | Type | Description |
|------|------|-------------|
| id | INST | Session identifier returned from iopen() or igetintfsess() |
| fifo | unsigned char *<br>unsigned short*<br>unsigned long * | Location from which to copy data |
| dest | unsigned char *<br>unsigned short*<br>unsigned long * | Location to which to copy data |
| cnt | unsigned long | Number of elements (of given size) to copy |
| swap | int | Whether multi-byte values need to be byte-swapped |

VISA Operation(s)

This function is implemented in the SICL Mapping Library.

Overview

This function copies the data from the address specified by the fifo parameter to the address specified by the dest parameter. The fifo pointer is not incremented but the dest pointer is. The copy should take place in the SICL Mapping Library, and should always return successfully.

> Note: *VISA offers similar functionality, but copying data is done through a high-level operation rather than a low-level operation. This SICL function is used for copying data to or from a VXI address that has been mapped. In VISA, you would call* viMove() *with the user buffer and the VXI address, without needing to map the address first and then unmap it later. This VISA operation accommodates FIFO accesses through attributes (in this case,* VI_ATTR_SRC_INCREMENT *would be 0).*

Section 12
GPIB Specifics

`int igpibbusstatus(id, request, result)`

Purpose
   Returns the status of the GPIB bus lines.

Parameters

| Name | Type | Description |
|---|---|---|
| id | INST | Session identifier returned from iopen() or igetintfsess() |
| request | int | Type of bus status requested |
| result | int * | Location where the result of the specified request will be placed |

VISA Operation(s)

`ViStatus viGetAttribute(vi, attribute, attrState)`

Overview
   The id parameter is first verified and translated (if necessary) to the corresponding VISA session, which will be used as the vi parameter in the VISA operation. VISA defines an equivalent attribute value for every request value. This function returns an error for all sessions other than GPIB interface sessions.

Return Values

| VISA | SICL |
|---|---|
| VI_SUCCESS | I_ERR_NOERROR |
| VI_ERROR_INV_SESSION | I_ERR_BADID |
| VI_ERROR_NSUP_ATTR | I_ERR_NOTSUPP<br>I_ERR_PARAM |

```
int igpibppoll(id, val)
```

Purpose
    Performs a parallel poll.

Parameters

| Name | Type | Description |
|---|---|---|
| id | INST | Session identifier returned from iopen() or igetintfsess() |
| val | unsigned int * | Location where the result of the parallel poll will be placed |

VISA Operation(s)

`ViStatus viPPoll(vi, result)`

Overview
    The id parameter is first verified and translated (if necessary) to the corresponding VISA session, which will be used as the vi parameter in the VISA operation. The val argument to igpibppoll() corresponds directly to the result argument to viPPoll(). This function returns an error for all sessions other than GPIB interface sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_ABORT | I_ERR_ABORTED |
| VI_ERROR_NCIC | I_ERR_NOINTF | int igpibppollconfig(id, val)

Purpose

Configures a device to respond to a parallel poll.

Parameters

| Name | Type | Description |
|------|------|-------------|
| id | INST | Session identifier returned from iopen() or igetintfsess() |
| val | int | Value to configure the device for its parallel poll response |

VISA Operation(s)

```
ViStatus viPPollConfig(vi, address, ppc)
ViStatus viSetAttribute(vi, attribute, attrState)
```

Overview

The id parameter is first verified and translated (if necessary) to the corresponding VISA session, which will be used as the vi parameter in the VISA operation. This function returns an error for all sessions other than GPIB device or commander sessions.

For GPIB device sessions, the address parameter to viPPollConfig() is based on the device address associated with the SICL session. The ppc argument is computed by the following equation:

```
if (val > 0)
    ppc := val bit-OR'ed with hexadecimal 60
else
    ppc := Parallel Poll Disable
```

For GPIB commander sessions, the local device is enabled or disabled for participating in a PPoll. The VI_ATTR_GPIB_LOCAL_PP attribute value is computed by the following equation:

```
if (val > 0)
    attrState := VI_TRUE
else
    attrState := VI_FALSE
```

Return Values

| VISA | SICL |
|------|------|
| VI_SUCCESS | I_ERR_NOERROR |
| VI_ERROR_INV_SESSION | I_ERR_BADID |
| VI_ERROR_RSRC_NEXISTS<br>VI_ERROR_NSUP_ATTR | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_INV_PPC | I_ERR_PARAM |
| VI_ERROR_NCIC | I_ERR_NOINTF | int igpibppollresp(id, val)

Purpose

Sets the state of the PPOLL response bit (IST bit).

Parameters

| Name | Type | Description |
|---|---|---|
| id | INST | Session identifier returned from iopen() or igetintfsess() |
| val | int | Value corresponding to the state of the PPOLL bit when the device is being parallel polled |

VISA Operation(s)

ViStatus viSetAttribute(vi, attribute, attrState)

Overview

The id parameter is first verified and translated (if necessary) to the corresponding VISA session, which will be used as the vi parameter in the VISA operation. The PPOLL response bit is implemented in VISA as the VI_ATTR_GPIB_IST attribute, which can be set via viSetAttribute(). This function returns an error for all sessions other than GPIB device or commander sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_LOCKED | I_ERR_LOCKED I_ERR_TIMEOUT |
| VI_ERROR_NSUP_ATTR | I_ERR_NOTSUPP |
| VI_ERROR_NSUP_ATTR_STATE | I_ERR_PARAM | int igpibpassctl(id, busaddr)

Purpose

Passes active controller role to the GPIB device specified by busaddr.

Parameters

| Name | Type | Description |
|---|---|---|
| id | INST | Session identifier returned from iopen() or igetintfsess() |
| busaddr | int | Address of the device that will be passed control |

VISA Operation(s)

```
ViStatus viGPIBCommand(vi, buf="UNT,MTA,(busaddr)LA,TCT", count,
                       retCount)
```

Overview

The id parameter is first verified and translated (if necessary) to the corresponding VISA session, which will be used as the vi parameter in the VISA operation. The viGPIBCommand() operation is then used to pass control to the device specified by busaddr. This will also cause the SICL I_INTR_INTFDEACT interrupt to be generated because of the change in CIC status. This function returns an error for all sessions other than GPIB interface sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_ABORT | I_ERR_ABORTED |
| VI_ERROR_NCIC | I_ERR_NOINTF |
| VI_ERROR_NLISTENERS | I_ERR_NODEV |

```
int igpibrenctl(id, ren)
```

Purpose
Changes the state of the GPIB REN interface line.

Parameters

| Name | Type | Description |
|---|---|---|
| id | INST | Session identifier returned from iopen() or igetintfsess() |
| ren | int | Specifies the state of the REN interface line |

VISA Operation(s)

```
ViStatus viRemoteEnable(vi, ren)
```

Overview
The id parameter is first verified and translated (if necessary) to the corresponding VISA session, which will be used as the vi parameter in the VISA operation. The ren parameter to igpibrenctl() is identical to the ren parameter to viRemoteEnable(). This function returns an error for all sessions other than GPIB interface sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED |
| | I_ERR_TIMEOUT |
| VI_ERROR_ABORT | I_ERR_ABORTED |
| VI_ERROR_NSYS_CNTRL | I_ERR_NOINTF |

```
int igpibllo(id)
```

Purpose
Puts all devices on the given GPIB bus into local-lockout mode.

Parameter

| Name | Type | Description |
|------|------|-------------|
| id | INST | Session identifier returned from iopen() or igetintfsess() |

VISA Operation(s)

```
ViStatus viGPIBCommand(vi, buf="LLO", count, retCount)
```

Overview
The id parameter is first verified and translated (if necessary) to the corresponding VISA session, which will be used as the vi parameter in the VISA operation. The viGPIBCommand() operation is then called with the LLO GPIB command. This function returns an error for all sessions other than GPIB interface sessions.

Return Values

| VISA | SICL |
|------|------|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_ABORT | I_ERR_ABORTED |
| VI_ERROR_NCIC | I_ERR_NOINTF |
| VI_ERROR_NLISTENERS | I_ERR_NODEV |

```
int igpibatnctl(id, atn)
```

Purpose

Sets the state of the GPIB ATN interface line.

Parameters

| Name | Type | Description |
|---|---|---|
| id | INST | Session identifier returned from iopen() or igetintfsess() |
| atn | int | Specifies the state of the ATN interface line |

VISA Operation(s)

```
ViStatus viSetAttribute(vi, attribute, attrState)
```

Overview

The id parameter is first verified and translated (if necessary) to the corresponding VISA session, which will be used as the vi parameter in the VISA operation. The state of the ATN line is implemented in VISA as the VI_ATTR_GPIB_ATN attribute, which can be set via viSetAttribute(). This function returns an error for all sessions other than GPIB interface sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_LOCKED | I_ERR_LOCKED<br>I_ERR_TIMEOUT |
| VI_ERROR_NSUP_ATTR | I_ERR_NOTSUPP |
| VI_ERROR_NSUP_ATTR_STATE | I_ERR_PARAM | int igpibsendcmd(id, buf, len)

Purpose

Sends GPIB commands on the bus.

Parameters

| Name | Type | Description |
|---|---|---|
| id | INST | Session identifier returned from iopen() or igetintfsess() |
| buf | char * | Location of the data to be sent out on the GPIB bus with ATN asserted |
| len | int | Number of bytes to be sent |

VISA Operation(s)

ViStatus viGPIBCommand(vi, buf, count, retcount)

Overview

The id parameter is first verified and translated (if necessary) to the corresponding VISA session, which will be used as the vi parameter in the VISA operation. The buf and len arguments to igpibsendcmd() correspond directly to the buf and count arguments to viGPIBCommand(). The retCount parameter returned from the VISA operation can be discarded, because it is not returned in SICL. This function returns an error for all sessions other than GPIB interface sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED I_ERR_TIMEOUT |
| VI_ERROR_TMO | I_ERR_TIMEOUT |
| VI_ERROR_ABORT | I_ERR_ABORTED |
| VI_ERROR_NCIC | I_ERR_NOINTF |
| VI_ERROR_NLISTENERS | I_ERR_NODEV |

```
int igpibbusaddr(id, addr)
```

Purpose

Changes the bus address of the GPIB interface card.

Parameters

| Name | Type | Description |
|---|---|---|
| id | INST | Session identifier returned from iopen() or igetintfsess() |
| addr | int | New GPIB address for the GPIB interface card |

VISA Operation(s)

```
ViStatus viSetAttribute(vi, attribute, attrState)
```

Overview

The id parameter is first verified and translated (if necessary) to the corresponding VISA session, which will be used as the vi parameter in the VISA operation. The bus address is implemented in VISA as the VI_ATTR_PHYS_ADDR attribute, which can be set via viSetAttribute(). This function returns an error for all sessions other than GPIB interface sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_LOCKED | I_ERR_LOCKED<br>I_ERR_TIMEOUT |
| VI_ERROR_NSUP_ATTR | I_ERR_NOTSUPP |
| VI_ERROR_NSUP_ATTR_STATE | I_ERR_PARAM |

Section 13
VXI Specifics

```
int ivxibusstatus(id, request, result)
```

Purpose

Gets information about current state of the VXIbus.

Parameters

| Name | Type | Description |
|---|---|---|
| id | INST | Session identifier returned from iopen() or igetintfsess() |
| request | int | Which type of information to retrieve |
| result | unsigned long * | Location to store the information that was requested |

VISA Operation(s)

```
ViStatus viGetAttribute(vi, attribute, attrState)
```

Overview

The id parameter is first verified and translated (if necessary) to the corresponding VISA session, which will be used as the vi parameter in the VISA operation. VISA defines an equivalent attribute value for every request value. This function returns an error for all sessions other than VXI interface sessions.

Return Values

| VISA | SICL |
|---|---|
| VI_SUCCESS | I_ERR_NOERROR |
| VI_ERROR_INV_SESSION | I_ERR_BADID |
| VI_ERROR_NSUP_ATTR | I_ERR_NOTSUPP<br>I_ERR_PARAM |

```
int ivxiwaitnormop(id)
```

Purpose

Waits until the VXI interface associated with this id is active (that is, it is in normal operation).

Parameter

| Name | Type | Description |
|---|---|---|
| id | INST | Session identifier returned from iopen() or igetintfsess() |

VISA Operation(s)

```
ViStatus viGetAttribute(vi, attribute, attrState)
ViStatus viWaitOnEvent(vi, eventType, context, timeout)
```

Overview

The id parameter is first verified and translated (if necessary) to the corresponding VISA session, which will be used as the vi parameter in the VISA operation. If the attribute VI_ATTR_RDY_STATUS is retrieved, and the attrState return value reveals that the device is not already in normal operation, then viWaitOnEvent() is invoked to wait until it receives the activation event, VI_EVENT_ACTIVATE. This function returns an error for non-VXI sessions.

Return Values

| VISA | SICL |
|---|---|
| VI_SUCCESS | I_ERR_NOERROR |
| VI_ERROR_INV_SESSION | I_ERR_BADID |
| VI_ERROR_NSUP_ATTR | I_ERR_NOTSUPP |
| VI_ERROR_TMO | I_ERR_TIMEOUT | int ivxitrigon(id, which)

Purpose

Specifies which VXI trigger line(s) to assert using the START protocol.

Parameters

| Name | Type | Description |
|---|---|---|
| id | INST | Session identifier returned from iopen() or igetintfsess() |
| which | unsigned long | Bit field of VXI trigger lines to assert |

VISA Operation(s)

ViStatus viAssertTrigger(vi, protocol=VI_TRIG_PROT_START)

Overview

The id parameter is first verified and translated (if necessary) to the corresponding VISA session, which will be used as the vi parameter in the VISA operation. The which parameter is a bit vector of trigger lines that are to be asserted. The VISA operation viAssertTrigger() is invoked for each trigger line to be asserted. This function returns an error for all sessions other than VXI interface sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS VI_ERROR_NSUP_OPER | I_ERR_NOTSUPP |
| VI_ERROR_RSRC_LOCKED | I_ERR_LOCKED I_ERR_TIMEOUT |
| VI_ERROR_LINE_NCONFIG | I_ERR_BADCONFIG |
| VI_ERROR_LINE_IN_USE VI_ERROR_OPER_NCOMPLETE VI_ERROR_ACK_PENDING | I_ERR_BUSY |
| VI_ERROR_RSRC_NFOUND | I_ERR_PARAM |

```
int ivxitrigoff(id, which)
```

Purpose

Specifies which VXI trigger line(s) to deassert using the STOP protocol.

Parameters

| Name | Type | Description |
|---|---|---|
| id | INST | Session identifier returned from iopen() or igetintfsess() |
| which | unsigned long | Bit field of VXI trigger lines to deassert |

VISA Operation(s)

```
ViStatus viAssertTrigger(vi, protocol=VI_TRIG_PROT_STOP)
```

Overview

The id parameter is first verified and translated (if necessary) to the corresponding VISA session, which will be used as the vi parameter in the VISA operation. The which parameter is a bit vector of trigger lines that are to be deasserted. The VISA operation viAssertTrigger() is invoked for each trigger line to be deasserted. This function returns an error for all sessions other than VXI interface sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS<br>VI_ERROR_NSUP_OPER | I_ERR_NOTSUPP |
| VI_ERROR_RSRC_LOCKED | I_ERR_LOCKED<br>I_ERR_TIMEOUT |
| VI_ERROR_LINE_NCONFIG | I_ERR_BADCONFIG |
| VI_ERROR_LINE_IN_USE<br>VI_ERROR_OPER_NCOMPLETE<br>VI_ERROR_ACK_PENDING | I_ERR_BUSY |
| VI_ERROR_RSRC_NFOUND | I_ERR_PARAM |

```
int ivxitrigroute(id, in_which, out_which)
```

Purpose

Routes VXI trigger lines from any of the specified sources to all of the specified destinations.

Parameters

| Name | Type | Description |
|---|---|---|
| id | INST | Session identifier returned from iopen() or igetintfsess() |
| in_which | unsigned long | Bit field of trigger source(s) |
| out_which | unsigned long | Bit field of trigger destination(s) |

VISA Operation(s)

```
ViStatus viUnmapTrigger(vi, trigger)
ViStatus viMapTrigger(vi, trigger, direction, mode=VI_SYNC_CLK_EDGE)
```

Overview

The id parameter is first verified and translated (if necessary) to the corresponding VISA interface session. For each trigger line specified by the in_which parameter, previous trigger mappings are first undone via viUnmapTrigger(). In each call, the vi parameter is a VISA session to the specific trigger line, and the trigger parameter is the identifier of another trigger line (to which the first line is mapped). If the out_which parameter is 0, then unmapping is all that is necessary. Otherwise, for each trigger line specified by the in_which parameter, viMapTrigger() is called once for each trigger line specified by the out_which parameter. This function returns an error for all sessions other than VXI interface sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_NSUP_SRC_TRIG<br>VI_ERROR_NSUP_DEST_TRIG | I_ERR_NOTSUPP<br>I_ERR_PARAM |
| VI_ERROR_TRIG_MAPPED | I_ERR_BADCONFIG |

```
int ivxigettrigroute(id, which, route)
```

Purpose

Determines to which destination(s) the specified VXI trigger source is routed.

Parameters

| Name | Type | Description |
|---|---|---|
| id | INST | Session identifier returned from `iopen()` or `igetintfsess()` |
| which | unsigned long | Single trigger source |
| route | unsigned long * | Location to store bit field of trigger destination(s) |

VISA Operation(s)

```
ViStatus viGetAttribute(vi, attribute, attrState)
```

Overview

The id parameter is first verified and translated (if necessary) to the corresponding VISA session. The current mapping state of a trigger line can be determined by getting the VI_ATTR_TRIG_MAP_ROUTE attribute. The vi parameter is a VISA session to the trigger line specified by which. The attrState parameter will contain a list of destination trigger lines, which can be copied into the route parameter. This function returns an error for all sessions other than VXI interface sessions.

Return Values

| VISA | SICL |
|---|---|
| VI_SUCCESS | I_ERR_NOERROR |
| VI_ERROR_INV_SESSION | I_ERR_BADID |
| VI_ERROR_NSUP_ATTR | I_ERR_NOTSUPP<br>I_ERR_PARAM |

```
int ivxiws(id, wscmd, wsresp, rpe)
```

Purpose

Sends specified Word Serial command to the device.

Parameters

| Name | Type | Description |
|---|---|---|
| id | INST | Session identifier returned from iopen() or igetintfsess() |
| wscmd | unsigned short | Word Serial command value |
| wsresp | unsigned short* | Location to store response (if wscmd is a query) |
| rpe | unsigned short* | Location to store value of Read Protocol Error (if error occurred) |

VISA Operation(s)

```
ViStatus viSendCommand(vi, command, param)
ViStatus viQueryRequest(vi, mode, command, param, len, response)
```

Overview

The id parameter is first verified and translated (if necessary) to the corresponding VISA session, which will be used as the vi parameter in the VISA operation. If the wsresp parameter is passed as NULL, which indicates that wscmd is a Word Serial command, then this function maps to viSendCommand(); otherwise, wscmd is assumed to be a Word Serial query, and this function calls viQueryRequest(). In either case, the command parameter is VI_CMD_MISC_WS and the wscmd parameter is equivalent to param. If viQueryRequest() is the operation to be invoked, the mode parameter is VI_QUERY, the len parameter is 2 (indicating a 16-bit response), and the wsresp parameter corresponds directly to the response parameter. The rpe parameter, if not NULL, is filled in only if a Protocol Error occurs (there are unique error status values for each violation in VISA). This function returns an error for all sessions other than VXI device sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_TMO | I_ERR_TIMEOUT |
| VI_ERROR_ABORT | I_ERR_ABORTED |
| VI_ERROR_BERR<br>VI_ERROR_NSUP_COMMAND<br>VI_ERROR_RAW_WR_PROT_VIOL<br>VI_ERROR_RAW_RD_PROT_VIOL<br>VI_ERROR_INP_PROT_VIOL<br>VI_ERROR_OUTP_PROT_VIOL | I_ERR_IO | int ivxiservants(id, maxnum, list)

Purpose

Gets list of local device's VXI servants.

Parameters

| Name | Type | Description |
|---|---|---|
| id | INST | Session identifier returned from iopen() or igetintfsess() |
| maxnum | int | Size of list array (number of integers it can hold) |
| list | int * | Location to store list of local device's VXI servants |

VISA Operation(s)

ViStatus viGetAttribute(vi, attribute, attrState)

Overview

The id parameter is first verified and translated (if necessary) to the corresponding VISA session, which will be used as the vi parameter in the VISA operation. The attribute values VI_ATTR_SERV_AREA and VI_ATTR_SERV_LIST are retrieved via viGetAttribute() to get a copy of the local device's servants. This list is then copied into the list array (up to maxnum elements) by the SICL library. This function returns an error for all sessions other than VXI interface sessions.

Return Values

| VISA | SICL |
|---|---|
| VI_SUCCESS | I_ERR_NOERROR |
| VI_ERROR_INV_SESSION | I_ERR_BADID |
| VI_ERROR_NSUP_ATTR | I_ERR_NOTSUPP |

```
int ivxirminfo(id, laddr, info)
```

Purpose
    Gets Resource Manager information about specified logical address.

Parameters

| Name | Type | Description |
|---|---|---|
| id | INST | Session identifier returned from iopen() or igetintfsess() |
| laddr | int | Logical address of device to get information about |
| info | struct vxiinfo* | Location to store structure of information about the device |

VISA Operation(s)

```
ViStatus viOpen(sesn, rsrcName, accessMode, timeout, vi)
ViStatus viGetAttribute(vi, attribute, attrState)
ViStatus viClose(vi)
```

Overview
    The id parameter passed to ivxirminfo() is used mainly to verify that the session is a VXI session, but is also used if the laddr parameter is -1. Otherwise, a new session is opened to the device at the specified logical address (by invoking viOpen()), and the requested information is then retrieved into the info structure by calling viGetAttribute() with an equivalent attribute for each structure element. If the laddr parameter is not -1, the session that was automatically opened will also be automatically closed (by invoking viClose()). This function returns an error for non-VXI sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS<br>VI_ERROR_ATTR_NSUP | I_ERR_NOTSUPP |
| VI_ERROR_RSRC_NFOUND<br>VI_ERROR_INV_RSRC_NAME | I_ERR_INVLADDR |

Section 14
Serial Specifics

`int iserialctrl(id, request, setting)`

Purpose

Sets the state of a particular attribute associated with the serial interface.

Parameters

| Name | Type | Description |
|------|------|-------------|
| id | INST | Session identifier returned from iopen() or igetintfsess() |
| request | int | Which type of attribute to set |
| setting | unsigned long | Value to set |

VISA Operation(s)

```
ViStatus viSetAttribute(vi, attribute, attrState)
ViStatus viTerminate(vi, target=VI_RSRC, degree=VI_RESET, jobId=VI_ALL,
                     immediate=VI_TRUE, flagFlushData=VI_TRUE)
```

Overview

The id parameter is first verified and translated (if necessary) to the corresponding VISA session, which will be used as the vi parameter in the VISA operation. If the setting parameter is I_SERIAL_RESET, this function maps to the viTerminate() operation; otherwise, it calls viSetAttribute(). VISA defines an equivalent attribute and attrState value for every request and setting value. This function returns an error for all sessions other than Serial interface sessions.

Return Values

| VISA | SICL |
|------|------|
| VI_SUCCESS | I_ERR_NOERROR |
| VI_ERROR_INV_SESSION | I_ERR_BADID |
| VI_ERROR_NSUP_ATTR | I_ERR_NOTSUPP <br> I_ERR_PARAM |
| VI_ERROR_NSUP_ATTR_STATE | I_ERR_PARAM |
| VI_ERROR_RSRC_LOCKED | I_ERR_LOCKED <br> I_ERR_TIMEOUT | int iserialstat(id, request, result)

Purpose

Gets the state of a particular attribute associated with the serial interface.

Parameters

| Name | Type | Description |
|---|---|---|
| id | INST | Session identifier returned from iopen() or igetintfsess() |
| request | int | Which type of attribute to set |
| result | unsigned long * | Location to store current value |

VISA Operation(s)

ViStatus viGetAttribute(vi, attribute, attrState)

Overview

The id parameter is first verified and translated (if necessary) to the corresponding VISA session, which will be used as the vi parameter in the VISA operation. VISA defines an equivalent attribute value for every request value. This function returns an error for all sessions other than Serial interface sessions.

Return Values

| VISA | SICL |
|---|---|
| VI_SUCCESS | I_ERR_NOERROR |
| VI_ERROR_INV_SESSION | I_ERR_BADID |
| VI_ERROR_NSUP_ATTR | I_ERR_NOTSUPP I_ERR_PARAM |

```
int iserialmclctrl(id, line, state)
```

Purpose
    Sets the state of one of the Modem Control Lines.

Parameters

| Name | Type | Description |
|---|---|---|
| id | INST | Session identifier returned from iopen() or igetintfsess() |
| line | int | Which line to control |
| state | int | Whether to assert or deassert specified line |

VISA Operation(s)

`ViStatus viSetAttribute(vi, attribute, attrState)`

Overview
    The id parameter is first verified and translated (if necessary) to the corresponding VISA session, which will be used as the vi parameter in the VISA operation. VISA defines an equivalent attribute and attrState value for every line and state value. This function returns an error for all sessions other than Serial interface sessions.

Return Values

| VISA | SICL |
|---|---|
| VI_SUCCESS | I_ERR_NOERROR |
| VI_ERROR_INV_SESSION | I_ERR_BADID |
| VI_ERROR_NSUP_ATTR | I_ERR_NOTSUPP<br>I_ERR_PARAM |
| VI_ERROR_NSUP_ATTR_STATE | I_ERR_PARAM |
| VI_ERROR_RSRC_LOCKED | I_ERR_LOCKED<br>I_ERR_TIMEOUT | int iserialmclstat(id, line, state)

Purpose
Gets the state of one of the Modem Control Lines.

Parameters

| Name | Type | Description |
|---|---|---|
| id | INST | Session identifier returned from iopen() or igetintfsess() |
| line | int | Which line to get current state for |
| state | int * | Location to store current state |

VISA Operation(s)

ViStatus viGetAttribute(vi, attribute, attrState)

Overview
The id parameter is first verified and translated (if necessary) to the corresponding VISA session, which will be used as the vi parameter in the VISA operation. VISA defines an equivalent attribute value for every line value. This function returns an error for all sessions other than Serial interface sessions.

Return Values

| VISA | SICL |
|---|---|
| VI_SUCCESS | I_ERR_NOERROR |
| VI_ERROR_INV_SESSION | I_ERR_BADID |
| VI_ERROR_NSUP_ATTR | I_ERR_NOTSUPP<br>I_ERR_PARAM | int iserialbreak(id)

Purpose

Sends a BREAK over the serial interface.

Parameter

| Name | Type | Description |
|---|---|---|
| id | INST | Session identifier returned from iopen() or igetintfsess() |

VISA Operation(s)

ViStatus viAsrlSendBreak(vi, unit=VI_ASRL_FRAME_TIME, length)

Overview

The id parameter is first verified and translated (if necessary) to the corresponding VISA session, which will be used as the vi parameter in the VISA operation. VISA allows finer timing control when issuing a BREAK, but the SICL function iserialbreak() will just send a BREAK that lasts several lengths of a serial frame. This function returns an error for all sessions other than Serial interface sessions.

Return Values

| VISA | SICL |
|---|---|
| VI_SUCCESS | I_ERR_NOERROR |
| VI_ERROR_INV_SESSION | I_ERR_BADID |
| VI_ERROR_RSRC_NEXISTS | I_ERR_NOTSUPP |
| VI_ERROR_RSRC_LOCKED | I_ERR_LOCKED<br>I_ERR_TIMEOUT |
| VI_ERROR_ABORT | I_ERR_ABORTED |

We claim:

1. A method for mapping driver level event function calls from a first driver level library to a second driver level library in an instrumentation system including a computer system, the method comprising the computer implemented steps of:

receiving a call from an application to a function in said first driver level library which enables interrupts, wherein said function in said first driver level library which enables interrupts includes one or more parameters, including a first parameter that determines whether interrupts should be enabled or disabled for a session to said first driver level library;

examining said first parameter of said function in said first driver level library which enables interrupts;

invoking an operation in said second driver level library which disables events if said first parameter indicates that interrupts should be disabled; and invoking an operation in said second driver level library which enables events if said first parameter indicates that interrupts should be enabled.

2. The method of claim 1, further comprising:

determining if a function in said first driver level library which installs an interrupt handler has already been called;

wherein said step of invoking said operation in said second driver level library which enables events includes setting a parameter indicating that a handler should be called immediately if said function in said first driver level library which installs an interrupt handler has already been called;

wherein said step of invoking said operation in said second driver level library which enables events includes setting a parameter indicating that information about an event should be placed on a suspend queue if said function in said first driver level library which installs an interrupt handler has not been called.

3. The method of claim 1, further comprising:

the second driver level library saving information in a data structure regarding a state of events which are enabled and disabled for said session to said first driver level library.

4. The method of claim 1, wherein said function in said first driver level library which enables interrupts includes a parameter which identifies a session to said first driver level library, the method further comprising:

translating said session identifier parameter to a value which corresponds to a session to said second driver level library.

5. The method of claim 1, wherein said function in said first driver level library which enables interrupts includes a second parameter that determines which interrupt condition to enable or disable for a session to said first driver level library, the method further comprising:

mapping said second parameter to an event type in said second driver level library.

6. The method of claim 1, wherein said function in said first driver level library which enables interrupts includes a second parameter that determines which interrupt condition to enable or disable for a session to said first driver level library, the method further comprising:

determining if said second parameter references a value which disables all interrupts for a session; and invoking an operation in said second driver level library which disables events for the session if said second parameter references a value which disables all interrupts for the session.

7. The method of claim 1, wherein said first driver level library is the Standard Instrument Control Library (SICL) and wherein said second driver level library is the Virtual Instrument Software Architecture (VISA);

wherein said function in said first driver level library which enables interrupts is an isetintr function in said SICL library.

8. A method for mapping driver level event function calls from a first driver level library to a second driver level library in an instrumentation system including a computer system, the method comprising the computer implemented steps of:

receiving a call to a function in said first driver level library which disables execution of interrupt handlers for a plurality of sessions in a first process;

maintaining a data structure comprising sessions to said second driver level library which correspond to said first process;

examining said data structure to determine which sessions are enabled for said first process in response to receiving said call to said function in said first driver level library which disables execution of interrupt handlers; and invoking an operation in said second driver level library which suspends execution for all enabled events in each of said sessions to said second driver level library which correspond to said first process after said step of examining.

9. The method of claim 8, further comprising:

performing said operation in said second driver level library which suspends execution for all enabled events in said sessions to said second driver level library corresponding to said first process, wherein said step of performing comprises:

determining which events are enabled in one of said sessions to said second driver level library corresponding to said first process;

suspending execution of said events enabled in said one of said sessions to said second driver level library corresponding to said first process; and performing said steps of determining and suspending for each of said sessions to said second driver level library corresponding to said first process.

10. The method of claim 8, wherein said first driver level library further includes a function which enables execution of interrupt handlers, wherein said function in said first driver level library which disables execution of interrupt handlers and said function in said first driver level library which enables execution of interrupt handlers can be nested, the method further comprising:

determining if said function in said first driver level library which disables execution of said interrupt handlers has been called without a corresponding call to said function in said first driver level library which enables execution of said interrupt handlers; and performing said steps of examining and invoking only if said function in said first driver level library which disables execution of said interrupt handlers has not been called without a corresponding call to said function in said first driver level library which enables execution of said interrupt handlers.

11. The method of claim 8, wherein said first driver level library further includes a function which enables execution of interrupt handlers, wherein said function in said first driver level library which disables execution of interrupt handlers and said function in said first driver level library which enables execution of interrupt handlers can be nested, the method further comprising:

determining if said function in said first driver level library which disables execution of said interrupt handlers has been called once without a corresponding call to said function in said first driver level library which enables execution of said interrupt handlers;

setting a count variable equal to one if said function which disables execution of interrupt handlers has not been called without an accompanying call to said function in said first driver level library which enables execution of interrupt handlers;

incrementing said count variable if said function in said first driver level library which disables execution of said interrupt handlers has already been called without an accompanying call to said function which enables execution of said interrupt handlers.

12. The method of claim 8, wherein said first driver level library is the Standard Instrument Control Library and said second driver level library is the Virtual Instrument Software Architecture Library.

13. The method of claim 12, wherein said function in said first driver level library which disables execution of interrupt handlers is an iintroff function.

14. A method for mapping driver level event function calls from a first driver level library to a second driver level library in an instrumentation system including a computer system, the method comprising the computer implemented steps of:

receiving a call to a function in said first driver level library which enables execution of interrupt handlers for a plurality of sessions in a first process;

maintaining a data structure comprising sessions to said second driver level library which correspond to said first process;

examining said data structure to determine which sessions are enabled for said first process in response to receiving said call to said function in said first driver level library which enables execution of interrupt handlers; and invoking an operation in said second driver level library which enables execution of all enabled events in each of said sessions to said second driver level library which correspond to said first process after said step of examining.

15. The method of claim 14, further comprising:

performing said operation in said second driver level library which enables execution of all enabled events in said sessions to said second driver level library corresponding to said first process, wherein said step of performing comprises:

determining which events are enabled in one of said sessions to said second driver level library corresponding to said first process;

enabling execution of said events enabled in said one of said sessions to said second driver level library corresponding to said first process; and performing said steps of determining and enabling for each of said sessions to said second driver level library corresponding to said first process.

16. The method of claim 14, wherein said first driver level library further includes a function which disables execution of interrupt handlers, wherein said function in said first driver level library which disables execution of interrupt handlers and said function in said first driver level library which enables execution of interrupt handlers can be nested, the method further comprising:

determining if said function in said first driver level library which disables execution of said interrupt handlers has been called once without a corresponding call to said function in said first driver level library which enables execution of said interrupt handlers; and performing said steps of examining and invoking in response to said step of receiving said call to said function in said first driver level library which enables execution of interrupt handlers, wherein said step of performing is performed only if said function in said first driver level library which disables execution of said interrupt handlers has been called once without a corresponding call to said function in said first driver level library which enables execution of interrupt handlers.

17. The method of claim 14, wherein said first driver level library further includes a function which disables execution of interrupt handlers, wherein said function in said first driver level library which disables execution of interrupt handlers and said function in said first driver level library which enables execution of interrupt handlers can be nested, the method further comprising:

determining if said function in said first driver level library which disables execution of said interrupt handlers has been called once without a corresponding call to said function in said first driver level library which enables execution of said interrupt handlers; and setting a count variable equal to one if said function which disables execution ofininterrupt handlers has not been called without an accompany said first driver level library which enables execution of interrupt handlers;

incrementing said count variable if said function in said first driver level library which disables execution of said interrupt handlers has already been called without an accompanying call to said function which enables execution of said interrupt handlers.

18. The method of claim 17, further comprising:

determining a value of said count variable after said step of receiving said call to said function in said first driver level library which enables execution of interrupt handlers;

decrementing said count variable if said count value is greater than one; and returning a success value after said step of decrementing if said count value is determined to be greater than one.

19. The method of claim 14, wherein said first driver level library is the Standard Instrument Control Library and said second driver level library is the Virtual Instrument Software Architecture library.

20. The method of claim 19, wherein said function in said first driver level library which enables execution of interrupt handlers is an iintron function.

21. A method for mapping driver level event function calls from a first driver level library to a second driver level library in an instrumentation system including a computer system, the method comprising the computer implemented steps of:

receiving a call to a function from an application, wherein said function is comprised in said first driver level library and operates to install a first interrupt handler for use by said application, wherein said second driver level library cannot call said first interrupt handler in said application, wherein said first driver level library further includes a function which enables interrupt conditions, wherein said function which enables interrupt conditions and said function which installs said first interrupt handler may be called in any order in said first driver level library;

determining if said function in said first driver level library which enables interrupt conditions has already been called;

invoking an operation in said second driver level library which enables interrupt conditions only if said function in said first driver level library which enables interrupt conditions has already been called installing a second handler in said application which is callable by said second driver level library, wherein said second handler calls said first interrupt handler.

22. The method of claim 21, wherein said function in said first driver level library which installs said first interrupt handler includes a parameter which references a procedure to be installed as said first interrupt handler, the method further comprising:

determining if said parameter references a valid procedure to be installed as said first interrupt handler;

invoking an operation in said second driver level library which installs an interrupt handler if said parameter references a valid procedure to be installed as said first interrupt handler;

invoking an operation in said second driver level library which uninstalls an interrupt handler if said parameter does not reference a valid procedure to be installed as said first interrupt handler.

23. The method of claim 22, further comprising:

invoking an operation in said second driver level library which disables interrupt conditions after said step of invoking an operation in said second driver level library which uninstalls an interrupt handler if said parameter does not reference a valid procedure to be installed as said first interrupt handler.

24. The method of claim 22, further comprising saving a value of said parameter in a data structure.

25. The method of claim 21, wherein said function in said first driver level library which installs an interrupt handler includes a parameter which identifies a session to said first driver level library, the method further comprising:

translating said session identifier parameter to a value which corresponds to a session to said second driver level library.

26. The method of claim 21, wherein said first driver level library is the Standard Instrument Control Library and wherein said second driver level library is the Virtual Instrument Software Architecture.

27. The method of claim 26, wherein said function in said first driver level library which installs an interrupt handler is an ionintr function call in said SICL library.

28. The method of claim 21, further comprising:

examining said parameter which references said procedure to be installed as said first interrupt handler in said first driver level library session data structure in response to an interrupt occurring in said application;

calling said second handler in response to said examining, wherein said second handler calls said first handler.

29. A method for mapping driver level event function calls from a first driver level library to a second driver level library in an instrumentation system including a computer system, the method comprising the computer implemented steps of:

receiving a call to a function from an application, wherein said function is comprised in said first driver level library and operates to install a first interrupt handler for use by said application for service requests (SRQs), wherein said second driver level library cannot call said first interrupt handler in said application, wherein said function in said first driver level library which installs an interrupt handler includes a parameter which references a procedure to be installed as said interrupt handler;

determining if said parameter references a valid procedure to be installed as said first interrupt handler;

invoking an operation in said second driver level library which installs a second interrupt handler if said parameter references a valid procedure to be installed as said first interrupt handler, wherein said second interrupt handler is callable by said second driver level library, wherein said second interrupt handler calls said first interrupt handler; and invoking an operation in said second driver level library which uninstalls an interrupt handler if said procedure does not reference a valid procedure to be installed as said interrupt handler;

invoking an operation in said second driver level library which enables interrupt conditions for service requests (SRQs) if said parameter references a valid procedure to be installed as said first interrupt handler; and invoking an operation in said second driver level library which disables interrupt conditions for service requests (SRQs) if said parameter does not reference a valid procedure to be installed as said first interrupt handler.

30. The method of claim 29, further comprising saving a value of said parameter in a data structure.

31. The method of claim 29, wherein said first driver level library is the Standard Instrument Control Library and wherein said second driver level library is the Virtual Instrument Software Architecture.

32. The method of claim 31, wherein said function in said first driver level library which installs said first interrupt handler for service requests is an ionsrq function in said SICL library.

33. A method for mapping driver level event function calls from a first driver level library to a second driver level library in an instrumentation system including a computer system, the method comprising the computer implemented steps of:

receiving a call from an application to a function in said first driver level library which installs an error handler in said application for sessions which correspond to a first process;

determining which sessions to said second driver level library corresponding to said first process are opened;

examining a parameter in said function which references said error handler to determine if said parameter references a valid error handler;

invoking an operation in said second driver level library which uninstalls an error handler from said sessions to said second driver level library if said parameter does not reference a valid error handler;

invoking an operation in said second driver level library which installs said error handler for said sessions in said process if said parameter references a valid error handler.

34. The method of claim 33, wherein said parameter comprises a pointer to an error handler and wherein said step of determining if said parameter which references said error handler is valid comprises determining if said parameter is zero.

35. The method of claim 33, further comprising:
examining said parameter in said function which references said error handler to determine if said parameter is a special value;
changing said parameter to point to a handler in said first driver level library if said parameter is a special value.

36. The method of claim 33, further comprising saving a value of said parameter in a data structure.

37. The method of claim 33, wherein said first driver level library is the Standard Instrument Control Library and said second driver level library is the Virtual Instrument Software Architecture library.

38. The method of claim 37, wherein said function in said first driver level library which installs an error handler is an ionerror function in said SICL library.

39. The method of claim 33, further comprising:
determining if a new session to said first driver level library has been opened;
determining if said function which installs an error handler has already been called after said step of said new session opening to said first driver level library;
installing an error handler on said new session if said function in said first driver level library which installs an error handler has already been called.

40. A method for mapping driver level event function calls from a first driver level library to a second driver level library in an instrumentation system including a computer system, the method comprising the computer implemented steps of:
receiving a call to a function in said first driver level library which enables execution of interrupt handlers for a plurality of sessions in a first process;
maintaining a data structure comprising sessions to said second driver level library which correspond to said first process;
examining said data structure to determine which sessions are enabled for said first process; and
invoking a plurality of operations in said second driver level library which enable execution of all enabled events in each of said sessions to said second driver level library which correspond to said first process.

41. The method of claim 40, further comprising:
performing said plurality of operations in said second driver level library which enable execution of all enabled events in said sessions to said second driver level library corresponding to said first process, wherein said step of performing comprises:
determining which events are enabled in one of said sessions to said second driver level library corresponding to said first process;
performing an operation to enable execution of an event for each of said events enabled in said one of said sessions to said second driver level library corresponding to said first process; and
performing said steps of determining and performing an operation for each of said sessions to said second driver level library corresponding to said first process.

42. A method for mapping driver level event function calls from a first driver level library to a second driver level library in an instrumentation system including a computer system, the method comprising the computer implemented steps of
receiving a call to a function in said first driver level library which disables execution of interrupt handlers for a plurality of sessions in a first process;
maintaining a data structure comprising sessions to said second driver level library which correspond to said first process;
examining said data structure to determine which sessions are enabled for said first process; and
invoking a plurality of operations in said second driver level library which suspend execution for all enabled events in each of said sessions to said second driver level library which correspond to said first process.

43. The method of claim 42, further comprising:
performing said plurality of operations in said second driver level library which suspend execution for all enabled events in said sessions to said second driver level library corresponding to said first process, wherein said step of performing comprises:
determining which events are enabled in one of said sessions to said second driver level library corresponding to said first process;
performing an operation to suspend execution of an event for each of said events enabled in said one of said sessions to said second driver level library corresponding to said first process; and
performing said steps of determining and performing an operation for each of said sessions to said second driver level library corresponding to said first process.

* * * * *

UNITED STATES PATENT AND TRADEMARK OFFICE
CERTIFICATE OF CORRECTION

PATENT NO. : 5,640,572
DATED : June 17, 1997
INVENTOR(S) : Dan Mondrik; Samson DeKey; Hugo Andrade It is certified that error appears in the above-indentified patent and that said Letters Patent is hereby corrected as shown below:

```
Claim 17, col. 248, line 31, please create paragraph after the word
and.

Claim 17, col. 248, line 33, "ofininterrupt" should read "of
interrupt".

Claim 17, col. 248, lines 34 to 35, "accompany said first driver
level library which enables execution of interrupt handlers;" should
read "accompanying call to said function in said first driver level
library which enables execution of interrupt handlers;"

Claim 28, col. 249, line 62, "handier" should read "handler".

Claim 42, col. 252, line 18 "steps of" should read "steps of:"
```

Signed and Sealed this

Second Day of September, 1997

*Attest:*

BRUCE LEHMAN

*Attesting Officer*  Commissioner of Patents and Trademarks